US008632658B2

(12) United States Patent
Miller et al.

(10) Patent No.: US 8,632,658 B2
(45) **Date of Patent: *Jan. 21, 2014**

(54) MULTI-PLY WIPER/TOWEL PRODUCT WITH CELLULOSIC MICROFIBERS

(71) Applicant: Georgia-Pacific Consumer Products LP, Atlanta, GA (US)

(72) Inventors: Joseph H. Miller, Neenah, WI (US); Daniel W. Sumnicht, Hobart, WI (US); Ayanna M. Bernard, Neenah, WI (US); Sanjay Wahal, Appleton, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,141

(22) Filed: Feb. 5, 2013

(65) Prior Publication Data

US 2013/0153164 A1 Jun. 20, 2013

Related U.S. Application Data

(63) Continuation of application No. 13/137,216, filed on Jul. 28, 2011, which is a continuation-in-part of application No. 12/694,650, filed on Jan. 27, 2010, now Pat. No. 8,293,072.

(60) Provisional application No. 61/206,146, filed on Jan. 28, 2009.

(51) Int. Cl.

| | |
|---|---|
| ***D21H 13/08*** | (2006.01) |
| ***D21H 15/02*** | (2006.01) |
| ***B31F 1/07*** | (2006.01) |
| ***B32B 29/00*** | (2006.01) |

(52) U.S. Cl.

USPC .......... 162/129; 162/109; 162/117; 162/146; 162/149; 162/157.6

(58) Field of Classification Search

USPC ............... 162/9, 28, 109, 111, 117, 123–130, 162/141, 146, 149–150, 157.1, 157.6, 162/157.7, 158, 164.1, 168, 179; 428/359, 428/391, 393, 304.4, 311.11, 311.51, 428/311.71, 156, 172

See application file for complete search history.

(56) References Cited

U.S. PATENT DOCUMENTS

| | | | |
|---|---|---|---|
| 1,983,529 | A | 12/1934 | Brandenberger |
| 2,025,000 | A | 12/1935 | Losee |
| 2,428,046 | A | 9/1947 | Sisson et al. |
| 2,440,761 | A | 5/1948 | Sisson et al. |
| 2,459,927 | A | 1/1949 | Dreyfus et al. |
| 2,517,764 | A | 8/1950 | Carson et al. |
| 2,744,292 | A | 5/1956 | Schlosser et al. |
| 2,785,995 | A | 3/1957 | Kress |
| 3,009,822 | A | 11/1961 | Drelich et al. |
| 3,173,830 | A | 3/1965 | Wise et al. |
| 3,175,339 | A | 3/1965 | McDowell |
| 3,209,402 | A | 10/1965 | Riley et al. |
| 3,337,671 | A | 8/1967 | Drisch et al. |
| 3,382,140 | A | 5/1968 | Henderson et al. |
| 3,432,936 | A | 3/1969 | Cole et al. |
| 3,475,270 | A | 10/1969 | Cruz |
| 3,508,941 | A | 4/1970 | Johnson |
| 3,692,622 | A | 9/1972 | Dunning |
| 3,785,918 | A | 1/1974 | Kawai et al. |
| 3,926,716 | A | 12/1975 | Bates |
| 3,974,025 | A | 8/1976 | Ayers |
| 3,994,771 | A | 11/1976 | Morgan, Jr. et al. |
| 4,036,679 | A | 7/1977 | Back et al. |
| 4,064,213 | A | 12/1977 | Lazorisak et al. |
| 4,100,324 | A | 7/1978 | Anderson et al. |
| 4,102,737 | A | 7/1978 | Morton |
| 4,125,659 | A | 11/1978 | Klowak et al. |
| 4,145,532 | A | 3/1979 | Franks et al. |
| 4,161,195 | A | 7/1979 | Khan |
| 4,182,381 | A | 1/1980 | Gisbourne |
| 4,184,519 | A | 1/1980 | McDonald et al. |
| 4,196,282 | A | 4/1980 | Franks et al. |
| 4,225,382 | A | 9/1980 | Kearney et al. |

(Continued)

FOREIGN PATENT DOCUMENTS

| | | | |
|---|---|---|---|
| CA | 1002359 | A1 | 12/1976 |
| CA | 2053505 | C | 4/1992 |

(Continued)

OTHER PUBLICATIONS

International Search Report completed Mar. 20, 2013, and mailed Mar. 27, 2013, in counterpart International Application No. PCT/US2012/048046.
Written Opinion issued in counterpart International Application No. PCT/US2012/048046, and mailed Mar. 27, 2013.
Cresson, Thierry M., et al. "Characterization of paper formation Part 1: sensing paper formation," Tappi Journal, Jul. 1990, pp. 153-159.
Waterhouse, J.F. "On-Line Formation Measurements and Paper Quality," Institute of Paper Science and Technology, 1996, IPST Technical Paper Series 604.
Dymrose-Peterson, Katherine. "Smart Materials for Liquid Control," Nonwovens World, Oct.-Nov. 1999, pp. 95-99.

(Continued)

*Primary Examiner* — Jose A Fortuna
(74) *Attorney, Agent, or Firm* — Laura L. Bozek

(57) ABSTRACT

A multi-ply wiper/towel product includes at least one wet laid web having at least 10% fibrillated cellulosic microfiber, and at least about 40% wood pulp derived papermaking fibers. The at least one wet laid web has formed therein (i) a plurality of fiber-enriched hollow domed regions on the upper side of the at least one wet laid web having a relatively high local basis weight, (ii) connecting regions having a relatively lower local basis weight forming a network interconnecting the relatively high local basis weight domed regions of the one wet laid web, and (iii) transition areas with upwardly and inwardly inflected consolidated fibrous regions transitioning from the connecting regions into the domed regions.

98 Claims, 50 Drawing Sheets

(56) References Cited

U.S. PATENT DOCUMENTS 4,239,065 A 12/1980 Trokhan
4,246,221 A 1/1981 McCorsley, III
4,307,143 A 12/1981 Meitner
4,314,589 A 2/1982 Buchanan et al.
4,356,059 A 10/1982 Hostetler
4,359,069 A 11/1982 Hahn
4,374,702 A 2/1983 Turbak et al.
4,376,455 A 3/1983 Hahn
4,379,735 A 4/1983 MacBean
4,420,372 A 12/1983 Hostetler
4,426,228 A 1/1984 Brandner et al.
4,426,417 A 1/1984 Meitner et al.
4,436,780 A 3/1984 Hotchkiss et al.
4,440,597 A 4/1984 Wells et al.
4,441,962 A 4/1984 Osborn, III
4,448,638 A 5/1984 Klowak
4,453,573 A 6/1984 Thompson
4,468,428 A 8/1984 Early et al.
4,481,076 A 11/1984 Herrick
4,481,077 A 11/1984 Herrick
4,482,429 A 11/1984 Klowak
4,483,743 A 11/1984 Turbak et al.
4,490,925 A 1/1985 Smith
4,507,173 A 3/1985 Klowak et al.
4,528,239 A 7/1985 Trokhan
4,528,316 A 7/1985 Sorens
4,529,480 A 7/1985 Trokhan
4,533,437 A 8/1985 Curran et al.
4,543,156 A 9/1985 Cheshire et al.
4,546,052 A 10/1985 Nicoll
4,551,199 A 11/1985 Weldon
4,552,709 A 11/1985 Koger, II et al.
4,556,450 A 12/1985 Chuang et al.
4,592,395 A 6/1986 Borel
4,605,585 A 8/1986 Johansson
4,610,743 A 9/1986 Salmeen et al.
4,611,639 A 9/1986 Bugge
4,614,679 A 9/1986 Farrington, Jr. et al.
4,637,859 A 1/1987 Trokhan
4,640,741 A 2/1987 Tsuneo
4,689,119 A 8/1987 Weldon
4,709,732 A 12/1987 Kinnunen
4,735,849 A 4/1988 Murakami et al.
4,759,391 A 7/1988 Waldvogel et al.
4,759,976 A 7/1988 Dutt
4,795,530 A 1/1989 Soerens et al.
4,802,942 A 2/1989 Takemura et al.
4,834,838 A 5/1989 Klowak
4,849,054 A 7/1989 Klowak
4,906,513 A 3/1990 Kebbell et al.
4,908,097 A 3/1990 Box
4,931,201 A 6/1990 Julemont
4,942,077 A 7/1990 Wendt et al.
4,973,512 A 11/1990 Stanley et al.
4,987,632 A 1/1991 Rowe et al.
4,998,568 A 3/1991 Vohringer
5,016,678 A 5/1991 Borel et al.
5,023,132 A 6/1991 Stanley et al.
5,039,431 A 8/1991 Johnson et al.
5,048,589 A 9/1991 Cook et al.
5,054,525 A 10/1991 Vohringer
5,066,532 A 11/1991 Gaisser
5,087,324 A 2/1992 Awofeso et al.
5,098,519 A 3/1992 Ramasubramanian et al.
5,098,522 A 3/1992 Smurkoski et al.
5,103,874 A 4/1992 Lee
5,114,777 A 5/1992 Gaisser
5,124,197 A 6/1992 Bernardin et al.
5,129,988 A 7/1992 Farrington, Jr.
5,137,600 A 8/1992 Barnes et al.
5,167,261 A 12/1992 Lee
5,182,164 A 1/1993 Eklund et al.
5,199,467 A 4/1993 Lee
5,211,815 A 5/1993 Ramasubramanian et al.
5,219,004 A 6/1993 Chiu
5,223,096 A 6/1993 Phan et al.
5,225,269 A 7/1993 Bohlin
5,227,024 A 7/1993 Gomez
5,245,025 A 9/1993 Trokhan et al.
5,269,470 A 12/1993 Ishikawa et al.
5,277,761 A 1/1994 Van Phan et al.
5,314,584 A 5/1994 Grinnell et al.
5,320,710 A 6/1994 Reeves et al.
5,328,565 A 7/1994 Rasch et al.
5,336,373 A 8/1994 Scattolino et al.
5,348,620 A 9/1994 Hermans et al.
5,354,524 A 10/1994 Sellars et al.
5,366,785 A 11/1994 Sawdai
5,368,696 A 11/1994 Cunnane, III et al.
5,372,876 A 12/1994 Johnson et al.
5,379,808 A 1/1995 Chiu
5,385,640 A 1/1995 Weibel et al.
5,411,636 A 5/1995 Hermans et al.
5,451,353 A 9/1995 Rezai et al.
5,492,598 A 2/1996 Hermans et al.
5,494,554 A 2/1996 Edwards et al.
5,501,768 A 3/1996 Hermans et al.
5,503,715 A 4/1996 Trokhan et al.
5,505,818 A 4/1996 Hermans et al.
5,510,001 A 4/1996 Hermans et al.
5,510,002 A 4/1996 Hermans et al.
5,549,790 A 8/1996 Van Phan
5,556,509 A 9/1996 Trokhan et al.
5,562,739 A 10/1996 Urben
5,580,356 A 12/1996 Taylor
5,582,681 A 12/1996 Back et al.
5,593,545 A 1/1997 Rugowski et al.
5,601,871 A 2/1997 Krzysik et al.
5,607,551 A 3/1997 Farrington, Jr. et al.
5,609,725 A 3/1997 Van Phan
5,614,293 A 3/1997 Krzysik et al.
5,618,612 A 4/1997 Gstrein
H1672 H 8/1997 Hermans et al.
5,656,132 A 8/1997 Farrington, Jr. et al.
5,657,797 A 8/1997 Townley et al.
5,667,636 A 9/1997 Engel et al.
5,672,248 A 9/1997 Wendt et al.
5,674,590 A 10/1997 Anderson et al.
5,688,468 A 11/1997 Lu
5,690,149 A 11/1997 Lee
5,695,607 A 12/1997 Oriaran et al.
5,725,734 A 3/1998 Herman et al.
5,725,821 A 3/1998 Gannon et al.
5,746,887 A 5/1998 Wendt et al.
5,759,210 A 6/1998 Potter et al.
5,759,926 A 6/1998 Pike et al.
5,772,845 A 6/1998 Farrington, Jr. et al.
5,779,737 A 7/1998 Potter et al.
5,814,190 A 9/1998 Van Phan
5,830,321 A 11/1998 Lindsay et al.
5,840,403 A 11/1998 Trokhan et al.
5,840,404 A 11/1998 Graff
5,851,353 A 12/1998 Fiscus et al.
5,858,021 A 1/1999 Sun et al.
5,863,652 A 1/1999 Matsumura et al.
5,865,955 A 2/1999 Ilvespaaet et al.
5,866,407 A 2/1999 Foody et al.
5,888,347 A 3/1999 Engel et al.
5,895,710 A 4/1999 Sasse et al.
5,932,068 A 8/1999 Farrington, Jr. et al.
5,935,381 A 8/1999 Trokhan et al.
5,935,681 A 8/1999 Paulett
5,935,880 A 8/1999 Wang et al.
5,958,187 A 9/1999 Bhat et al.
5,964,983 A 10/1999 Dinand et al.
5,968,590 A 10/1999 Ahonen et al.
6,001,218 A 12/1999 Hsu et al.
6,001,421 A 12/1999 Ahonen et al.
6,017,417 A 1/2000 Wendt et al.
6,027,611 A 2/2000 McFarland et al.
6,033,523 A 3/2000 Dwiggins et al.
6,036,820 A 3/2000 Schiel et al.
6,042,769 A 3/2000 Gannon et al.
6,048,641 A 4/2000 Ohmory et al.

(56) References Cited

U.S. PATENT DOCUMENTS

| | | | |
|---|---|---|---|
| 6,059,928 | A | 5/2000 | Van Luu et al. |
| 6,080,279 | A | 6/2000 | Hada et al. |
| 6,083,346 | A | 7/2000 | Hermans et al. |
| 6,093,284 | A | 7/2000 | Hada et al. |
| 6,096,169 | A | 8/2000 | Hermans et al. |
| 6,117,525 | A | 9/2000 | Trokhan et al. |
| 6,117,545 | A | 9/2000 | Cavaille et al. |
| 6,119,362 | A | 9/2000 | Sundqvist |
| 6,136,146 | A | 10/2000 | Phan et al. |
| 6,139,686 | A | 10/2000 | Trokhan et al. |
| 6,143,135 | A | 11/2000 | Hada et al. |
| 6,146,499 | A | 11/2000 | Lin et al. |
| 6,149,767 | A | 11/2000 | Hermans et al. |
| 6,153,136 | A | 11/2000 | Collier et al. |
| 6,162,327 | A | 12/2000 | Batra et al. |
| 6,171,442 | B1 | 1/2001 | Farrington, Jr. et al. |
| 6,183,596 | B1 | 2/2001 | Matsuda et al. |
| 6,187,137 | B1 | 2/2001 | Druecke et al. |
| 6,197,154 | B1 | 3/2001 | Chen et al. |
| 6,210,528 | B1 | 4/2001 | Wolkowicz |
| 6,214,163 | B1 | 4/2001 | Matsuda et al. |
| 6,221,487 | B1 | 4/2001 | Luo et al. |
| 6,315,864 | B2 | 11/2001 | Anderson et al. |
| 6,318,727 | B1 | 11/2001 | Hada |
| 6,331,230 | B1 | 12/2001 | Hermans et al. |
| 6,350,349 | B1 | 2/2002 | Hermans et al. |
| 6,379,496 | B2 | 4/2002 | Edwards et al. |
| 6,381,868 | B1 | 5/2002 | Grabscheid et al. |
| 6,413,368 | B1 | 7/2002 | Dwiggins et al. |
| 6,416,631 | B1 | 7/2002 | Beck |
| 6,419,793 | B1 | 7/2002 | Beck |
| 6,420,013 | B1 | 7/2002 | Vinson et al. |
| 6,432,267 | B1 | 8/2002 | Watson |
| 6,432,270 | B1 | 8/2002 | Liu et al. |
| 6,436,234 | B1 | 8/2002 | Chen et al. |
| 6,440,547 | B1 | 8/2002 | Luo et al. |
| 6,444,314 | B1 | 9/2002 | Luo et al. |
| 6,447,640 | B1 | 9/2002 | Watson et al. |
| 6,447,641 | B1 | 9/2002 | Wolkowicz et al. |
| 6,454,904 | B1 | 9/2002 | Hermans et al. |
| 6,461,474 | B1 | 10/2002 | Lindsay et al. |
| 6,464,829 | B1 | 10/2002 | Chen et al. |
| 6,471,727 | B2 | 10/2002 | Luo et al. |
| 6,478,927 | B1 | 11/2002 | Chen et al. |
| 6,491,788 | B2 | 12/2002 | Sealey, II et al. |
| 6,497,789 | B1 | 12/2002 | Hermans et al. |
| 6,500,302 | B2 | 12/2002 | Dwiggins et al. |
| 6,511,746 | B1 | 1/2003 | Collier et al. |
| 6,514,613 | B2 | 2/2003 | Luo et al. |
| 6,533,898 | B2 | 3/2003 | Gross |
| 6,534,151 | B2 | 3/2003 | Merker |
| 6,540,879 | B2 | 4/2003 | Marinack et al. |
| 6,544,912 | B1 | 4/2003 | Tanio et al. |
| 6,547,924 | B2 | 4/2003 | Klerelid et al. |
| 6,551,461 | B2 | 4/2003 | Hermans et al. |
| 6,558,511 | B2 | 5/2003 | Dwiggins et al. |
| 6,565,707 | B2 | 5/2003 | Behnke et al. |
| 6,573,204 | B1 | 6/2003 | Philipp et al. |
| 6,585,855 | B2 | 7/2003 | Drew et al. |
| 6,596,033 | B1 | 7/2003 | Luo et al. |
| 6,602,386 | B1 | 8/2003 | Takeuchi et al. |
| 6,607,638 | B2 | 8/2003 | Drew et al. |
| 6,610,173 | B1 | 8/2003 | Lindsay et al. |
| 6,624,100 | B1 | 9/2003 | Pike |
| 6,645,420 | B1 | 11/2003 | Beck |
| 6,645,618 | B2 | 11/2003 | Hobbs et al. |
| 6,660,362 | B1 | 12/2003 | Lindsay et al. |
| 6,669,821 | B2 | 12/2003 | Edwards et al. |
| 6,692,827 | B2 | 2/2004 | Luo et al. |
| 6,699,806 | B1 | 3/2004 | Takeuchi et al. |
| 6,701,637 | B2 | 3/2004 | Lindsay et al. |
| 6,706,237 | B2 | 3/2004 | Luo et al. |
| 6,706,876 | B2 | 3/2004 | Luo et al. |
| 6,709,548 | B2 | 3/2004 | Marinack et al. |
| 6,746,558 | B2 | 6/2004 | Hoeft et al. |
| 6,746,976 | B1 | 6/2004 | Urankar et al. |
| 6,749,718 | B2 | 6/2004 | Takai et al. |
| 6,752,907 | B2 | 6/2004 | Edwards et al. |
| 6,767,634 | B2 | 7/2004 | Krishnaswamy |
| 6,773,648 | B2 | 8/2004 | Luo et al. |
| 6,797,115 | B2 | 9/2004 | Klerelid et al. |
| 6,808,557 | B2 | 10/2004 | Holbrey et al. |
| 6,824,599 | B2 | 11/2004 | Swatloski et al. |
| 6,824,648 | B2 | 11/2004 | Edwards et al. |
| 6,827,819 | B2 | 12/2004 | Dwiggins et al. |
| 6,833,187 | B2 | 12/2004 | Luo et al. |
| 6,835,311 | B2 | 12/2004 | Koslow |
| 6,841,038 | B2 | 1/2005 | Horenziak et al. |
| 6,849,239 | B2 | 2/2005 | Morris |
| 6,861,023 | B2 | 3/2005 | Sealey, II et al. |
| 6,872,311 | B2 | 3/2005 | Koslow |
| 6,890,649 | B2 | 5/2005 | Hobbs et al. |
| 6,899,790 | B2 | 5/2005 | Lee |
| 6,951,895 | B1 | 10/2005 | Qin et al. |
| 6,964,117 | B2 | 11/2005 | Parent |
| 6,969,443 | B1 | 11/2005 | Kokko |
| 6,986,932 | B2 | 1/2006 | Zink et al. |
| 6,998,017 | B2 | 2/2006 | Lindsay et al. |
| 6,998,022 | B2 | 2/2006 | Hultcrantz |
| 7,037,405 | B2 | 5/2006 | Nguyen et al. |
| 7,067,444 | B2 | 6/2006 | Luo et al. |
| 7,070,678 | B2 | 7/2006 | Allen et al. |
| 7,083,704 | B2 | 8/2006 | Sealey, II et al. |
| 7,094,317 | B2 | 8/2006 | Lundberg et al. |
| 7,097,737 | B2 | 8/2006 | Luo et al. |
| 7,160,418 | B2 | 1/2007 | Edwards et al. |
| 7,195,694 | B2 | 3/2007 | Von Drach et al. |
| 7,210,205 | B2 | 5/2007 | Takeuchi et al. |
| 7,214,633 | B2 | 5/2007 | Sun et al. |
| 7,229,528 | B2 | 6/2007 | Vinson et al. |
| 7,241,711 | B2 | 7/2007 | Takai et al. |
| 7,250,382 | B2 | 7/2007 | Takai et al. |
| 7,258,764 | B2 | 8/2007 | Mauler |
| 7,276,166 | B2 | 10/2007 | Koslow |
| 7,276,459 | B1 | 10/2007 | Lang et al. |
| 7,296,691 | B2 | 11/2007 | Koslow |
| 7,300,543 | B2 | 11/2007 | Mullally et al. |
| 7,320,743 | B2 | 1/2008 | Freidbauer et al. |
| 7,381,294 | B2 | 6/2008 | Suzuki et al. |
| 7,387,706 | B2 | 6/2008 | Herman et al. |
| 7,399,378 | B2 | 7/2008 | Edwards et al. |
| 7,416,637 | B2 | 8/2008 | Murray et al. |
| 7,435,312 | B2 | 10/2008 | Lindsay et al. |
| 7,442,278 | B2 | 10/2008 | Murray et al. |
| 7,494,563 | B2 | 2/2009 | Edwards et al. |
| 7,503,998 | B2 | 3/2009 | Murray et al. |
| 7,563,344 | B2 | 7/2009 | Beuther et al. |
| 7,566,014 | B2 | 7/2009 | Koslow et al. |
| 7,585,388 | B2 | 9/2009 | Yeh et al. |
| 7,585,389 | B2 | 9/2009 | Yeh et al. |
| 7,585,392 | B2 | 9/2009 | Kokko et al. |
| 7,588,660 | B2 | 9/2009 | Edwards et al. |
| 7,588,661 | B2 | 9/2009 | Edwards et al. |
| 7,588,831 | B2 | 9/2009 | Akiyama et al. |
| 7,605,096 | B2 | 10/2009 | Tomarchio et al. |
| 7,608,164 | B2 | 10/2009 | Chou et al. |
| 7,651,589 | B2 | 1/2010 | Murray et al. |
| 7,655,112 | B2 | 2/2010 | Koslow |
| 7,662,255 | B2 | 2/2010 | Murray et al. |
| 7,662,257 | B2 | 2/2010 | Edwards et al. |
| 7,670,457 | B2 | 3/2010 | Murray et al. |
| 7,691,228 | B2 | 4/2010 | Edwards et al. |
| 7,691,760 | B2 | 4/2010 | Bergsten et al. |
| 7,700,764 | B2 | 4/2010 | Heijnesson-Hulten |
| 7,704,349 | B2 | 4/2010 | Edwards et al. |
| 7,718,036 | B2 | 5/2010 | Sumnicht et al. |
| 7,726,349 | B2 | 6/2010 | Mullally et al. |
| 7,744,723 | B2 | 6/2010 | Sheehan et al. |
| 7,758,723 | B2 | 7/2010 | Vinson et al. |
| 7,763,715 | B2 | 7/2010 | Hecht et al. |
| 7,785,443 | B2 | 8/2010 | Hermans et al. |
| 7,789,995 | B2 | 9/2010 | Super et al. |
| 7,794,566 | B2 | 9/2010 | Edwards et al. |
| 7,799,968 | B2 | 9/2010 | Chen et al. |

(56) References Cited

U.S. PATENT DOCUMENTS

| | | | |
|---|---|---|---|
| 7,811,418 | B2 | 10/2010 | Klerelid et al. |
| 7,820,008 | B2 | 10/2010 | Edwards et al. |
| 7,828,931 | B2 | 11/2010 | Edwards et al. |
| 7,850,823 | B2 | 12/2010 | Chou et al. |
| 7,871,493 | B2 | 1/2011 | Hermans et al. |
| 7,884,037 | B2 | 2/2011 | Sirovatka et al. |
| 7,888,412 | B2 | 2/2011 | Holbrey et al. |
| 7,918,964 | B2 | 4/2011 | Edwards et al. |
| 7,927,456 | B2 | 4/2011 | Murray et al. |
| 7,935,220 | B2 | 5/2011 | Edwards et al. |
| 7,951,264 | B2 | 5/2011 | Sumnicht |
| 7,951,266 | B2 | 5/2011 | Kokko et al. |
| 7,972,474 | B2 | 7/2011 | Underhill et al. |
| 7,985,321 | B2 | 7/2011 | Sumnicht et al. |
| 7,998,313 | B2 | 8/2011 | Kokko |
| 8,012,312 | B2 | 9/2011 | Goto et al. |
| 8,022,267 | B2 | 9/2011 | Hellstrom et al. |
| 8,030,231 | B2 | 10/2011 | Lange et al. |
| 8,066,849 | B2 | 11/2011 | Kokko et al. |
| 8,105,463 | B2 | 1/2012 | Goulet et al. |
| 8,142,612 | B2 | 3/2012 | Murray et al. |
| 8,152,957 | B2 | 4/2012 | Edwards et al. |
| 8,152,958 | B2 | 4/2012 | Super et al. |
| 8,177,938 | B2 | 5/2012 | Sumnicht |
| 8,187,421 | B2 | 5/2012 | Sumnicht et al. |
| 8,187,422 | B2 | 5/2012 | Sumnicht et al. |
| 8,216,425 | B2 | 7/2012 | Sumnicht et al. |
| 8,226,797 | B2 | 7/2012 | Murray et al. |
| 8,257,552 | B2 | 9/2012 | Edwards et al. |
| 8,293,072 | B2 | 10/2012 | Super et al. |
| 8,318,859 | B2 | 11/2012 | Amano et al. |
| 2002/0162635 | A1 | 11/2002 | Hsu et al. |
| 2002/0168912 | A1 | 11/2002 | Bond et al. |
| 2002/0187307 | A1 | 12/2002 | Tanaka et al. |
| 2003/0099821 | A1 | 5/2003 | Takai et al. |
| 2003/0100240 | A1 | 5/2003 | Takai et al. |
| 2003/0111195 | A1 | 6/2003 | Hu |
| 2003/0144640 | A1 | 7/2003 | Nguyen |
| 2003/0157351 | A1 | 8/2003 | Swatloski et al. |
| 2003/0168401 | A1 | 9/2003 | Koslow |
| 2003/0177909 | A1 | 9/2003 | Koslow |
| 2003/0178166 | A1 | 9/2003 | Takeuchi et al. |
| 2003/0200991 | A1 | 10/2003 | Keck et al. |
| 2003/0203695 | A1 | 10/2003 | Polanco et al. |
| 2004/0038031 | A1 | 2/2004 | Holbrey et al. |
| 2004/0103507 | A1 | 6/2004 | Takeuchi et al. |
| 2004/0203306 | A1 | 10/2004 | Grafe et al. |
| 2004/0207110 | A1 | 10/2004 | Luo et al. |
| 2004/0238135 | A1 | 12/2004 | Edwards et al. |
| 2004/0248494 | A1 | 12/2004 | Hartgrove et al. |
| 2004/0256066 | A1 | 12/2004 | Lindsay et al. |
| 2005/0074542 | A1 | 4/2005 | Lundberg et al. |
| 2005/0136772 | A1 | 6/2005 | Chen et al. |
| 2005/0148264 | A1 | 7/2005 | Varona et al. |
| 2005/0176326 | A1 | 8/2005 | Bond et al. |
| 2005/0268274 | A1 | 12/2005 | Beuther et al. |
| 2005/0274469 | A1 | 12/2005 | Lundberg et al. |
| 2005/0288484 | A1 | 12/2005 | Holbrey et al. |
| 2006/0088696 | A1 | 4/2006 | Manifold et al. |
| 2006/0090271 | A1 | 5/2006 | Price et al. |
| 2006/0141881 | A1 | 6/2006 | Bergsten et al. |
| 2006/0207722 | A1 | 9/2006 | Amano et al. |
| 2006/0240727 | A1 | 10/2006 | Price et al. |
| 2006/0240728 | A1 | 10/2006 | Price et al. |
| 2006/0241287 | A1 | 10/2006 | Hecht et al. |
| 2007/0062656 | A1 | 3/2007 | Murray et al. |
| 2007/0137807 | A1 | 6/2007 | Schulz et al. |
| 2007/0137814 | A1 | 6/2007 | Gao |
| 2007/0224419 | A1 | 9/2007 | Sumnicht et al. |
| 2007/0228064 | A1 | 10/2007 | Brennan et al. |
| 2007/0232180 | A1 | 10/2007 | Polat et al. |
| 2008/0008865 | A1 | 1/2008 | Luu et al. |
| 2008/0029235 | A1 | 2/2008 | Edwards et al. |
| 2008/0057307 | A1 | 3/2008 | Koslow et al. |
| 2008/0076313 | A1 | 3/2008 | Uitenbroek et al. |
| 2008/0145664 | A1 | 6/2008 | Sirovatka et al. |
| 2008/0173418 | A1 | 7/2008 | Sumnicht et al. |
| 2008/0173419 | A1 | 7/2008 | Sumnicht |
| 2008/0311815 | A1 | 12/2008 | Gupta et al. |
| 2009/0020139 | A1 | 1/2009 | Sumnicht et al. |
| 2009/0020248 | A1 | 1/2009 | Sumnicht et al. |
| 2009/0120598 | A1 | 5/2009 | Edwards et al. |
| 2009/0120599 | A1 | 5/2009 | Nguyen |
| 2009/0126884 | A1 | 5/2009 | Murray et al. |
| 2009/0151881 | A1 | 6/2009 | Nguyen |
| 2009/0159224 | A1 | 6/2009 | Chou et al. |
| 2009/0259208 | A1 | 10/2009 | Hellstrom et al. |
| 2009/0308551 | A1 | 12/2009 | Kokko et al. |
| 2010/0065235 | A1 | 3/2010 | Fike et al. |
| 2010/0098919 | A1 | 4/2010 | Hartgrove et al. |
| 2010/0136268 | A1 | 6/2010 | Rasch |
| 2010/0186913 | A1 | 7/2010 | Super et al. |
| 2010/0212850 | A1 | 8/2010 | Sumnicht et al. |
| 2010/0236735 | A1 | 9/2010 | Goulet et al. |
| 2010/0272938 | A1 | 10/2010 | Mitchell et al. |
| 2010/0282423 | A1 | 11/2010 | Super et al. |
| 2010/0288456 | A1 | 11/2010 | Westland et al. |
| 2011/0011545 | A1 | 1/2011 | Edwards et al. |
| 2011/0155337 | A1 | 6/2011 | Murray et al. |
| 2011/0265965 | A1 | 11/2011 | Sumnicht et al. |
| 2011/0272304 | A1 | 11/2011 | Wahal et al. |
| 2012/0021178 | A1 | 1/2012 | Miller et al. |
| 2012/0080155 | A1 | 4/2012 | Konishi et al. |
| 2012/0180815 | A1 | 7/2012 | Sumnicht et al. |
| 2012/0241113 | A1 | 9/2012 | Super et al. |
| 2013/0029105 | A1* | 1/2013 | Miller et al. .................. 428/172 |
| 2013/0029106 | A1* | 1/2013 | Lee et al. ...................... 428/172 |

FOREIGN PATENT DOCUMENTS

| | | | |
|---|---|---|---|
| EP | 0279465 | A2 | 8/1988 |
| EP | 0399522 | A2 | 11/1990 |
| EP | 0485360 | A2 | 5/1992 |
| EP | 1036880 | A1 | 3/2000 |
| EP | 1302146 | A2 | 4/2003 |
| GB | 978953 | A | 1/1965 |
| GB | 2319537 | A | 5/1998 |
| GB | 2412083 | A | 9/2005 |
| JP | 8003890 | A | 1/1996 |
| RU | 2127343 | C1 | 3/1999 |
| RU | 2143508 | C1 | 12/1999 |
| RU | 2144101 | C1 | 1/2000 |
| RU | 2183648 | C2 | 6/2002 |
| RU | 2226231 | C1 | 3/2004 |
| RU | 2328255 | C2 | 7/2008 |
| WO | 95/35399 | A1 | 12/1995 |
| WO | 96/06223 | A1 | 2/1996 |
| WO | 97/43484 | A1 | 11/1997 |
| WO | 98/03710 | A1 | 1/1998 |
| WO | 98/07914 | A1 | 2/1998 |
| WO | 00/14330 | A1 | 3/2000 |
| WO | 00/36212 | A2 | 6/2000 |
| WO | 00/40405 | A1 | 7/2000 |
| WO | 02/02869 | A2 | 1/2002 |
| WO | 02/40769 | A2 | 5/2002 |
| WO | 2004/033793 | A2 | 4/2004 |
| WO | 2005/010273 | A1 | 2/2005 |
| WO | 2005/106117 | A1 | 11/2005 |
| WO | 2006/113025 | A2 | 10/2006 |
| WO | 2006/115817 | A2 | 11/2006 |
| WO | 2007/001837 | A2 | 1/2007 |
| WO | 2007/109259 | A2 | 9/2007 |
| WO | 2007/139726 | A1 | 12/2007 |
| WO | 2008/045770 | A2 | 4/2008 |
| WO | 2008/156454 | A1 | 12/2008 |
| WO | 2009/038730 | A1 | 3/2009 |
| WO | 2009/038735 | A1 | 3/2009 |
| WO | 2010/088359 | A1 | 8/2010 |
| WO | 2011/069532 | A1 | 6/2011 |

OTHER PUBLICATIONS

Keller, D.S. and J.J. Pawlak, "B(Beta)-Radiographic Imaging of Paper Formation Using Storage Phosphor Screens," Journal of Pulp and Paper Science, vol. 27, No. 4, Apr. 2001, pp. 117-123.

(56) References Cited

OTHER PUBLICATIONS

Ozturk, Hale Bahar and Thomas Bechtold, "Splitting Tendency of Cellulosic Fibers," Lenzinger Berichte, 84, 2005, pp. 123-129.
Sung, Y.J., et al., "Applications of Thickness and Apparent Density Mapping by Laser Profilometry," 13th Fundamental Research Symposium, Cambridge, Sep. 2005, pp. 961-1007.
Klerelid, Ingvar and Ola Thomasson, "Advantge (TM) NTT (TM): low energy, high quality," Tissue World, Oct./Nov. 2008, pp. 49-52.
International Search Report and Written Opinion of the International Searching Authority issued in PCT/US07/06892, mailed Jun. 4, 2008.
International Search Report and Written Opinion of the International Searching Authority issued in PCT/US08/10840, mailed Dec. 1, 2008.
International Search Report and Written Opinion of the International Searching Authority issued in PCT/US08/10833, mailed Dec. 12, 2008.
International Search Report and Written Opinion of the International Searching Authority issued in PCT/US2009/057078, mailed Jul. 2, 2010.
Miller, Bernard and Ilya Tyomkin. "Liquid Porosimetry: New Methodology and Applications," Journal of Colloid and Interface Science, 1994, 162, pp. 163-170, TRI/Princeton.
Gooding, R.W., and J.A. Olson. "Fractionation in a Bauer-McNett Classifier," Journal of Pulp and Paper Science, Dec. 12, 2001, vol. 27, No. 12, pp. 423-428.
Imperator, Giovanni, et al. "Low-mleting sugar-urea-salt mixtures as solvents for Diels-Alder reactions," Chemical Communications, 2005, Issue 9, pp. 1170-1172, RSC Publishing.

* cited by examiner

FRFC, 50% CMF

CELL 2, 0% CMF

FRFC, 50% CMF

CELL 2, 0% CMF

FRFC, 50% CMF

CELL 2, 0% CMF

FRBC, 40% CMF

TAD, 0% CMF

FRBC, 40% CMF

TAD, 0% CMF

FRBC, 40% CMF

TAD, 0% CMF

CWP, 50% CMF

CWP, 0% CMF

CWP, 50% CMF

CWP, 0% CMF

CWP, 50% CMF

CWP, 0% CMF

WIPE DRY TIMES FOR FRBC TWO-PLY WIPER

PORE VOLUME DISTRIBUTION SAMPLE CONFIGURATION

BELT-CREPED WIPER EMBOSS PATTERN

CD WET TENSILE STRENGTH (FINCH) VERSUS CALIPER

SENSORY SOFTNESS VERSUS CD WET TENSILE STRENGTH

18" Hg, VACUUM, UNCALENDERED, BELT 50, MD

18" Hg VACUUM, UNCALENDERED, BELT 50, MD

18" Hg VACUUM, CALENDERED, BELT 50, MD 700
758
760

MULTI-PLY WIPER/TOWEL PRODUCT WITH CELLULOSIC MICROFIBERS

CROSS-REFERENCE TO RELATED APPLICATIONS AND INCORPORATION BY REFERENCE

This application is a continuation application of U.S. patent application Ser. No. 13/137,216, filed Jul. 28, 2011 now U.S. Pat. No. 8,540,846, and published as U.S. Patent Application Publication No. 2012/0021178, on Jan. 26, 2012, which is a continuation in part of U.S. patent application Ser. No. 12/694,650, entitled "Belt-Creped, Variable Local Basis Weight Absorbent Sheet Prepared With Perforated Polymeric Belt", now U.S. Pat. No. 8,293,072, which was based upon U.S. Provisional Patent Application No. 61/206,146 of the same title, filed Jan. 28, 2009, the right of priority of the foregoing being hereby claimed. All of the foregoing applications are incorporated herein by reference.

This application relates to the subject matter of U.S. Patent Application Publication No. 2009/0020139, published Jan. 22, 2009, based on U.S. patent application Ser. No. 12/284,148, filed Sep. 17, 2008, now U.S. Pat. No. 8,187,422, entitled "High Efficiency Disposable Cellulosic Wiper". This application also relates to the subject matter of U.S. Patent Application Publication No. 2009/0020248, published Jan. 22, 2009, based on U.S. patent application Ser. No. 12/284,147, also filed Sep. 17, 2008, now U.S. Pat. No. 8,187,421, entitled "Absorbent Sheet Incorporating Regenerated Cellulose Microfiber". Both U.S. patent application Ser. Nos. 12/284,148 and 12/284,147 were based, in part, on U.S. patent application Ser. No. 11/725,253, filed Mar. 19, 2007, entitled "Absorbent Sheet Having Regenerated Cellulose Microfiber Network", now U.S. Pat. No. 7,718,036. This application also relates, in part, to the subject matter of the following U.S. Provisional Patent Applications:

(1) Provisional Application No. 60/784,228, filed Mar. 21, 2006;

(2) Provisional Application No. 60/850,467, filed Oct. 10, 2006;

(3) Provisional Application No. 60/850,681, filed Oct. 10, 2006; and (4) Provisional Application No. 60/881,310, filed on Jan. 19, 2007;

(5) Provisional Application No. 60/994,344, filed Sep. 19, 2007; and (6) Provisional Application No. 60/994,483, filed Sep. 19, 2007.

The disclosures of the foregoing applications are incorporated herein by reference in their entireties.

BACKGROUND

Lyocell fibers are typically used in textiles or filter media. See, for example, U.S. Patent Application Publication No. 2003/0177909, now U.S. Pat. No. 6,872,311, and No. 2003/0168401, now U.S. Pat. No. 6,835,311, both to Koslow, as well as to U.S. Pat. No. 6,511,746 to Collier et al. On the other hand, high efficiency wipers for cleaning glass and other substrates are typically made from thermoplastic fibers.

U.S. Pat. No. 6,890,649 to Hobbs et al. (3M) discloses polyester microfibers for use in a wiper product. According to the '649 patent, the microfibers have an average effective diameter of less than 20 microns and, generally, from 0.01 microns to 10 microns. See column 2, lines 38-40. These microfibers are prepared by fibrillating a film surface and then harvesting the fibers.

U.S. Pat. No. 6,849,329 to Perez et al. discloses microfibers for use in cleaning wipes. These fibers are similar to those described in the '649 patent discussed above. U.S. Pat. No. 6,645,618 to Hobbs et al. also discloses microfibers in fibrous mats such as those used for removal of oil from water or those used as wipers.

U.S. Patent Application Publication No. 2005/0148264 to Varona et al., discloses a wiper with a bimodal pore size distribution. The wipe is made from melt blown fibers, as well as coarser fibers, and papermaking fibers. See page 2, paragraph 16.

U.S. Patent Application Publication No. 2004/0203306 to Grafe et al., discloses a flexible wipe including a non-woven layer and at least one adhered nanofiber layer. The nanofiber layer is illustrated in numerous photographs. It is noted on page 1, paragraph 9, that the microfibers have a fiber diameter of from about 0.05 microns to about 2 microns. In this patent application, the nanofiber webs were evaluated for cleaning automotive dashboards, automotive windows, and so forth. For example, see page 8, paragraphs 55, 56.

U.S. Pat. No. 4,931,201 to Julemont discloses a non-woven wiper incorporating melt-blown fiber. U.S. Pat. No. 4,906,513 to Kebbell et al. also discloses a wiper having melt-blown fiber. Here, polypropylene microfibers are used, and the wipers are reported to provide streak-free wiping properties. This patent is of general interest, as is U.S. Pat. No. 4,436,780 to Hotchkiss et al., which discloses a wiper having a layer of melt-blown polypropylene fibers and, on either side, a spun bonded polypropylene filament layer. See also U.S. Pat. No. 4,426,417 to Meitner et al., which discloses a non-woven wiper having a matrix of non-woven fibers including microfiber and staple fiber. U.S. Pat. No. 4,307,143 to Meitner discloses a low cost wiper for industrial applications, which includes thermoplastic, melt-blown fibers.

U.S. Pat. No. 4,100,324 to Anderson et al. discloses a non-woven fabric useful as a wiper that incorporates wood pulp fibers.

U.S. Patent Application Publication No. 2006/0141881, now U.S. Pat. No. 7,691,760, to Bergsten et al., discloses a wipe with melt-blown fibers. This publication also describes a drag test, at pages 7 and 9. Note, for example, page 7, paragraph 59. According to the test results on page 9, microfiber increases the drag of the wipes on a surface.

U.S. Patent Application Publication No. 2003/0200991 to Keck et al., discloses a dual texture absorbent web. Note pages 12 and 13, which describe cleaning tests and a Gardner wet abrasion scrub test.

U.S. Pat. No. 6,573,204 to Philipp et al. discloses a cleaning cloth having a non-woven structure made from micro staple fibers of at least two different polymers, and secondary staple fibers bound into the micro staple fibers. The split fiber is reported to have a titer of 0.17 to 3.0 dtex prior to being split. See column 2, lines 7 through 9. Note also, U.S. Pat. No. 6,624,100 to Pike, which discloses splittable fiber for use in microfiber webs.

TECHNICAL FIELD

This application relates to multi-ply wipers comprising at least one variable local basis weight absorbent sheet including a significant proportion of fibrillated cellulosic microfibers having a plurality of arched or domed regions interconnected by a generally planar, densified fibrous network including at least some areas of consolidated fibers bordering the domed areas. The domed regions have a leading edge with a relatively high local basis weight and, at their lower portions, transition sections that include upwardly and inwardly inflected sidewall areas of consolidated fibers.

While there have been advances in the art as to high efficiency wipers, existing products tend to be relatively difficult and expensive to produce. Many do not have the absorbent capacity of premium paper towels and are not readily repulped or recycled. Moreover, the wipers of the invention are capable of removing micro-particles and, if not substantially all of the residue from a surface, then, at least almost all, reducing the need for biocides and cleaning solutions in typical cleaning or sanitizing operations.

SUMMARY OF THE INVENTION

The present invention is directed, in part, to multi-ply absorbent sheets incorporating cellulose microfibers that are suitable for paper towels and wipers. The sheets exhibit high absorbency (SAT) values as well as low-residue, "wipe-dry" characteristics. The sheets can accordingly be used as high efficiency wipers, or as ordinary paper towels, eliminating the need for multiple products.

In one embodiment, the present invention is a multi-ply absorbent sheet exhibiting a wipe-dry time of less than 20 seconds, preferably, 10 seconds or less, and an SAT capacity in the range of 9.5 to 11 g/g. In a further embodiment, the absorbent sheet exhibits an SAT rate in the range of 0.05 to 0.25 $g/s^{0.5}$.

A preferred variable basis weight ply is prepared by a belt-creping process including compactively dewatering a nascent web containing from about 10% to about 60% of fibrillated cellulosic microfibers, applying the dewatered web to a transfer surface with an apparently random distribution of fibers, and belt-creping the web under pressure with nip parameters selected so as to rearrange the fiber orientation and, optionally, providing local basis weight variation. The plies of this invention will exhibit a repeating structure of raised arched portions that define hollow areas on their opposite side. The raised arched portions or domes have a relatively high local basis weight interconnected with a network of densified fibers. Transition areas bridging the connecting regions and the domes include upwardly and optionally inwardly inflected consolidated fibers. Generally speaking, the furnish is selected and the steps of belt creping, applying vacuum, and drying are controlled such that a dried web is formed having a plurality of fiber-enriched hollow domed regions protruding from the upper surface of the sheet, the hollow domed regions having a sidewall of a relatively high local basis weight formed along at least a leading edge thereof, and connecting regions forming a network interconnecting the fiber-enriched hollow domed regions of the sheet, wherein consolidated groupings of fibers extend upwardly from the connecting regions into the sidewalls of the fiber-enriched hollow domed regions along at least the leading edge thereof. Fibrillated cellulosic microfibers present at the surface of such consolidated groupings form venation over the surface of the consolidated grouping, while fibrillated cellulosic microfibers present within the consolidated groupings appear to enhance the bonding and consolidation therein, both apparently contributing to an increase in very small pores in the sheet structure. Preferably, such consolidated groupings of fibers are present at least at the leading and trailing edges of the domed areas. In many cases, the consolidated groupings of fibers form saddle shaped regions extending at least partially around the domed areas, wherein a venation of cellulosic microfibers extends over the surface of the consolidated regions. In other less consolidated regions of the ply, the fibrillated cellulosic microfibers are present as intermittently bonded fibers distributed through less consolidated regions of the ply, and intermingled with conventional papermaking fibers therein, and bonded thereto largely at crossover regions where the fibers contact.

The superior wipe-dry characteristics of the inventive products are surprising in view of the very low SAT rates observed. FIGS. 1A to 1H, 1J to IN, and 1P to 1T are photomicrographs illustrating the microstructure at a surface of multi-ply products of the invention (FIGS. 1G, 1J, and 1L), along with a variety of somewhat similar products. It is considered to be quite surprising that such greatly improved wipe dry characteristics can be observed when apparent porosity is suppressed to the extreme shown here. Without intending to be bound by theory, it is believed that the microfiber venation seen on the surfaces of the consolidated regions in the inventive products FIGS. 1G, 1J, and 1L (formed by creping from a transfer drum using a perforated polymeric belt) provides a very slow observed SAT rate and a high capillary pressure due to a large percentage of very small, easily accessible pores, as described hereafter, as well as the large number of very small pores distributed throughout the consolidated groupings. The inventive products are remarkably efficient wipers for cleaning surfaces, leaving little, if any, residue, thus, providing streak-free cleaning that is especially desirable for glass and glossy surfaces, and much preferred for sanitation purposes. Briefly, "Wipe Dry" is the time it takes for residual Windex® original glass cleaner to evaporate from a plate after a wiper substrate is dragged across a wetted surface. Low values indicate less residual liquid that results in less streaking. Without being bound by theory, it is hypothesized that Campbell's forces draw the fibrillated cellulosic microfibers into rather intimate adhesion to the consolidated fibrous regions, so that rather than bonds being formed only at crossover points between fibers, in areas of venation, line-surface adhesion can be observed between the fibrillated cellulosic microfibers and the underlying consolidated fibrous region, creating numerous highly accessible micropores therebetween, contributing to the excellent wipe dry properties. In any event, the sheets of the present invention formed by creping from a transfer surface using perforated polymeric belts exhibit both remarkable microporosity and remarkably quick wipe dry times, while maintaining satisfactory SAT capacity. Overall, sheets that are more highly consolidated exhibit shorter wipe dry times than more open sheets.

The products of the invention also exhibit wet tensiles significantly above those of commercial towel products, but have similar SAT capacity, so that the wipe-dry characteristics endure as the product absorbs liquid. FIG. 2 shows the combined attributes of wipe-dry, absorbency, and wet strength achieved in a two-ply product of the invention. Wipe-dry times approach 10 seconds or less with a cellulosic microfibers (CMF) content of 40% as compared to 25 to 30 seconds for a conventional towel.

While exhibiting very high strength, the products of the invention also exhibit an unexpectedly high level of softness, as is appreciated from FIG. 3, which illustrates softness as a function of wet tensile and cellulosic microfibers (CMF) content. It is seen in FIG. 3 that elevated softness levels are achieved even at wet tensiles, more than twice that of conventional towel. Preferred products of the present invention will exhibit a differential pore volume for pores under 5 microns in a diameter of at least about 75 $mm^3$/g/micron.

Further details and advantages will become apparent from the discussion provided hereafter.

BRIEF DESCRIPTION OF THE DRAWINGS

The invention is described with reference to the drawings, wherein.

DETAILED DESCRIPTION OF THE INVENTION

Figure 1A:
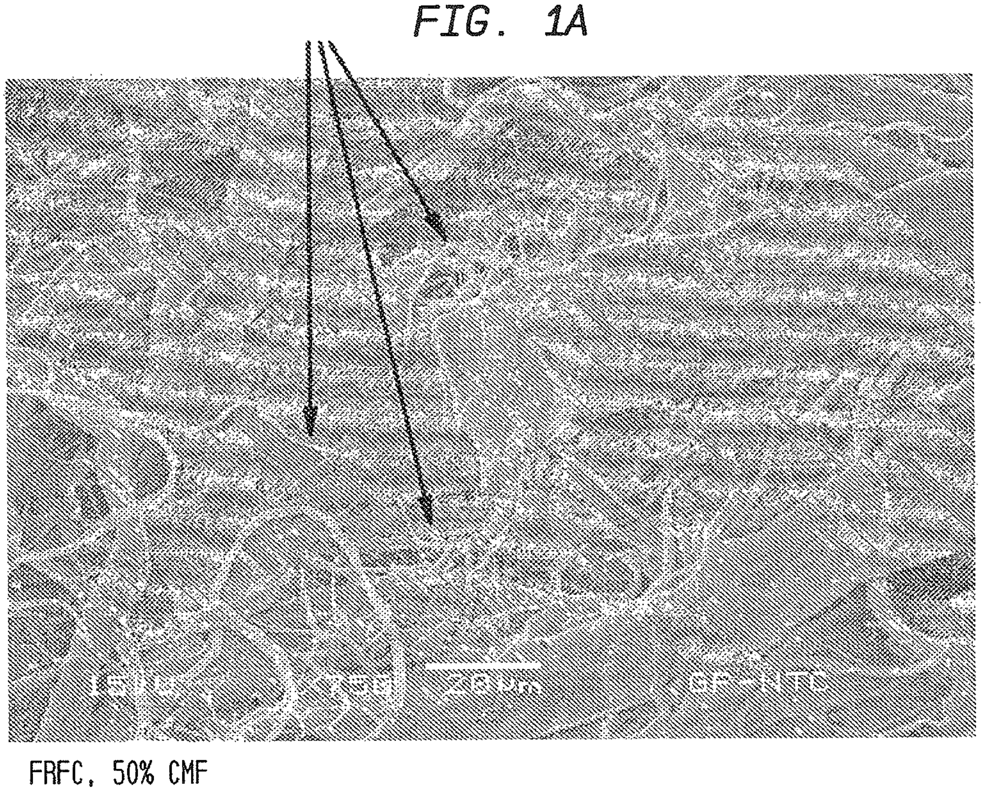
FIGS. 1A, 1C, and 1E illustrate cellulose microfibers (CMF) containing wipers formed by creping a nascent web from a transfer cylinder using a creping fabric and are placed for easy comparison of these to similarly formed wipers without CMF, in FIGS. 1B, 1D and 1F.
Figure 1B:
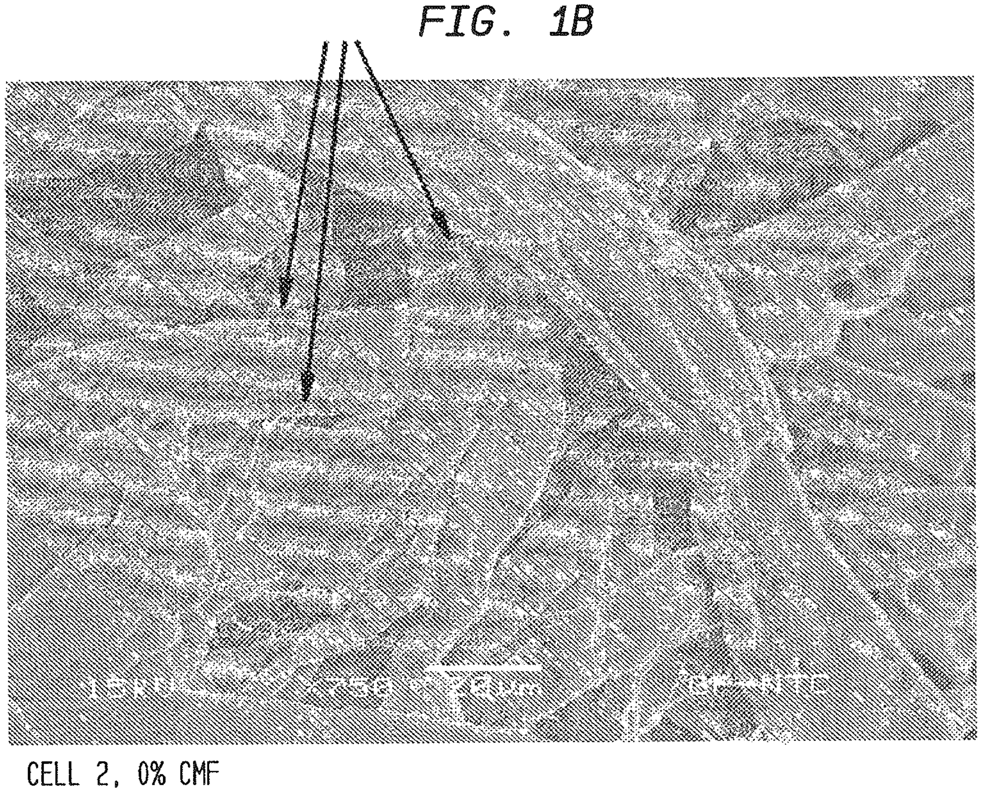
FIGS. 1G, 1J, and 1L illustrate venation on CMF containing wipers formed by creping a nascent web from a transfer cylinder using a perforated polymeric creping belt and are placed for easy comparison of those to through-air dried (TAD) formed wipers, without CMF, in FIGS. 1H, 1K, and 1M.
FIGS. 1N, 1Q, and 1S illustrate CMF containing wipers formed by conventional wet press technology and are placed for easy comparison of these to similarly formed wipers, without CMF, in FIGS. 1P, 1R, and 1T.
Figure 1C:
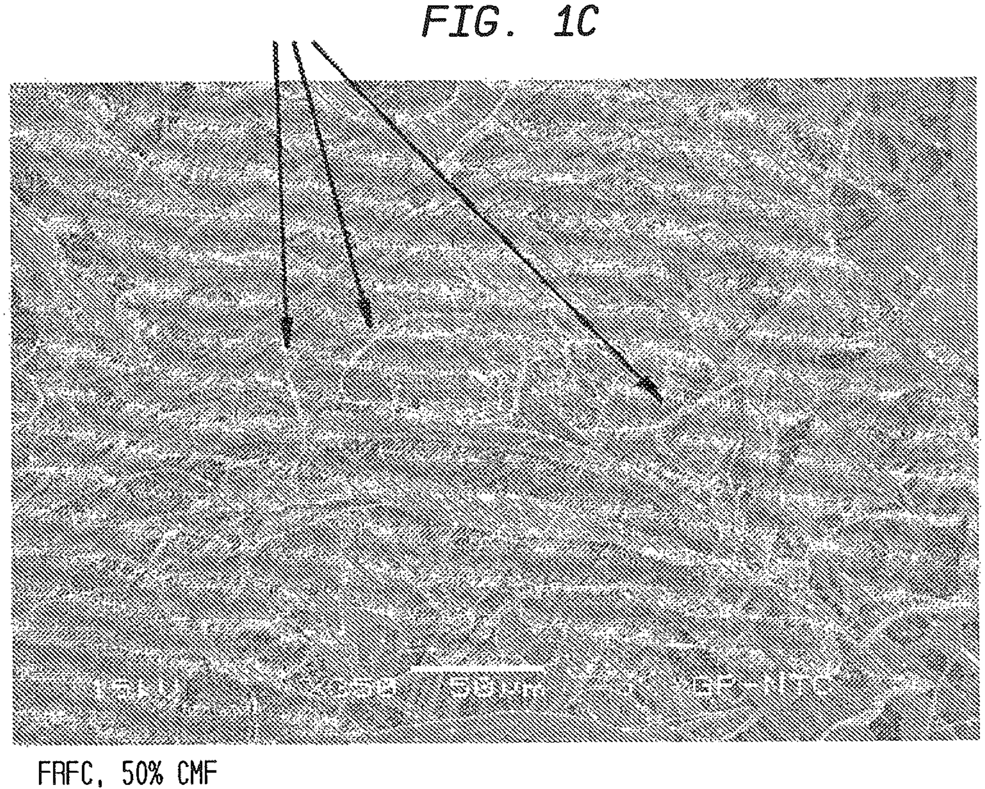
Figure 1D:
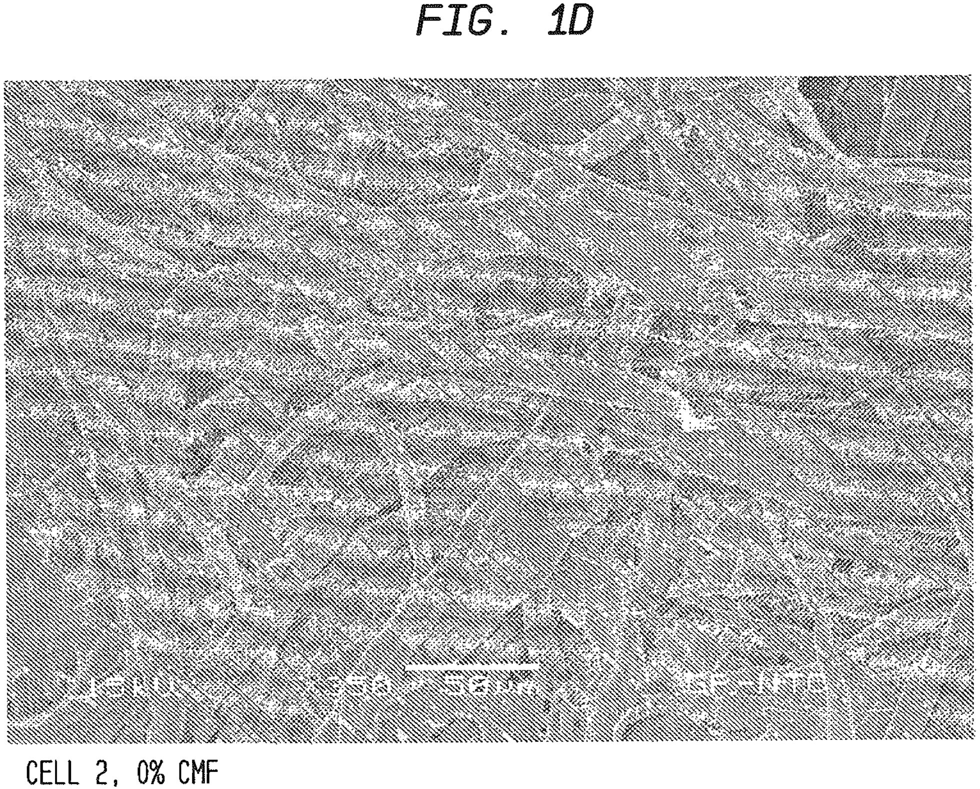
Figure 1E:
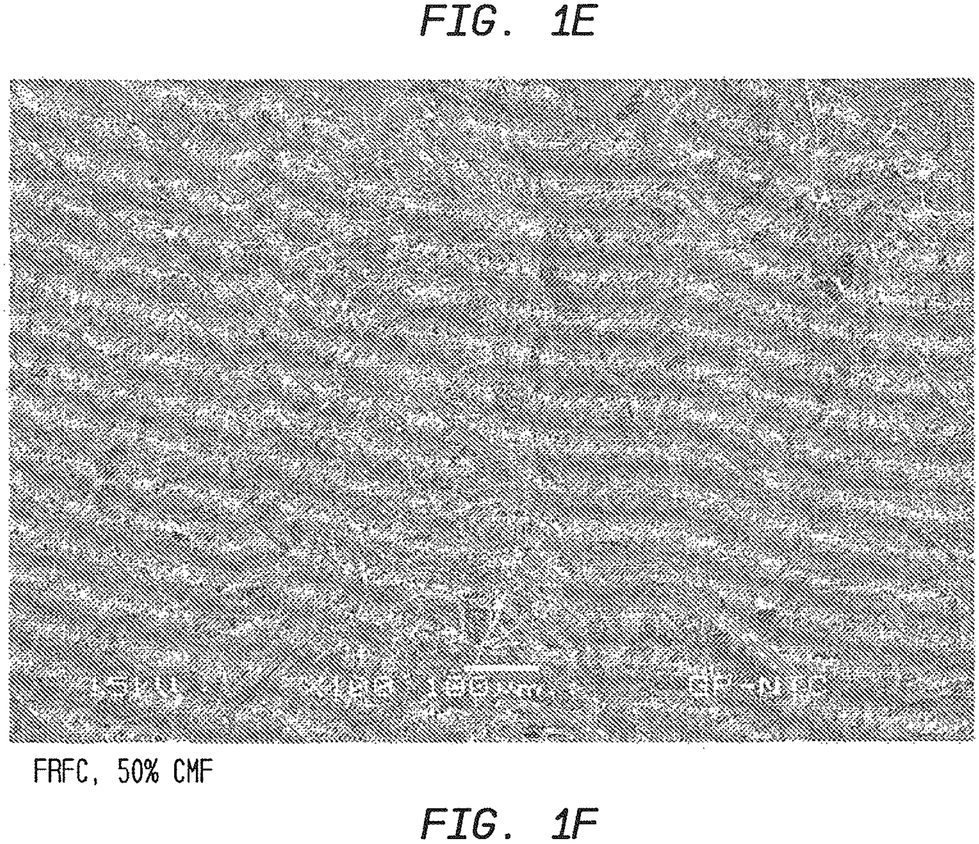
Figure 1F:
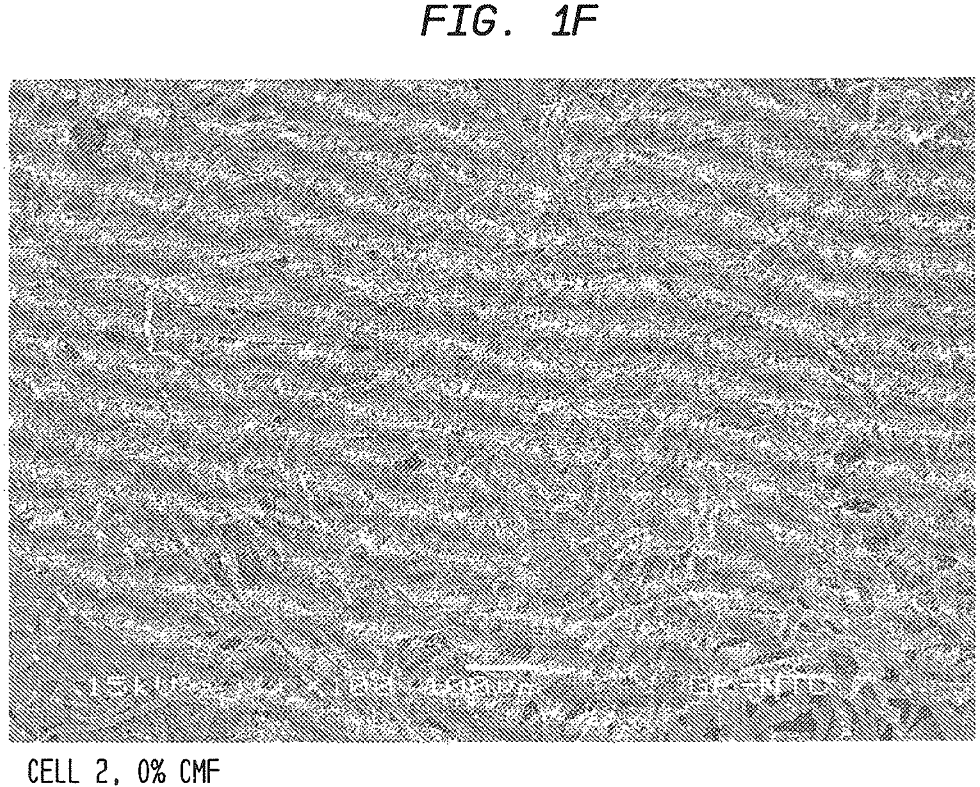

The invention is described in detail below with reference to several embodiments and numerous examples. Such a discussion is for purposes of illustration only. Modifications to particular examples within the spirit and scope of the present invention, set forth in the appended claims, will be readily apparent to one of skill in the art.

Terminology used herein is given its ordinary meaning, for example, mils refers to thousandths of an inch, mg refers to milligrams and $m^2$ refers to square meters, percent means weight percent (dry basis), "ton" means short ton (2000 pounds), unless otherwise indicated "ream" means 3000 $ft^2$, and so forth. A "ton" is 2000 pounds while a "tonne" is a metric ton of 100 kg or 2204.62 pounds. Unless otherwise specified, in an abbreviation "t" stands for 'ton". Unless otherwise specified, the version of a test method applied is that in effect as of Jan. 1, 2010, and test specimens are prepared under standard TAPPI conditions, that is, preconditioned for 24 hours, then conditioned in an atmosphere of 23°±1.0° C. (73.4°±1.8° F.) at 50% relative humidity for at least about 2 hours.

Test methods, materials, equipment, manufacturing techniques, and terminology are those enumerated in the applications referred to above as supplemented herein.

Throughout this specification and claims, when we refer to a nascent web having an apparently random distribution of fiber orientation (or use like terminology), we are referring to the distribution of fiber orientation that results when known forming techniques are used for depositing a furnish on the forming fabric. When examined microscopically, the fibers give the appearance of being randomly oriented, even though, depending on the jet to wire speed ratio, there may be a significant bias toward machine direction orientation making the machine direction tensile strength of the web exceed the cross machine direction tensile strength.

In many applications related to U.S. Patent Application Publication No. 2004/0238135, entitled "Fabric Crepe Process for Making Absorbent Sheet", now U.S. Pat. No. 7,399, 378, the importance of the distinction between creping using a woven fabric and a creping belt formed by perforating a solid belt was of minor importance, so the term "belt" could apply to either creping medium. In this application, however, as well as in U.S. Patent Application Publication No. 2010/0186913, entitled "Belt-Creped, Variable Local Basis Weight Absorbent Sheet Prepared With Perforated Polymeric Belt", now U.S. Pat. No. 8,293,072, the distinction between the use of a creping fabric and a perforated polymeric belt is of considerable importance, as it has been found that the use of a perforated polymeric belt makes it possible to obtain consolidated regions, particularly, consolidated saddle shaped regions, in the web giving, it improved physical properties over the webs previously formed using the technique of creping from a transfer drum. For convenience, we refer to this method of forming a sheet as Fiber Reorienting Belt Creping or FRBC. Further, in this application, it is demonstrated that CMF containing wipers made using a perforated polymeric belt have substantial performance advantages over wipers made using a woven creping fabric, which we term Fiber Reorienting Fabric Creping or FRFC. Throughout this application, we have endeavored to make this distinction explicit, but, definitional language in applications incorporated by reference notwithstanding, in this application, belts and creping fabrics should not be considered to be synonymous.

Unless otherwise specified, "basis weight", BWT, bwt, BW, and so forth, refers to the weight of a 3000 square-foot (278.7 $m^2$) ream of product (basis weight is also expressed in $g/m^2$ or gsm). Likewise, "ream" means a 3000 square-foot (278.7 $m^2$) ream unless otherwise specified. Local basis weights and differences therebetween are calculated by measuring the local basis weight at two or more representative low basis weight areas within the low basis weight regions and comparing the average basis weight to the average basis weight at two or more representative areas within the relatively high local basis weight regions. For example, if the representative areas within the low basis weight regions have an average basis weight of 15 lbs/3000 $ft^2$ (24.5 $g/m^2$) ream and the average measured local basis weight for the representative areas within the relatively high local basis regions is 20 lbs/3000 $ft^2$ ream (32.6 $g/m^2$), the representative areas within the high local basis weight regions have a characteristic basis weight of ((20−15)/15)×100% or 33% higher than the representative areas within the low basis weight regions. Preferably, the local basis weight is measured using a beta particle attenuation technique as referenced herein. In some cases, X-ray techniques can be suitable, provided that the X-rays are sufficiently "soft"—that the energy of the photons is sufficiently low and the basis weight differences between the various regions of the sheet are sufficiently high that significant differences in attenuation are attained.

Calipers and/or bulk reported herein may be measured at 8 or 16 sheet calipers as specified. The sheets are stacked and the caliper measurement taken about the central portion of the stack. Preferably, the test samples are conditioned in an atmosphere of 23°±1.0° C. (73.4°±1.8° F.) at 50% relative humidity for at least about 2 hours and then measured with a Thwing-Albert Model 89-II-JR or Progage Electronic Thickness Tester with 2 in. (50.8-mm) diameter anvils, 539±10 grams dead weight load, and 0.231 in/sec (5.87 mm/sec) descent rate. For finished product testing, each sheet of product to be tested must have the same number of plies as the product as sold. For testing in general, eight sheets are selected and stacked together. For napkin testing, napkins are unfolded prior to stacking. For base sheet testing off of winders, each sheet to be tested must have the same number of plies as produced off of the winder. For base sheet testing off of the papermachine reel, single plies must be used. Sheets are stacked together aligned in the machine direction (MD). Bulk may also be expressed in units of volume/weight by dividing caliper by basis weight.

Consolidated fibrous structures are those that have been so highly densified that the fibers therein have been compressed to ribbon-like structures and the void volume is reduced to levels approaching or perhaps even less than those found in flat papers, such as are used for communications purposes. In preferred structures, the fibers are so densely packed and closely matted that the distance between adjacent fibers is typically less than the fiber width, often less than half or even less than a quarter of the fiber width. In the most preferred structures, the fibers are largely collinear and strongly biased in the MD. The presence of consolidated fibers or consolidated fibrous structures can be confirmed by examining thin sections that have been embedded in resin, then microtomed in accordance with known techniques. Alternatively, if SEM's of both faces of a region are so heavily matted as to resemble flat paper, then that region can be considered to be consolidated. Sections prepared by focused ion beam cross section polishers, such as those offered by JEOL®, 11 Dearborn Road, Peabody, Mass., 01960, are especially suitable for observing densification throughout the thickness of the sheet, to determine whether regions in the tissue products of the present invention have been so highly densified as to become consolidated.

Creping belt, and like terminology, refers to a belt that bears a perforated pattern suitable for practicing the process of the present invention. In addition to perforations, the belt may have features, such as raised portions and/or recesses between perforations, if so desired. Preferably, the perforations are tapered, which appears to facilitate transfer of the web, especially, from the creping belt to a dryer, for example. Typically, the face of the sheet contacting the web during the fabric creping step will have a greater open area than the face away from the web. In some embodiments, the creping belt may include decorative features, such as geometric designs, floral designs, and so forth, formed by rearrangement, deletion, and/or a combination of perforations having varying sizes and shapes.

Figure 34:
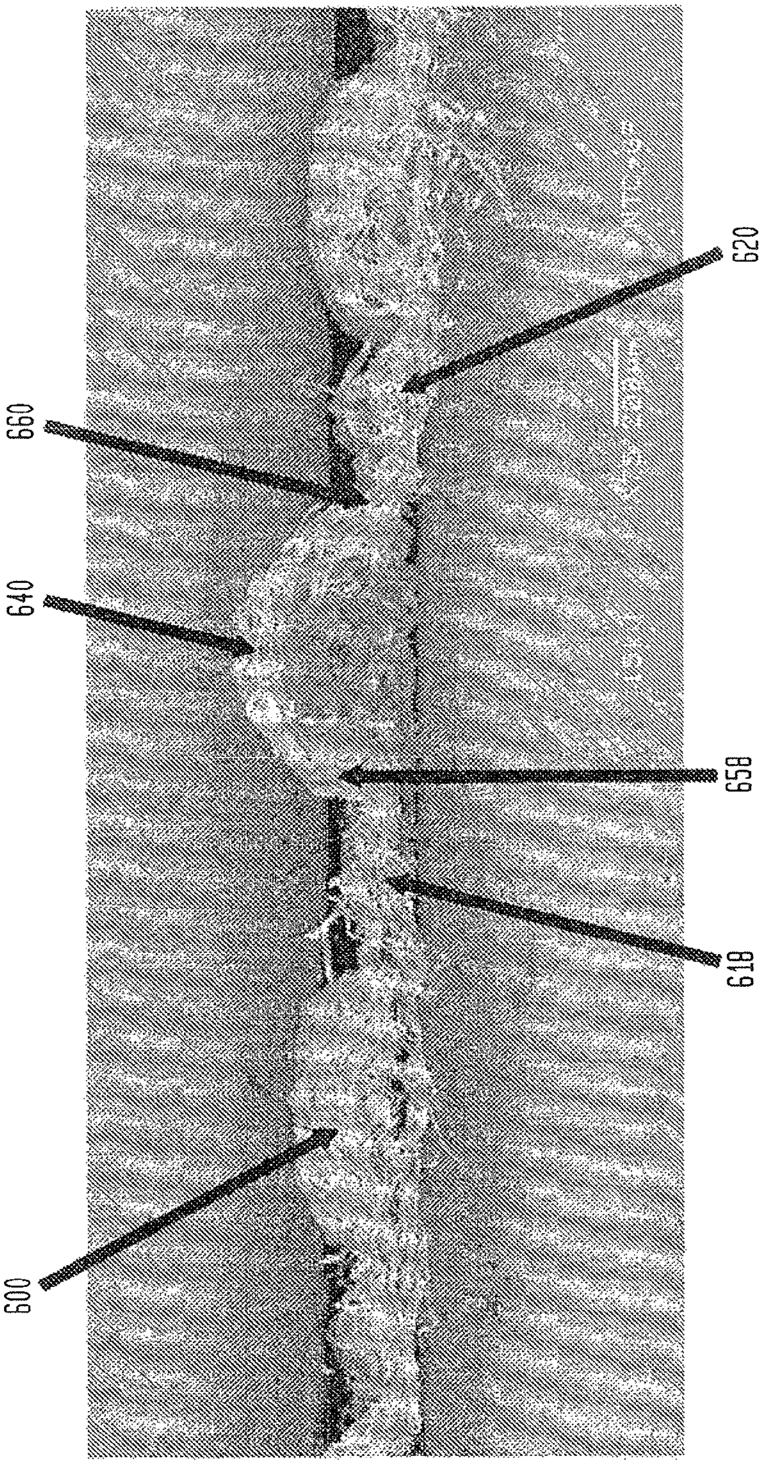
FIG. 34 is a sectional scanning electron micrograph (SEM) illustrating a consolidated region in a sheet formed by belt creping using a perforated polymeric belt.
Figure 35:
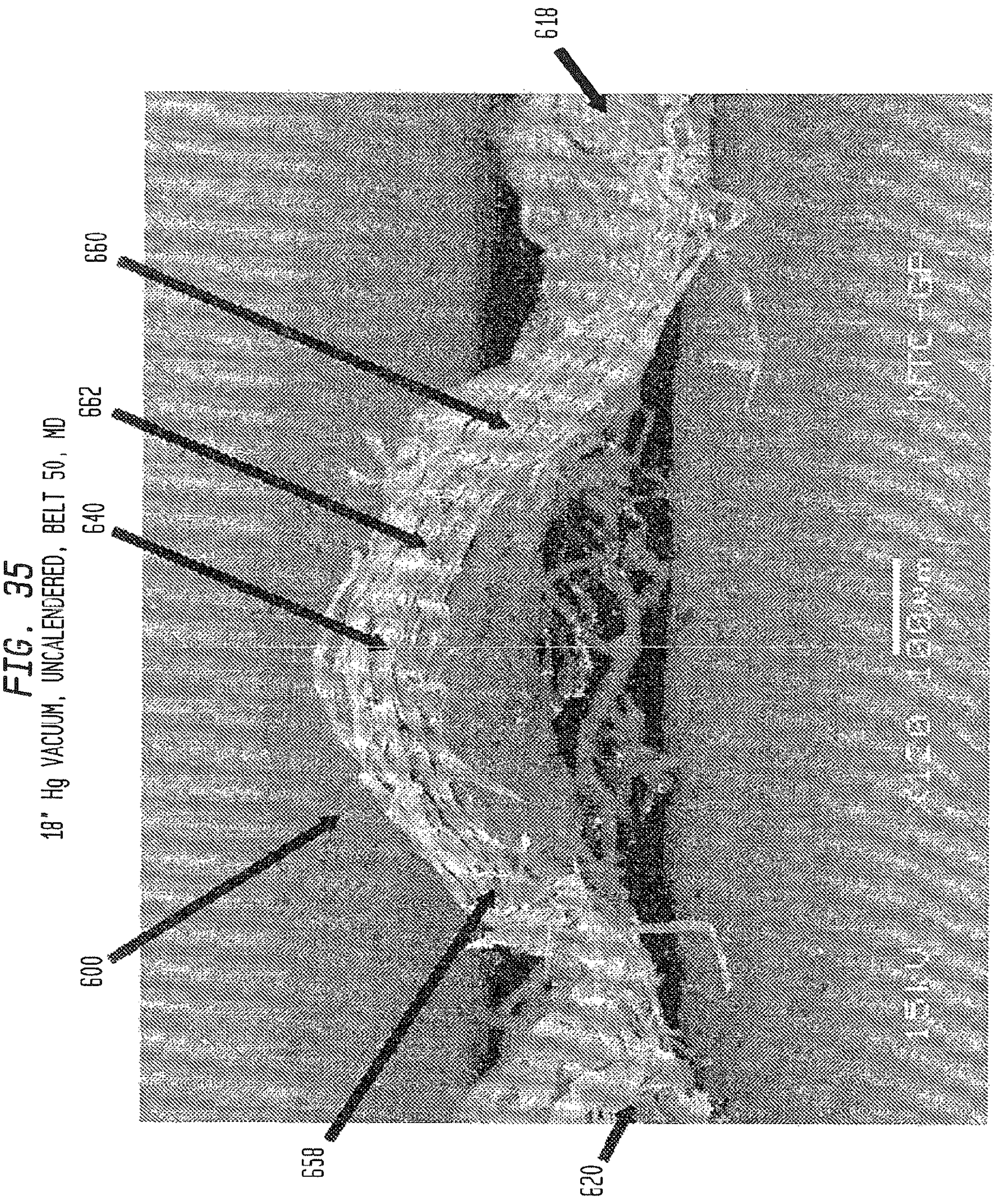
FIG. 35 is an enlarged view of a portion of FIG. 34 illustrating a domed region and a consolidated region in more detail.
Figure 36:
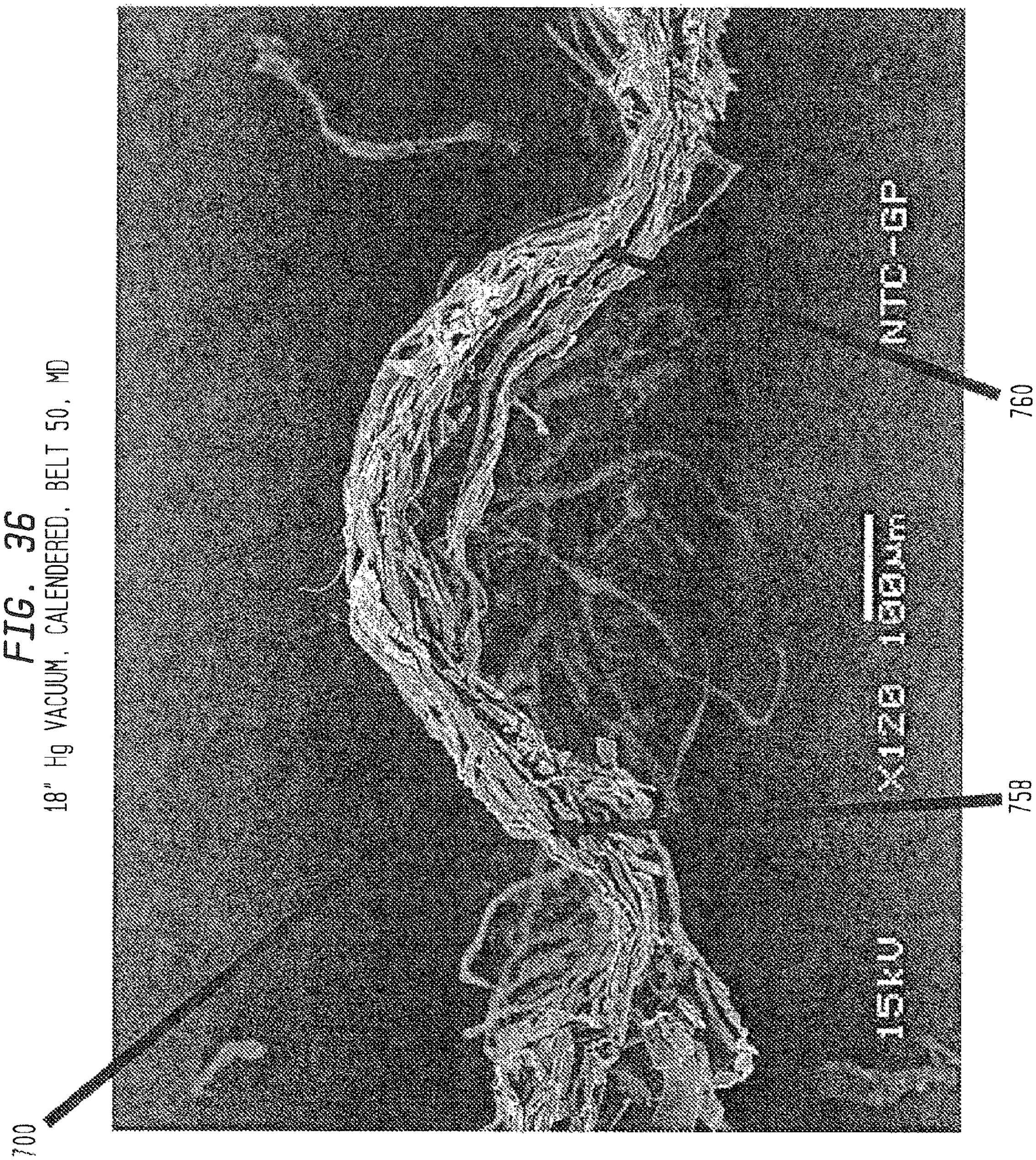
FIG. 36 is a sectional scanning electron micrograph (SEM) illustrating another consolidated region in a sheet formed by belt creping using a perforated polymeric belt.

"Dome", "domed", "dome-like," and so forth, as used in the description and claims, refers generally to hollow, arched protuberances in the sheet of the class seen in the various Figures, and is not limited to a specific type of dome structure as is illustrated in FIGS. 34 to 36. The terminology refers to vaulted configurations, generally, whether symmetric or asymmetric about a plane bisecting the domed area. Thus, "dome" generally refers to spherical domes, spheroidal domes, elliptical domes, ellipsoidal domes, oval domes, domes with polygonal bases, and related structures, generally including a cap and sidewalls, preferably inwardly and upwardly inclined, that is, the sidewalls being inclined toward the cap along at least a portion of their length.

Extractable Lint Test

To quantify the amount of lint removed from towel, tissue, and related products when used dry ("Extractable Lint"), a Sutherland Rub Tester with a 4.0-lb sled is used. This apparatus is available from: Danilee Company, 27223 Starry Mountain Street, San Antonio, Tex. 78260, 830-438-7737, 800-438-7738 (FAX). The 4.0-lb rub block for the Rub Tester has dimensions of 2" by 4", so that the pressure exerted during testing is 0.5 psi.

After the samples to be evaluated are preconditioned at 10 to 35% RH at 22° to 40° C. for 24 hours, then conditioned at 50.0%±2.0% RH and 23.0±1.0° C. for 2 hours, all of the subsequent procedures are performed within the confines of a room maintained at between 48 to 53% RH and a temperature of between 22° C. and 24° C.

Two stacks of four 2.25 in.×4.5 in. test strips with a 4.5 in. length in the machine direction are cut from the sample with the top (exterior of roll) side up.

Two 2.5 in.×6 in. strips of black felt are cut with the 6 in. length in the machine direction, and the top side labeled with sample ID numbers.

A baseline reading for the felt is determined by taking one L* lightness color reading on the labeled side of each black felt strip used for testing in the middle of what will be the rubbed area using a GretagMacbeth® Ci5 spectrophotometer using the following settings on the spectrophotometer: Large area view, Specular component excluded, UV Source C, 2 degree observer, and Illuminant C. (In this connection, the asterisk "*" is not a reference mark directing the reader to some other location in this document, but a portion of the commonly used symbol for CIE 1976 lightness "L*". "L*" as used in this connection relates to CIE 1976, also known as CIELAB measurement of lightness, and should not be confused with Hunger lightness typically denominated "L".) The GretagMacbeth® spectrophotometer Model Ci5 is available from: GretagMacbeth®, 617 Little Britain Road, New Windsor, N.Y. 12553, 914-565-7660, 914-565-0390 (FAX); www.gretagmacbeth.com. The "before testing" reading is later compared to the "after testing" reading in the same area of the black felt strip on the same side, so particular care is taken to be sure that a comparison is made only between the same felt strips.

To evaluate a specimen, the specimen is taped to the galvanized plate on the Sutherland Rub Tester with the top side up, so that rubbing will be in the machine direction with care being observed to ensure that each specimen is taped in the same rub area each time the test is performed. The first black felt specimen is taped, labeled side out, to the bottom of the 4.0-lb rub block of the Sutherland Rub Tester, the number of strokes on the rub tester is set to four, and the slow speed selected (#2 setting for 4 speed model or #1 setting for 2 speed model), the rub block is placed on the Sutherland Rub Tester carriage arm and the "Start" button pressed to start testing. After the four strokes are completed, the rub block is removed from the tester and the black felt is removed from the bottom of the rub block with the black felt being preserved for L* "after testing" color reading. The specimen is removed from the galvanized plate and discarded.

One L* color reading is taken on the labeled side of each black felt strip, reading the same spot used to obtain the "before testing" value, in the middle of the rubbed area. The "after testing" reading is paired up with the appropriate "before testing" reading to calculate difference between the readings–"ΔL*".

For each sample, the average, standard deviation, minimum and maximum test results are recorded as measured to the nearest 0.01 L* unit for both the before testing and after testing values. The difference value of the after reading minus the before reading is indicative of the lint removal by the standardized dry rubbing procedure.

Wet Abrasion Lint Test

Two tests are used herein to evaluate wet linting of tissue samples: in one approach, fiber is rubbed against a wetted pigskin under controlled conditions, the resulting fiber is washed off of the pigskin and the number of fibers removed is measured using an OpTest® Fiber Quality Analyzer. In the second, tissue is rubbed against wetted black felt under controlled conditions and the area of the lint left behind is measured using a flat bed scanner as described below.

Area Test

To evaluate a tissue sample for lint removal by wet abrasion, the sample is first subjected to simulated wet use against a sample of standard black felt with a Crockmeter Rub Tester, modified as described herein, then, the area in $mm^2$ of the lint left on the felt is measured with an Epson Perfection 4490 flat bed scanner and Apogee, SpecScan Software, version 2.3.6.

The Crockmeter Rub is available from: SDL Atlas, LLC, 3934 Airway Drive, Rock Hill, S.C. 29732, (803) 329-2110. To be used to measure wet lint as described herein, the Crockmeter is modified to accept a 360 gram arm and a 1"×2" foot that exerts a pressure on the specimen of 0.435 psi. The weight of the rub block is 355 g for the weighted arm supported on one end, and 36 g for the rub foot. These weights are exerted on a 1"×2" area, for a pressure of 391 g/12.9 $cm^2$=30.3 g/$cm^2$. In contrast, the method of evaluating wet abrasion in U.S. Pat. No. 5,958,187 to Bhat et al., and U.S. Pat. No. 6,059,928 to Luu et al., used a 135 g sled placed on a 2×3" sample for a pressure of 135 g/38.7 $cm^2$=3.5 g/$cm^2$.

Research Dimensions, at 1720 Oakridge Road, Neenah, Wis. 54956, 920-722-2289, will modify Crockmeter Rub Testers to conform hereto.

Suitable black felt is 3/16-inch thick, part number 113308F-24 available from Aetna Felt Corporation, 2401 W. Emaus Avenue, Allentown, Pa. 18103, 800-526-4451.

Figure 42:
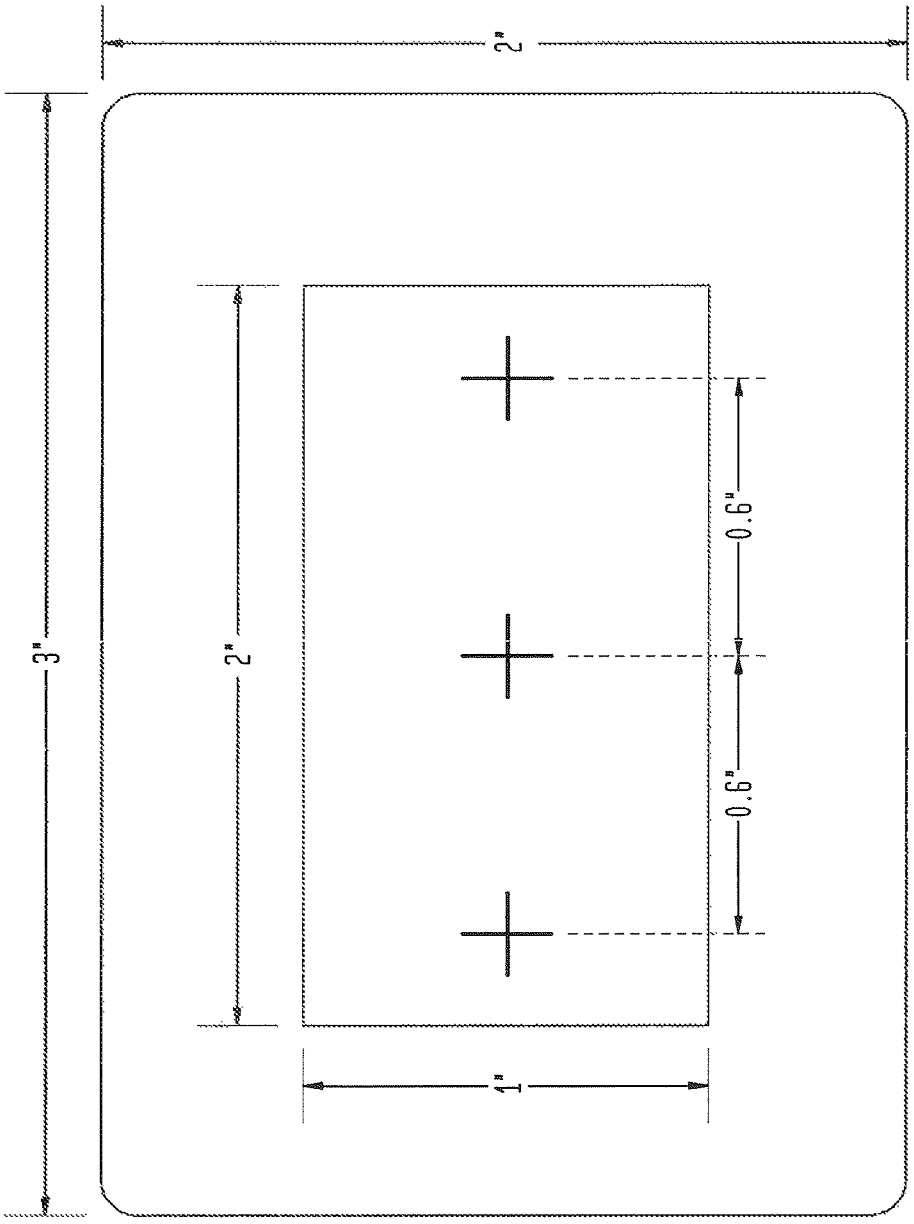
FIG. 42 illustrates the dimensions of a marked microscope slide used in evaluating the resistance of the products of the present invention to wet linting.

To test a sample, the outer three layers of tissue are removed from the roll. Three sheets of tissue are cut at the perforations and placed in a stack using a paper cutter ensuring that the tissue sheets are placed in the same orientation relative to the direction and the side of the roll. From the stack, samples that are 2 inches by 2.5 inches are cut with the long dimension being the machine direction. Enough samples are cut for 4 replicates. The short (2") side of the tissue is marked with a small dot to indicate the surface of the tissue that was outwardly facing when on the roll. The foot is mounted to the arm of the Crockmeter with the short dimension parallel to the stroke of the Crockmeter and the stroke distance set at 4"±⅛ inch, and the stroke speed is set to ten strokes per minute. The black felt is cut into 3 inch by 6 inch pieces with the inside surface being marked along the short edge. In this test, the tissue sample to be tested will be rubbed against the inside of the felt starting at the mark. A 12 inch by 12 inch sheet of Black Acrylic, a 2 inch by 3 inch glass microscope slide marked as shown in FIG. 42, a tape, a pipette, and a beaker of distilled water are located on any nearby convenient flat surface. The Crockmeter is turned on, then turned off, to position the arm at its furthest back position. The spacer is placed under the arm to hold it above the rubbing surface. A clean piece of black felt is taped to the base of the Crockmeter over the rubbing surface with the marked surface oriented upward with the marked end up adjacent to the beginning point of the stroke of the foot. A sample is taped along one shorter edge to the foot with the top side of the tissue facing up, and the length of the tissue is wrapped around the foot and attached to the arm of the Crockmeter with the taped side and the marked location on the tissue sample facing the operator at the forward portion of the Crockmeter. The type of tape used is not critical. Office tape commonly referred to as cellophane tape or sold under the trademark "Scotch® Tape" is suitable. The spacer is removed from under the arm and the arm with the attached foot is set down on the black felt with the long dimension of the foot perpendicular to the rub direction, and the foot is fixed in place. The glass microscope slide is placed on the felt forward of the foot and 3 volumes of 200 μL of distilled water each are dispensed from the pipette onto the cross-marks on the glass slide. The sample, foot and arm are gently lifted, the glass slide is placed under the sample, and the sample is lowered to allow the water to wet the sample for 5 seconds, after which time the arm is lifted, the glass slide removed and the Crockmeter activated to allow the sample to make three forward strokes on the felt with the arm being lifted manually at the beginning of each return stroke to prevent the sample from contacting the felt during the return strokes. After three forward strokes, the Crockmeter is inactivated and the spacer placed under the arm so that the black felt can be removed without disturbing the abraded lint thereupon. Three minutes after the felt is removed from the rubbing surface, the felt is scanned in an Epson, Perfection 4490 flat bed scanner using Apogee SpecScan Software version 2.3.36 with the software being set for "lint" in the "Scanner Settings" window, with "5" being set in the "Process Groups of:" window on the "Defaults panel", the "Resolution" being set at "600 dots/inch", the "Scanner Mode" being set to "256-Grayscale", the "Area Setting" being set to "Special", the "Scan. Image" being set to "Reverse Image", the "Upper Limit" window on the "Dirt Histogram" panel being set to ">=5.000" the "Lower Limit" window of that panel being set to "0.013-0.020" and the "X Scale:" window being set to "25"; and the "PPM" window of the "Bad Handsheet" panel set to "2500.0". On the "Printout Settings:" panel, the "Gray-Summary", "Sheet Summary" and "Gray Histogram" boxes are checked, the "Copies" window is set to "1", while the "Dirt Histogram", "Categories" and "XY Location boxes on that panel are unchecked. Both the "Enable Display" and "Enable Zoom" boxes are checked on the Display Mode panel. On the "Scanner Setup" panel, the "White" box is set for "255" while the "Black" box is set for "0", the "Contrast Filter" box is set for "0.000", the upper "Threshold=" box is set for 80.0 [% percent of background plus] while the lower "Threshold=" box is set for "0.0" [grayscale value]. The "Percent of Background, plus offset" box on the "Scanner Setup" panel is checked while the "Manual Threshold Setting" and "Function of StdDev of Background" boxes are unchecked. If desired, the "Grade Identification:" and "Reel/Load Number:" boxes may be used to record indicia related to the identification of the samples being tested. On the "Special Area Definition" panel, "Inches" is checked in the "Dimensions:" region while "Rectangular" is checked in the "Shape:" region. In the "Border at top and left:" region, "0.15" [in.] is entered in the "At the left side: (X)" box and "0.625" [in.] is entered in the "At the top: (Y)" box. In the "Area to scan:" regions "2.7" [in.] is entered in the "Width (X)" box and "5.2" [in.] is entered in the "Height (Y)" box. After scanning, the area in $mm^2$ of the abraded lint left on the black felt is output in the "SHEETS" Table in the "Total Area" column under the "Sample Sheet(s)" heading on the "Sheet & Category Summary" screen. This result is sometimes referred to herein as "WALA" for Wet Abraded Lint Area, which is reported in $mm^2$.

Fiber Count Test

In other cases, rather than using black felt, a pigskin comparable to human skin is substituted therefor, the fiber removed will be washed off and the solution subjected to testing in an Optest® Fiber Quality Analyzer to determine the number of fibers removed having a length in excess of 40 μm. The Optest® Fiber Quality Analyzer has become a standard in the paper industry for determining fiber length distributions and fiber counts (above a certain minimal length, which keeps decreasing periodically, as Optest® continually upgrades their technique). The Optest® Fiber Quality Analyzer is available from:

OpTest Equipment Inc.
900 Tupper St.—Hawkesbury—ON—K6A 3S3—Canada
Phone: 613-632-5169 Fax: 613-632-3744.

Fpm refers to feet per minute, while fps refers to feet per second.

MD means machine direction and CD means cross-machine direction.

"Predominantly" means more than 50% of the specified component, by weight unless otherwise indicated.

Roll Compression Test

Figure 40:
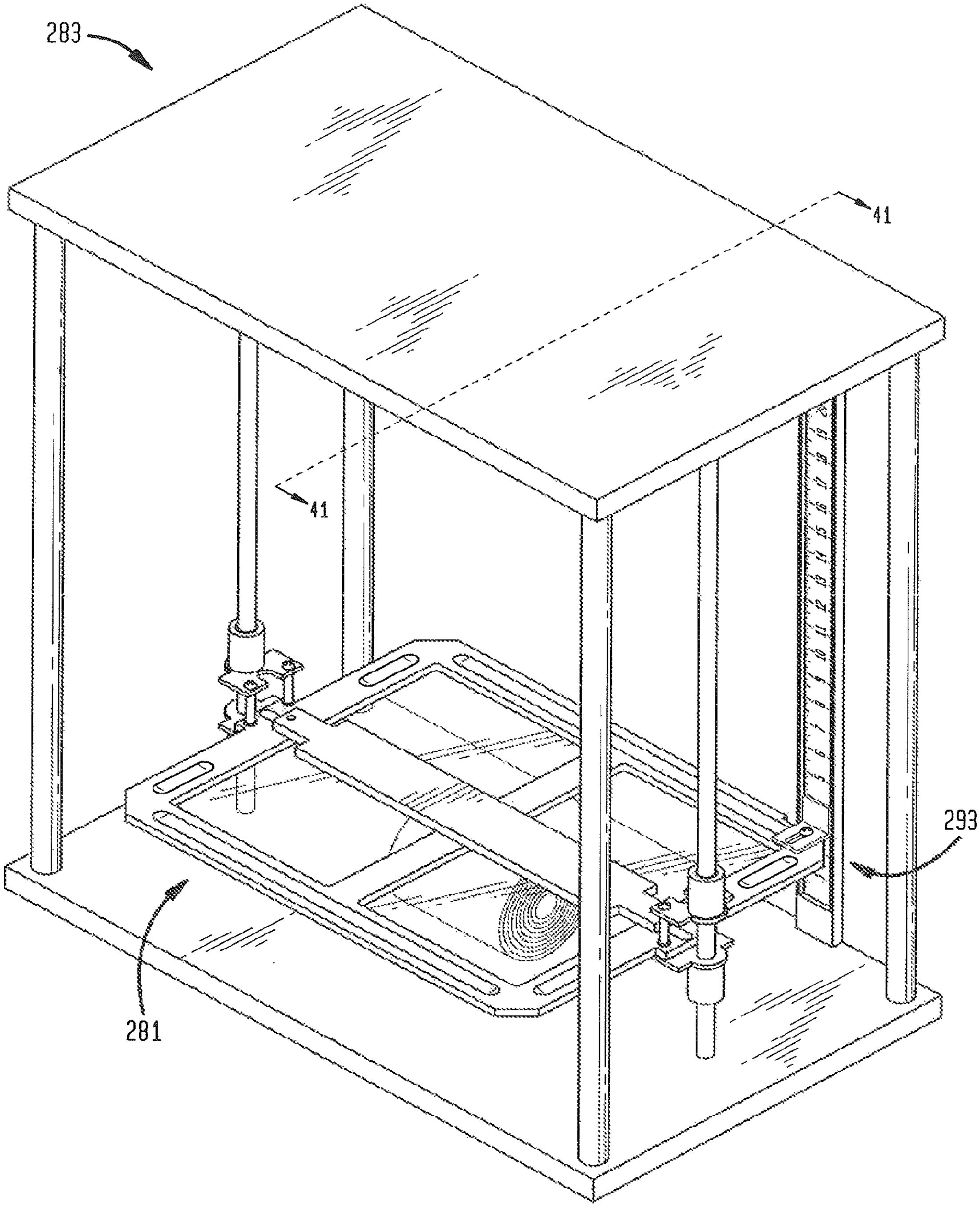
FIG. 40 is an isometric schematic illustrating a device to measure roll compression of tissue products.
Figure 41:
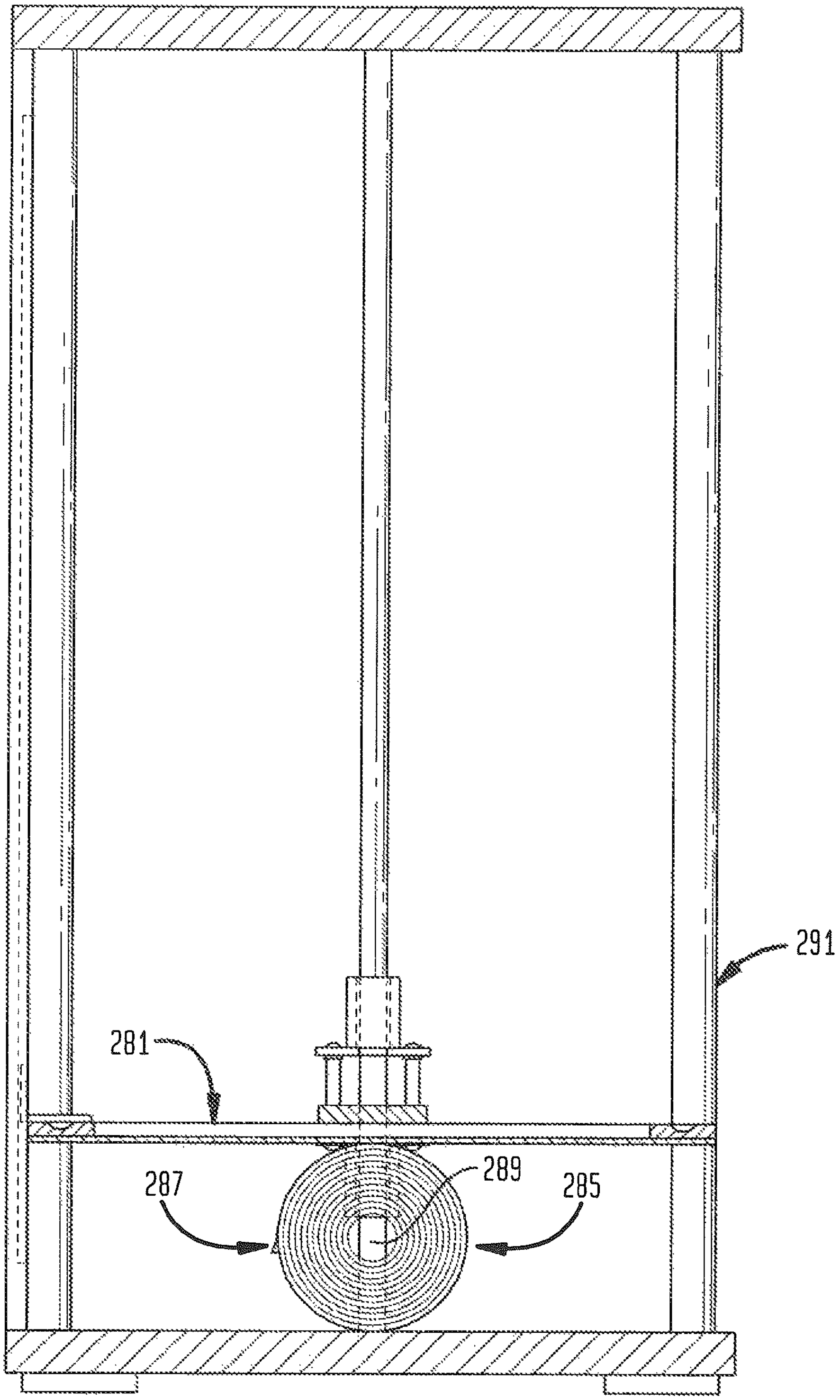
FIG. 41 is a sectional view taken along line 41-41 of FIG. 40.

Roll compression is measured by compressing roll 285 under a 1500 g flat platen 281 of a test apparatus 283 similar to that shown in FIGS. 40 and 41, then measuring the difference in height between the uncompressed roll and the compressed roll while in the fixture. Sample rolls 285 are conditioned and tested in an atmosphere of 23.0°±1.0° C. (73.4°±1.8° F.). A suitable test apparatus 283 with a movable 1500 g platen 281 (referred to as a Height Gauge) is available from:

Research Dimensions
1720 Oakridge Road
Neenah, Wis. 54956
920-722-2289
920-725-6874 (FAX).

The test procedure is generally as follows:

(a) Raise the platen 281 and position the roll 285 to be tested on its side, centered under the platen 281, with the tail seal 287 to the front of the gauge and the core 289 parallel to the back of the gauge 291.

(b) Slowly lower the platen 281 until it rests on the roll 285.

(c) Read the compressed roll diameter height from the gauge pointer 293 to the nearest 0.01 inch (0.254 mm).

(d) Raise the platen 281 and remove the roll 285.

(e) Repeat for each roll to be tested.

To calculate roll compression in percent, the following formula is used:

$$RC(\%) = 100 \times \frac{(\text{initial roll diameter} - \text{compressed roll diameter})}{\text{initial roll diameter}}.$$

Dry tensile strengths (MD and CD), stretch, ratios thereof, modulus, break modulus, stress and strain are measured with a standard Instron® test device or other suitable elongation tensile tester, which may be configured in various ways, typically, using 3 inch (76.2 mm) or 1 inch (25.4 mm) wide strips of tissue or towel, conditioned in an atmosphere of 23°±1° C. (73.4°±1° F.) at 50% relative humidity for 2 hours. The tensile test is run at a crosshead speed of 2 in/min (50.8 mm/min). Break modulus is expressed in grams/3 inches/% strain or its SI equivalent of g/mm/% strain. % strain is dimensionless and need not be specified. Unless otherwise indicated, values are break values. GM refers to the square root of the product of the MD and CD values for a particular product. Tensile energy absorption (TEA), which is defined as the area under the load/elongation (stress/strain) curve, is also measured during the procedure for measuring tensile strength. Tensile energy absorption is related to the perceived strength of the product in use. Products having a higher TEA may be perceived by users as being stronger than similar products that have lower TEA values, even if the actual tensile strength of the two products are the same. In fact, having a higher tensile energy absorption may allow a product to be perceived as being stronger than one with a lower TEA, even if the tensile strength of the high-TEA product is less than that of the product having the lower tensile energy absorption. When the term "normalized" is used in connection with a tensile strength, it simply refers to the appropriate tensile strength from which the effect of basis weight has been removed by dividing that tensile strength by the basis weight. In many cases, similar information is provided by the term "breaking length".

Tensile ratios are simply ratios of the values determined by way of the foregoing methods. Unless otherwise specified, a tensile property is a dry sheet property.

"Upper", "upwardly" and like terminology is used purely for convenience and does not require that the sheet be placed in a specified orientation, but rather, refers to position or direction toward the caps of the dome structures, that is, the belt side of the web, which is generally opposite to the Yankee side, unless the context clearly indicates otherwise.

"Venation" means a structure presenting a generally smooth surface having raised, generally continuous ridges defined thereacross, similar to the venation observable on the lower surface of many common leaves.

The void volume and/or void volume ratio, as referred to hereafter, are determined by saturating a sheet with a nonpolar POROFIL™ liquid, available from Coulter Electronics Ltd., (Beckman Coulter, Inc., 250 S. Kraemer Boulevard, P.O. Box 8000, Brea, Calif. 92822-8000 USA, Part No. 9902458), and measuring the amount of liquid absorbed. The volume of liquid absorbed is equivalent to the void volume within the sheet structure. The % weight increase (PWI) is expressed as grams of liquid absorbed per gram of fiber in the sheet structure times one hundred, as noted hereafter. More specifically, for each single-ply sheet sample to be tested, select 8 sheets and cut out a 1 inch by 1 inch (25.4 mm by 25.4 mm) square (1 inch (25.4 mm) in the machine direction and 1 inch (25.4 mm) in the cross machine direction). For multi-ply product samples, each ply is measured as a separate entity. Multiple samples should be separated into individual single plies and 8 sheets from each ply position used for testing. Weigh and record the dry weight of each test specimen to the nearest 0.0001 gram. Place the specimen in a dish containing POROFIL™ liquid having a specific gravity of about 1.93 grams per cubic centimeter. After 10 seconds, grasp the specimen at the very edge (1 to 2 millimeters in) of one corner with tweezers and remove from the liquid. Hold the specimen with that corner uppermost and allow excess liquid to drip for 30 seconds. Lightly dab (less than ½ second contact) the lower corner of the specimen on #4 filter paper (Whatman Ltd., Maidstone, England) in order to remove any excess of the last partial drop. Immediately weigh the specimen, within 10 seconds, recording the weight to the nearest 0.0001 gram. The PWI for each specimen, expressed as grams of POROFIL™ liquid per gram of fiber, is calculated as follows:

$$PWI=[(W_2-W_1)/W1]\times 100,$$

wherein

"$W_1$" is the dry weight of the specimen, in grams; and

"$W_2$" is the wet weight of the specimen, in grams.

The PWI for all eight individual specimens is determined as described above and the average of the eight specimens is the PWI for the sample.

The void volume ratio is calculated by dividing the PWI by 1.9 (density of fluid) to express the ratio as a percentage, whereas the void volume (gms/gm) is simply the weight increase ratio, that is, PWI divided by 100.

Water absorbency rate is related to the time it takes for a sample to absorb a 0.1 gram droplet of water disposed on its surface by way of an automated syringe. The test specimens are preferably conditioned at 23° C.±1° C. (73.4° F.±1.8° F.) at 50% relative humidity. For each sample, four 3×3 inch test specimens are prepared. Each specimen is placed in a sample holder such that a high intensity lamp is directed toward the specimen. 0.1 ml of water is deposited on the specimen surface and a stop watch is started. When the water is absorbed, as indicated by lack of further reflection for light from the drop, the stopwatch is stopped and the time is recorded to the nearest 0.1 seconds. The procedure is repeated for each specimen and the results averaged for the sample. SAT rate is determined by graphing the weight of water absorbed by the sample (in grams) against the square root of time (in seconds). The SAT rate is the best fit slope between 10 and 60 percent of the end point (grams of water absorbed), and is expressed in $g/s^{0.5}$.

The wet tensile of a wiper of the present invention is measured generally following TAPPI Method T 576 pm-07 using a three-inch (76.2 mm) wide strip of tissue that is folded into a loop, clamped in a special fixture termed a Finch Cup, then immersed in water. A suitable Finch cup, 3 inch (76.2 mm), with base to fit a 3 inch (76.2 mm) grip, is available from:

High-Tech Manufacturing Services, Inc.
3105-B NE 65$^{th}$ Street
Vancouver, Wash. 98663
360-696-1611
360-696-9887 (FAX).

For fresh basesheet and finished product (aged 30 days or less for towel product, aged 24 hours or less for tissue product) containing wet strength additive, the test specimens are placed in a forced air oven heated to 105° C. (221° F.) for five minutes. No oven aging is needed for other samples. The Finch cup is mounted onto a tensile tester equipped with a 2.0 pound (8.9 Newton) load cell with the flange of the Finch cup clamped by the tester's lower jaw and the ends of tissue loop clamped into the upper jaw of the tensile tester. The sample is immersed in water that has been adjusted to a pH of 7.0±0.1 and the tensile is tested after a 5 second immersion time using a crosshead speed of 2 inches/minute (50.8 mm/minute). The results are expressed in g/3 in. or (g/mm), dividing the readout by two to account for the loop as appropriate.

Wipe dry times are evaluated using a turntable wipe dry instrument with a spray fluid dispensing instrument, each being as described below. For purposes of this application, two standard test surfaces are used: stainless steel and black glass. To evaluate a sample, the paper is first pre-conditioned and conditioned as described below, the test surface cleaned with Windex® original glass cleaner from S.C. Johnson and Son, Racine, Wis., and then wiped dry with a lint-free wipe.

The test sample is folded so that the fold extends in the cross machine direction and centered on the black foam side of the sample head, so that the machine direction runs perpendicular to the shaft (i.e., the machine direction is parallel to the directions of motion) and taped in position at its corners so that the sample's leading edge is the folded edge and the towel sample is flush with the right hand edge of the sample head. The sample head is placed on the test surface and the slack in the sample removed. Windex® original glass cleaner is sprayed on the test surface in an amount of 0.75±0.1 grams in the center of the area not occupied by the test head. The table is rotated for 3 revolutions at 30 to 32 rpm with the head in engagement with the test surface at a load of 1065 g spread over bearing surface dimensions of 23 cm×9.5 cm. After the turntable has made three revolutions, the area on the test surface to which the Windex® original glass cleaner was applied is observed and the elapsed time recorded until all of the Windex® original glass cleaner has evaporated. This time is recorded in seconds as the Wipe Dry Time.

To quantify the amount of lint removed from towel, tissue, and related products (Extractable Lint), a Sutherland Rub Tester with 4.0-lb rub block is used. This is discussed above.

After the samples to be evaluated are preconditioned at 10 to 35% RH at 22° to 40° C. for 24 hours, then conditioned at 50.0%±2.0% RH and 23.0±1.0° C. for 2 hours, all of the subsequent procedures are performed within the confines of a room maintained at between 48 to 53% RH and a temperature of between 22° C. and 24° C.

Two stacks of four 2.25 in.×4.5 in. test strips with 4.5 in. length in the machine direction are cut from the sample with the top (exterior of roll) side up.

Two 2.5 in.×6 in. strips of black felt are cut with the 6 in. length in the machine direction, and the top side labeled with sample ID numbers.

A baseline reading for the felt is determined by taking one L* color reading on the labeled side of each black felt strip used for testing in the middle of what will be the rubbed area using a GretagMacbeth Spectrophotometer Model Ci5 as discussed above. The "before testing" reading is later compared to the "after testing" reading in the same area of the black felt strip on the same side, so particular care is taken to be sure that comparison are made only between the same felt strips.

One L* color reading is taken on the labeled side of each black felt strip, reading the same spot used to obtain the "before testing" value, in the middle of the rubbed area. The "after testing" reading is paired up with the appropriate "before testing" reading to calculate the difference between the two readings–"ΔL*".

For each sample, the average, standard deviation, minimum and maximum test results are recorded as measured to the nearest 0.01 L* unit for both the before testing and after testing values. The difference value of the after reading minus the before reading is indicative of the lint removal by the standardized rubbing procedure.

Liquid Porosimetry

Liquid porosimetry is a procedure for determining the pore volume distribution (PVD) within a porous solid matrix. Each pore is sized according to its effective radius, and the contribution of each size to the total free volume is the principal objective of the analysis. The data reveals useful information about the structure of a porous network, including absorption and retention characteristics of a material.

Figure 8:
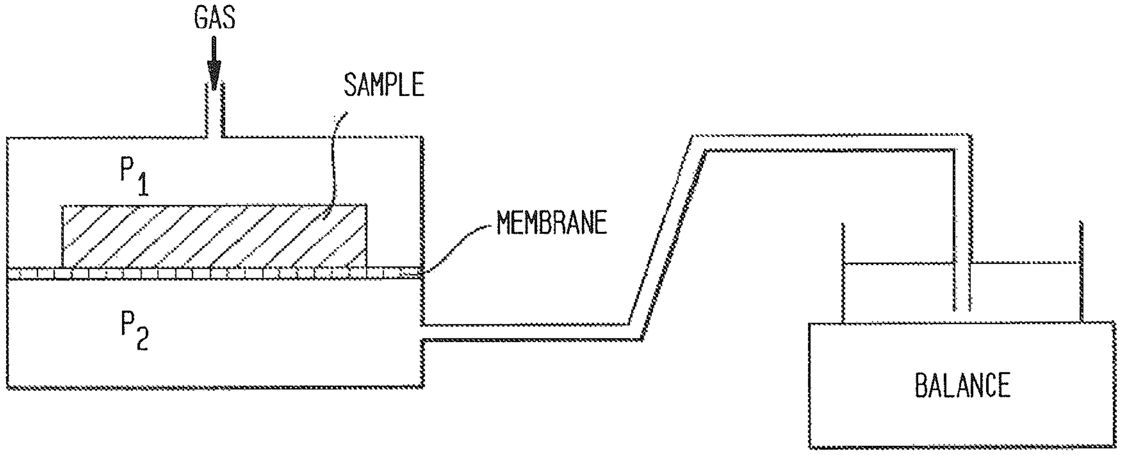
FIG. 8 illustrates the extrusion/intrusion porosimetry system used for measuring pore volume and pore size distribution.

The procedure generally requires quantitative monitoring of the movement of liquid either into or out of a porous structure. The effective radius R of a pore is operationally defined by the Laplace equation:

$$R = \frac{2\gamma\cos\theta}{\Delta P}$$

where $\gamma$ is liquid surface tension, $\theta$ is advancing or receding contact angle of the liquid, and $\Delta P$ is pressure difference across the liquid/air meniscus. For liquid to enter or to drain from a pore, an external pressure must be applied that is just enough to overcome the Laplace $\Delta P$. Cos $\theta$ is negative when liquid must be forced in, cos $\theta$ is positive when it must be forced out. If the external pressure on a matrix having a range of pore sizes is changed, either continuously or in steps, filling or emptying will start with the largest pore and proceed in turn down to the smallest size that corresponds to the maximum applied pressure difference. Porosimetry involves recording the increment of liquid that enters or leaves with each pressure change and can be carried out in the extrusion mode, that is, liquid is forced out of the porous network rather than into it. The receding contact angle is the appropriate term in the Laplace relationship, and any stable liquid that has a known cos $\theta_r > 0$ can be used. If necessary, initial saturation with liquid can be accomplished by preevacuation of the dry material. The basic arrangement used for extrusion porosimetry measurements is illustrated in FIG. 8. The presaturated specimen is placed on a microporous membrane which is itself supported by a rigid porous plate. The gas pressure within the chamber is increased in steps, causing liquid to flow out of some of the pores, the largest ones first. The amount of liquid removed is monitored by the top-loading recording balance. In this way, each level of applied pressure (which determines the largest effective pore size that remains filled) is related to an increment of liquid mass. The chamber is pressurized by means of a computer-controlled, reversible, motor-driven piston/cylinder arrangement that can produce the required changes in pressure to cover a pore radius range from 1 to 1000 μm.

Eight finished product samples were analyzed for pore volume distribution testing. Measurements were performed on the TRI/Autoporosimeter®. The instrument and the PVD methodology are described in the paper "Liquid Porosimetry: New Methodology and Applications" by Dr. B. Miller and Dr.

I. Tyomkin, published in the Journal of Colloid and Interface Science, 162, 163-170, (1994), the disclosure of which is incorporated herein by reference.

Figure 9:
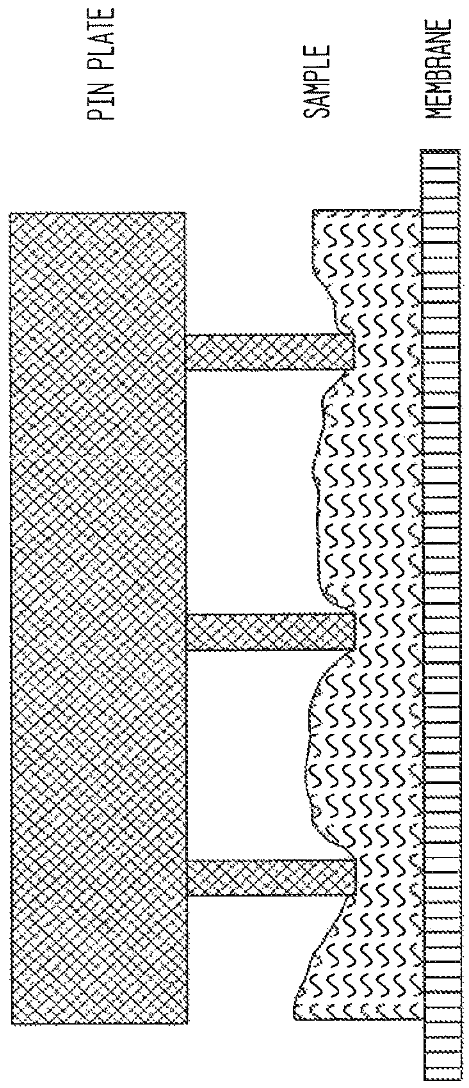
FIG. 9 is a schematic diagram illustrating the interaction between the pressure plate and the sample in the apparatus for measurement of pore volume distribution.

The test liquid was 0.1% TX-100 solution in water, surface tension 30 mN/m. TX-100 is a surfactant. For reference, water at room temperature has a surface tension of 72 dyne/cm. Sample size was 30 $cm^2$. The test started in an advancing mode and finished in a receding mode. The advancing mode requires good contact with fine porous membrane in the test chamber. Therefore, samples were covered with a multi-pin plate as shown in FIG. 9. The pin plate area is 30 $cm^2$. It has 196 0.9×0.9 mm square pins, the height of each pin is 4 mm, the distance between pins is 3.2 mm, and the total area of pins is 159 $mm^2$. The pin plate locally compressed the sample. The total area of the pins is 5% of sample.

Data from 1 micron to 500 microns represent the advancing part of the curve, and data from 500 microns to 1 micron represent the receding part of the curve. At the end of the test at 1 micron, there was some liquid left in the sample. This liquid is a sum of liquid in swollen fibers, liquid in pores below 1 micron, and liquid trapped in the larger pores. The amount of liquid in a sample at the end of experiment was usually below 0.5 $mm^3$/mg.

Water Holding Capacity is determined pursuant to withdrawn ASTM Standard Method D-4250-92, Standard Method for Water-Holding Capacity of Bibulous Fibrous Products. It is considered to be generally very comparable to SAT.

Regenerated Cellulose Microfiber

In accordance with the invention, regenerated cellulose fibers are prepared from a cellulosic dope comprising cellulose dissolved in a solvent comprising tertiary amine N-oxides or ionic liquids. The solvent composition for dissolving cellulose and preparing underivatized cellulose dopes suitably includes tertiary amine oxides, such as N-methylmorpholine-N-oxide (NMMO), and similar compounds enumerated in U.S. Pat. No. 4,246,221 to McCorsley, the disclosure of which is incorporated herein by reference. Cellulose dopes may contain non-solvents for cellulose such as water, alkanols or other solvents, as will be appreciated from the discussion that follows.

Suitable cellulosic dopes are enumerated in Table 1, below.

TABLE 1

EXAMPLES OF TERTIARY AMINE N-OXIDE SOLVENTS

| Tertiary Amine N-oxide | % water | % cellulose |
|---|---|---|
| N-methylmorpholine N-oxide | up to 22 | up to 38 |
| N,N-dimethyl-ethanol-amine N-oxide | up to 12.5 | up to 31 |
| N,N-dimethylcyclohexylamine N-oxide | up to 21 | up to 44 |
| N-methylhomopiperidine N-oxide | 5.5-20 | 1-22 |
| N,N,N-triethylamine N-oxide | 7-29 | 5-15 |
| 2(2-hydroxypropoxy)-N-ethyl-N,N,-dimethyl-amide N-oxide | 5-10 | 2-7.5 |
| N-methylpiperidine N-oxide | up to 17.5 | 5-17.5 |
| N,N-dimethylbenzylamine N-oxide | 5.5-17 | 1-20 |

See, also, U.S. Pat. No. 3,508,941 to Johnson, the disclosure of which is incorporated herein by reference.

Details with respect to preparation of cellulosic dopes including cellulose dissolved in suitable ionic liquids and cellulose regeneration therefrom are found in U.S. Patent Application Publication No. 2003/0157351, now U.S. Pat. No. 6,824,599, of Swatloski et al., entitled "Dissolution and Processing of Cellulose Using Ionic Liquids", the disclosure of which is incorporated herein by reference. Here again, suitable levels of non-solvents for cellulose may be included. This patent generally describes a process of dissolving cellulose in an ionic liquid without derivatization and regenerating the cellulose in a range of structural forms. It is reported that the cellulose solubility and the solution properties can be controlled by the selection of ionic liquid constituents with small cations and halide or pseudohalide anions favoring solution. Preferred ionic liquids for dissolving cellulose include those with cyclic cations, such as the following cations: imidazolium; pyridinum; pyridazinium; pyrimidinium; pyrazinium; pyrazolium; oxazolium; 1,2,3-triazolium; 1,2,4-triazolium; thiazolium; piperidinium; pyrrolidinium; quinolinium; and isoquinolinium.

Processing techniques for ionic liquids/cellulose dopes are also discussed in U.S. Pat. No. 6,808,557 to Holbrey et al., entitled "Cellulose Matrix Encapsulation and Method", the disclosure of which is incorporated herein by reference. Note also, U.S. Patent Application Publication No. 2005/0288484, now U.S. Pat. No. 7,888,412, of Holbrey et al., entitled "Polymer Dissolution and Blend Formation in Ionic Liquids", as well as U.S. Patent Application Publication No. 2004/0038031, now U.S. Pat. No. 6,808,557, of Holbrey et al., entitled "Cellulose Matrix Encapsulation and Method", the disclosures of which are incorporated herein by reference. With respect to ionic fluids, in general, the following documents provide further detail: U.S. Patent Application Publication No. 2006/0241287, now U.S. Pat. No. 7,763,715, of Hecht et al., entitled "Extracting Biopolymers From a Biomass Using Ionic Liquids"; U.S. Patent Application Publication No. 2006/0240727 of Price et al., entitled "Ionic Liquid Based Products and Method of Using The Same"; U.S. Patent Application Publication No. 2006/0240728 of Price et al., entitled "Ionic Liquid Based Products and Method of Using the Same"; U.S. Patent Application Publication No. 2006/0090271 of Price et al., entitled "Processes For Modifying Textiles Using Ionic Liquids"; and U.S. Patent Application Publication No. 2006/0207722 of Amano et al., entitled "Pressure Sensitive Adhesive Compositions, Pressure Sensitive Adhesive Sheets and Surface Protecting Films," the disclosures of which are incorporated herein by reference. Some ionic liquids and quasi-ionic liquids that may be suitable are disclosed by Imperato et al., Chemical Communications 2005, pages 1170 to 1172, the disclosure of which is incorporated herein by reference.

"Ionic liquid", refers to a molten composition including an ionic compound that is preferably a stable liquid at temperatures of less than 100° C. at ambient pressure. Typically, such liquids have a very low vapor pressure at 100° C., less than 75 mBar or so, and preferably, less than 50 mBar or less than 25 mBar at 100° C. Most suitable liquids will have a vapor pressure of less than 10 mBar at 100° C., and often, the vapor pressure is so low that it is negligible, and is not easily measurable, since it is less than 1 mBar at 100° C.

Suitable commercially available ionic liquids are Basionic™ ionic liquid products available from BASF (Florham Park. NJ) and are listed in Table 2 below.

TABLE 2

| Exemplary Ionic Liquids | | | |
|---|---|---|---|
| IL Abbreviation | Basionic ™ Grade | Product name | CAS Number |
| STANDARD | | | |
| EMIM Cl | ST 80 | 1-Ethyl-3-methylimidazolium chloride | 65039-09-0 |
| EMIM $CH_3SO_3$ | ST 35 | 1-Ethyl-3-methylimidazolium methanesulfonate | 145022-45-3 |
| BMIM Cl | ST 70 | 1-Butyl-3-methylimidazolium chloride | 79917-90-1 |
| BMIM $CH_3SO_3$ | ST 78 | 1-Butyl-3-methylimidazolium methanesulfonate | 342789-81-5 |
| MTBS | ST 62 | Methyl-tri-n-butylammonium methylsulfate | 13106-24-6 |
| MMMPZ $MeOSO_3$ | ST 33 | 1,2,4-Trimethylpyrazolium methylsulfate | |
| EMMIM $EtOSO_3$ | ST 67 | 1-Ethyl-2,3-di-methylimidazolium ethylsulfate | 516474-08-01 |
| MMMIM $MeOSO_3$ | ST 99 | 1,2,3-Trimethyl-imidazolium methylsulfate | 65086-12-6 |
| ACIDIC | | | |
| HMIM Cl | AC 75 | Methylimidazolium chloride | 35487-17-3 |
| HMIM $HSO_4$ | AC 39 | Methylimidazolium hydrogensulfate | 681281-87-8 |
| EMIM $HSO_4$ | AC 25 | 1-Ethyl-3-methylimidazolium hydrogensulfate | 412009-61-1 |
| EMIM $AlCl_4$ | AC 09 | 1-Ethyl-3-methylimidazolium tetrachloroaluminate | 80432-05-9 |
| BMIM $HSO_{4</}$ | AC 28 | 1-Butyl-3-methylimidazolium hydrogensulfate | 262297-13-2 |
| BMIM $AlCl_4$ | AC 01 | 1-Butyl-3-methylimidazolium tetrachloroaluminate | 80432-09-3 |
| BASIC | | | |
| EMIM Acetat | BC 01 | 1-Ethyl-3-methylimidazolium acetate | 143314-17-4 |
| BMIM Acetat | BC 02 | 1-Butyl-3-methylimidazolium acetate | 284049-75-8 |
| LIQUID AT RT | | | |
| EMIM $EtOSO_3$ | LQ 01 | 1-Ethyl-3-methylimidazolium ethylsulfate | 342573-75-5 |
| BMIM $MeOSO_3$ | LQ 02 | 1-Butyl-3-methylimidazolium methylsulfate | 401788-98-5 |
| LOW VISCOSITY | | | |
| EMIM SCN | VS 01 | 1-Ethyl-3-methylimidazolium thiocyanate | 331717-63-6 |
| BMIM SCN | VS 02 | 1-Butyl-3-methylimidazolium thiocyanate | 344790-87-0 |
| FUNCTIONALIZED | | | |
| COL Acetate | FS 85 | Choline acetate | 14586-35-7 |
| COL Salicylate | FS 65 | Choline salicylate | 2016-36-6 |
| MTEOA $MeOSO_3$ | FS 01 | Tris-(2-hydroxyethyl)-methylammonium methylsulfate | 29463-06-7 |

Cellulose dopes, including ionic liquids having dissolved therein about 5% by weight underivatized cellulose, are commercially available from Aldrich. These compositions utilize alkyl-methylimidazolium acetate as the solvent. It has been found that choline-based ionic liquids are not particularly suitable for dissolving cellulose.

After the cellulosic dope is prepared, it is spun into fiber, fibrillated and incorporated into absorbent sheet, as described later.

A synthetic cellulose, such as lyocell, is split into micro- and nano-fibers, and added to conventional wood pulp. The fiber may be fibrillated in an unloaded disk refiner, for example, or any other suitable technique including using a PFI beater mill. Preferably, relatively short fiber is used, and the consistency kept low during fibrillation. The beneficial features of fibrillated lyocell include biodegradability, hydrogen bonding, dispersibility, repulpability, and smaller microfibers than obtainable with meltspun fibers, for example.

Fibrillated lyocell or its equivalent has advantages over splittable meltspun fibers. Synthetic microdenier fibers come in a variety of forms. For example, a 3 denier nylon/PET fiber in a so-called pie wedge configuration can be split into 16 or 32 segments, typically, in a hydroentangling process. Each segment of a 16-segment fiber would have a coarseness of about 2 mg/100 m versus eucalyptus pulp at about 7 mg/100 m. Unfortunately, a number of deficiencies has been identified with this approach for conventional wet laid applications. Dispersibility is less than optimal. Melt spun fibers must be split before sheet formation, and an efficient method is lacking. Most available polymers for these fibers are not biodegradable. The coarseness is lower than that of wood pulp, but still high enough that they must be used in substantial amounts and form a costly part of the furnish. Finally, the lack of hydrogen bonding requires other methods of retaining the fibers in the sheet.

Fibrillated lyocell has fibrils that can be as small as 0.1 to 0.25 microns (m) in diameter, translating to a coarseness of 0.0013 to 0.0079 mg/100 m. Assuming these fibrils are available as individual strands—separate from the parent fiber—the furnish fiber population can be dramatically increased at various addition rates. Even fibrils not separated from the parent fiber may provide benefit. Dispersibility, repulpability, hydrogen bonding, and biodegradability remain product attributes since the fibrils are cellulose.

Fibrils from lyocell fiber have important distinctions from wood pulp fibrils. The most important distinction is the length of the lyocell fibrils. Wood pulp fibrils are only perhaps microns long, and, therefore, act in the immediate area of a fiber-fiber bond. Wood pulp fibrillation from refining leads to stronger, denser sheets. Lyocell fibrils, however, are potentially as long as the parent fibers. These fibrils can act as independent fibers and improve the bulk, while maintaining or improving strength. Southern pine and mixed southern hardwood (MSHW) are two examples of fibers that are disadvantaged relative to premium pulps with respect to softness. The term "premium pulps" used herein refers to northern softwoods and eucalyptus kraft pulps commonly used in the tissue industry for producing the softest bath, facial, and towel grades. Southern pine is coarser than northern softwood kraft, and mixed southern hardwood is both coarser and higher in fines than market eucalyptus. The lower coarseness and lower fines content of premium market pulp leads to a higher fiber population, expressed as fibers per gram (N or $N_{i>0.2}$) in Table 3. The coarseness and length values in Table 3 were obtained with an OpTest Fiber Quality Analyzer. Definitions are as follows:

$$L_n = \frac{\sum_{all\ fibers} n_i L_i}{\sum_{all\ fibers} n_i}$$

$$L_{n,i>0.2} = \frac{\sum_{i>0.2} n_i L_i}{\sum_{i>0.2} n_i}$$

$$C = 10^5 \times \frac{sampleweight}{\sum_{all\ fibers} n_i L_i}$$

$$N = \frac{100}{CL} [=]\ millionfibers/\text{gram}$$

Northern bleached softwood kraft (NBSK) and eucalyptus have more fibers per gram than do southern pine and hardwood. Lower coarseness leads to higher fiber populations and smoother sheets.

TABLE 3

| Fiber Properties | | | | | | | |
|---|---|---|---|---|---|---|---|
| Sample | Type | C, mg/100 m | Fines, % | $L_{n,mm}$ | N, MM/g | $L_{n,i>0.2,mm}$ | $N_{i>0.2}$, MM/g |
| Southern HW | Pulp | 10.1 | 21 | 0.28 | 35 | 0.91 | 11 |
| Southern HW-low fines | Pulp | 10.1 | 7 | 0.54 | 18 | 0.94 | 11 |
| Aracruz Eucalyptus | Pulp | 6.9 | 5 | 0.50 | 29 | 0.72 | 20 |
| Southern SW | Pulp | 18.7 | 9 | 0.60 | 9 | 1.57 | 3 |
| Northern SW | Pulp | 14.2 | 3 | 1.24 | 6 | 1.74 | 4 |
| Southern (30 SW/70 HV) | Base sheet | 11.0 | 18 | 0.31 | 29 | 0.93 | 10 |
| 30 Southern SW/70 Eucalyptus | Base sheet | 8.3 | 7 | 0.47 | 26 | 0.77 | 16 |

For comparison, the "parent" or "stock" fibers of unfibrillated lyocell have a coarseness 16.6 mg/100 m before fibrillation and a diameter of about 11 to 12 μm.

Figure 4:
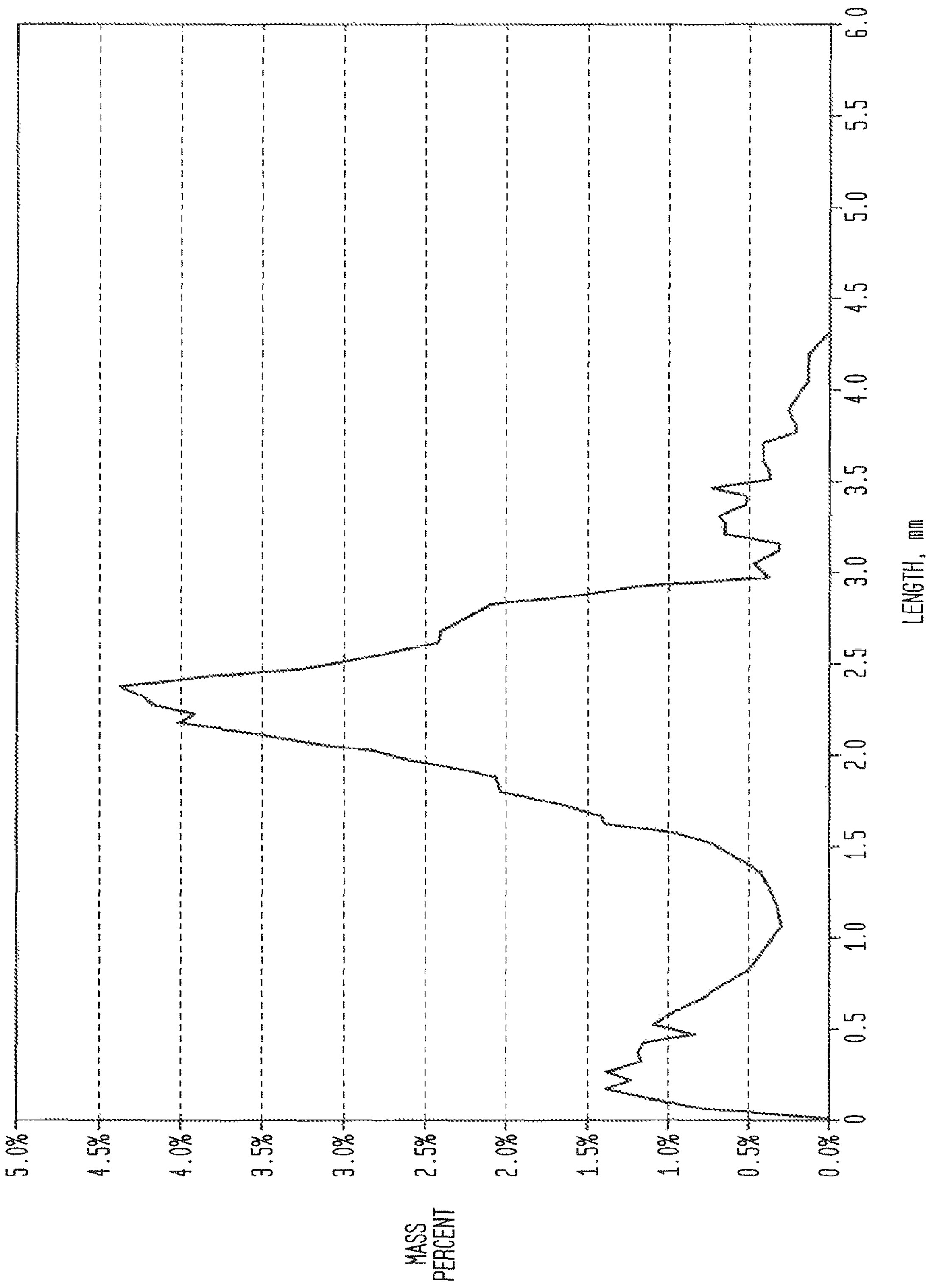
FIG. 4 illustrates the distribution of fiber lengths in a cellulosic microfiber, which is preferred for the practice of the present invention.
Figure 5:
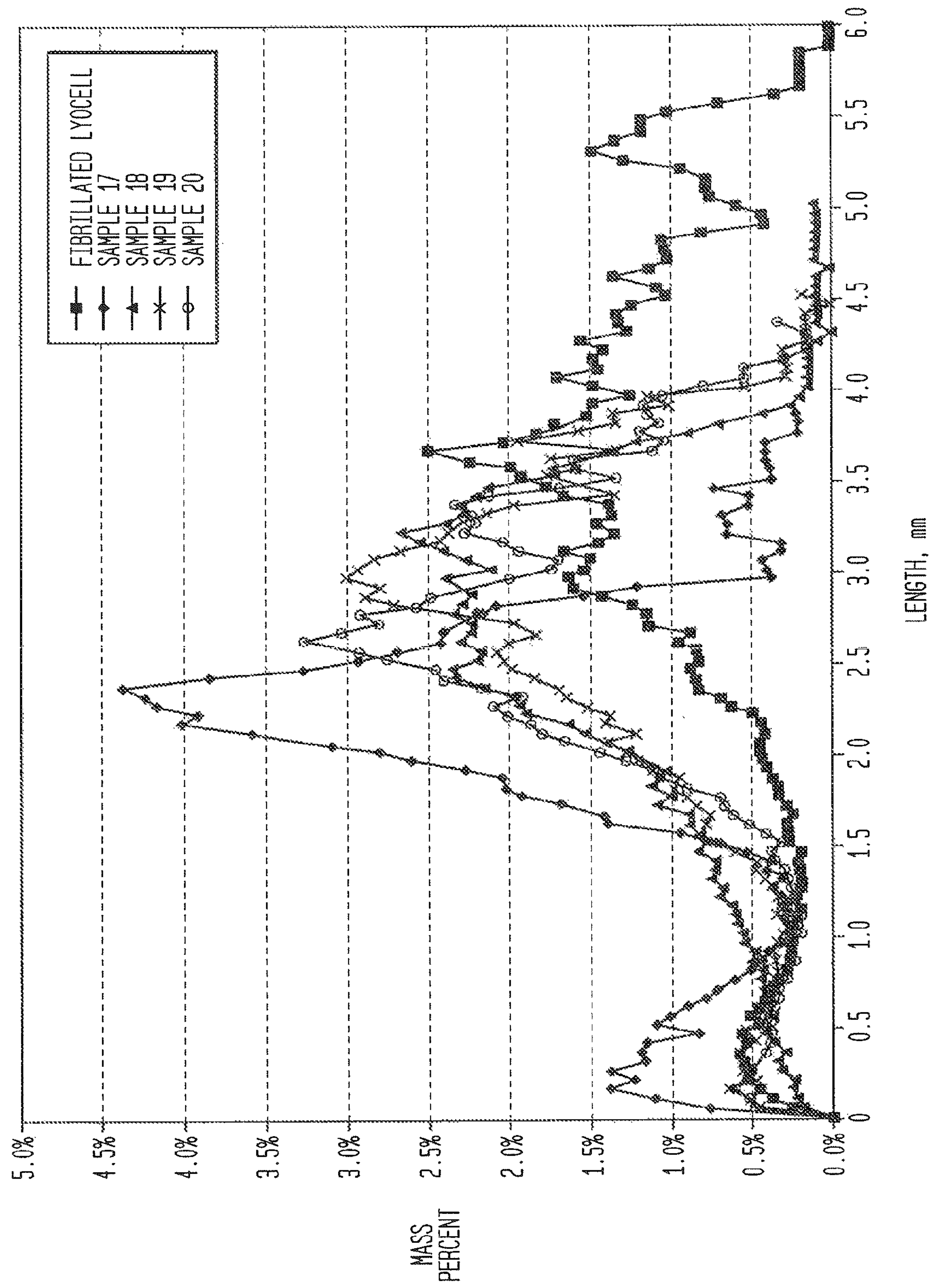
FIG. 5 illustrates the extraordinarily high percentage of very long cellulosic fibers attainable with fibrillated cellulosic microfibers.

The fibrils of fibrillated lyocell have a coarseness on the order of 0.001 to 0.008 mg/100 m. Thus, the fiber population can be dramatically increased at relatively low addition rates. FIG. 4 illustrates the distribution of fiber lengths found in regenerated cellulosic microfibers, which is preferred for the practice of the present invention. Fiber lengths of the parent fibers are selectable, and fiber length of the fibrils can depend on the starting length and the degree of cutting during the fibrillation process, as can be seen in FIG. 5.

The dimensions of the fibers passing the 200 mesh screen are on the order of 0.2 micron by 100 micron long. Using these dimensions, one calculates a fiber population of 200 billion fibers per gram. For perspective, southern pine might be three million fibers per gram and eucalyptus might be twenty million fibers per gram (Table 3). It appears that these fibers are the fibrils that are broken away from the original unrefined fibers. Different fiber shapes with lyocell intended to readily fibrillate could result in 0.2 micron diameter fibers that are perhaps 1000 microns or more long, instead of 100. As noted above, fibrillated fibers of regenerated cellulose may be made by producing "stock" fibers having a diameter of 10 to 12 microns, or so, followed by fibrillating the parent fibers. Alternatively, fibrillated lyocell microfibers have recently become available from Engineered Fibers Technology (Shelton, Conn.) having suitable properties.

Particularly preferred materials contain more than 40% fiber that is finer than 14 mesh and exhibit a very low coarseness (low freeness). For ready reference, mesh sizes appear in Table 4, below.

TABLE 4

| Mesh Size | | |
|---|---|---|
| Sieve Mesh # | Inches | Microns |
| 14 | .0555 | 1400 |
| 28 | .028 | 700 |
| 60 | .0098 | 250 |
| 100 | .0059 | 150 |
| 200 | .0029 | 74 |

Details as to fractionation using the Bauer-McNett Classifier appear in Gooding et al., "Fractionation in a Bauer-McNett Classifier", *Journal of Pulp and Paper Science*, Vol. 27, No. 12, Dec. 2001, the disclosure of which is incorporated herein by reference. A particularly preferred microfiber is shown in Table 4A.

TABLE 4A

| Fiber Length Distribution of Preferred Regenerated Cellulosic Microfibers | |
|---|---|
| Fiber Length | Weight % |
| +14 mesh | 2.3% |
| 28 mesh | 20.5% |
| 48 mesh | 10.6% |
| 100 mesh | 15.6% |
| 200 mesh | 17.2% |
| <200 mesh | 33.8% |

FIG. 5 is a plot showing fiber length as measured by a Fiber Quality Analyzer (FQA) for various samples of regenerated cellulosic microfibers. From this data, it is appreciated that much of the fine fiber is excluded by the FQA and length prior to fibrillation has an effect on fineness. The Optest Fiber Quality Analyzer has become a standard in the paper industry for determining fiber length distributions and fiber counts (above a certain minimum length that keeps decreasing steadily as Optest continually upgrades their technology). The OpTest Fiber Quality Analyzer is available from:

OpTest Equipment Inc.

900 Tupper St.—Hawkesbury—ON—K6A 3S3—Canada

Phone: 613-632-5169 Fax: 613-632-3744.

Example 1

Perforated Polymeric Belt Creping

A series of belt-creped base-sheets was prepared with the materials and layering described in Table 5, with the CMF having the approximate fiber length distribution shown in FIG. 4.

TABLE 5

| Base-sheet Cells | | | | | | | |
|---|---|---|---|---|---|---|---|
| Cell | NBSK % | CMF % | BW lb/R | CMC lb/t | Amres lb/t | Layered | Comments |
| 1 | 100 | 0 | 14 | 0 | 12 | No | Control, balanced charge |
| 2 | 80 | 20 | 14 | 0 | 12 | No | 20% CMF, two-ply towel |
| 3 | 60 | 40 | 14 | 0 | 12 | No | 40% CMF, two-ply towel |
| 4 | 40 | 60 | 14 | 0 | 12 | No | 60% CMF, two-ply towel |
| 5 | 100 | 0 | 14 | 12 | 40 | No | Control, high resin |
| 6 | 80 | 20 | 14 | 12 | 40 | No | 20% CMF, two-ply towel, high wet |
| 7 | 60 | 40 | 14 | 12 | 40 | No | 40% CMF, two-ply towel, high wet |
| 8 | 40 | 60 | 14 | 12 | 40 | No | 60% CMF, two-ply towel, high wet |
| 9 | 60 | 40 | 14 | 12 | 40 | Yes | 100% CMF on surface |
| 10 | 40 | 60 | 14 | 12 | 40 | Yes | 100% CMF on surface, calender |
| 11 | 40 | 60 | 14 | 12 | 40 | No | High wet/dry 3 lb/t GP-C in MC 1 and MC 2 |
| 12 | 40 | 60 | 14 | 12 | 40 | No | High wet/dry 3 lb/t GP-C, calender |
| 13 | 60 | 40 | 14 | 12 | 40 | No | High wet/dry 3 lb/t GP-C in MC 1 and MC 2 |

100% NBSK was delivered from a first machine chest. 100% CMF was supplied from a second machine chest. The softwood fiber was refined an average of 2.2 HPD/ton based on total flow, requiring less refined horsepower as softwood fiber content decreased. The average freeness of the softwood fiber across the trial was 541 ml CSF.

Amres® HP 100, from Georgia-Pacific Resins, Inc., was split proportionally to the suction of each machine chest pump. Amtex Gelycel® carboxymethylcellulose (CMC) was split proportionally to the static mixer or stuff box. Titratable charge averaged 0.02 ml/10 ml for cells with no CMC and 12 lb/ton Amres®. Titratable charge averaged −0.17 ml/10 ml for cells with 12 lb/ton CMC and 40 lb/ton Amres®.

Trial speed averages appear in Table 6:

TABLE 6

| Trial Speed Averages | |
|---|---|
| Jet Speed, fpm | 2450 |
| Form Roll Speed, fpm | 1574 |
| Small Dryer Speed, fpm | 1559 |
| Yankee Speed, fpm | 1251 |
| Reel Speed, fpm | 1190 |
| Jet/Wire Ratio | 1.56 |
| Fabric Crepe Ratio | 1.25 |
| Reel Crepe Ratio | 1.05 |
| Total Crepe Ratio | 1.31 |

Figure 7:
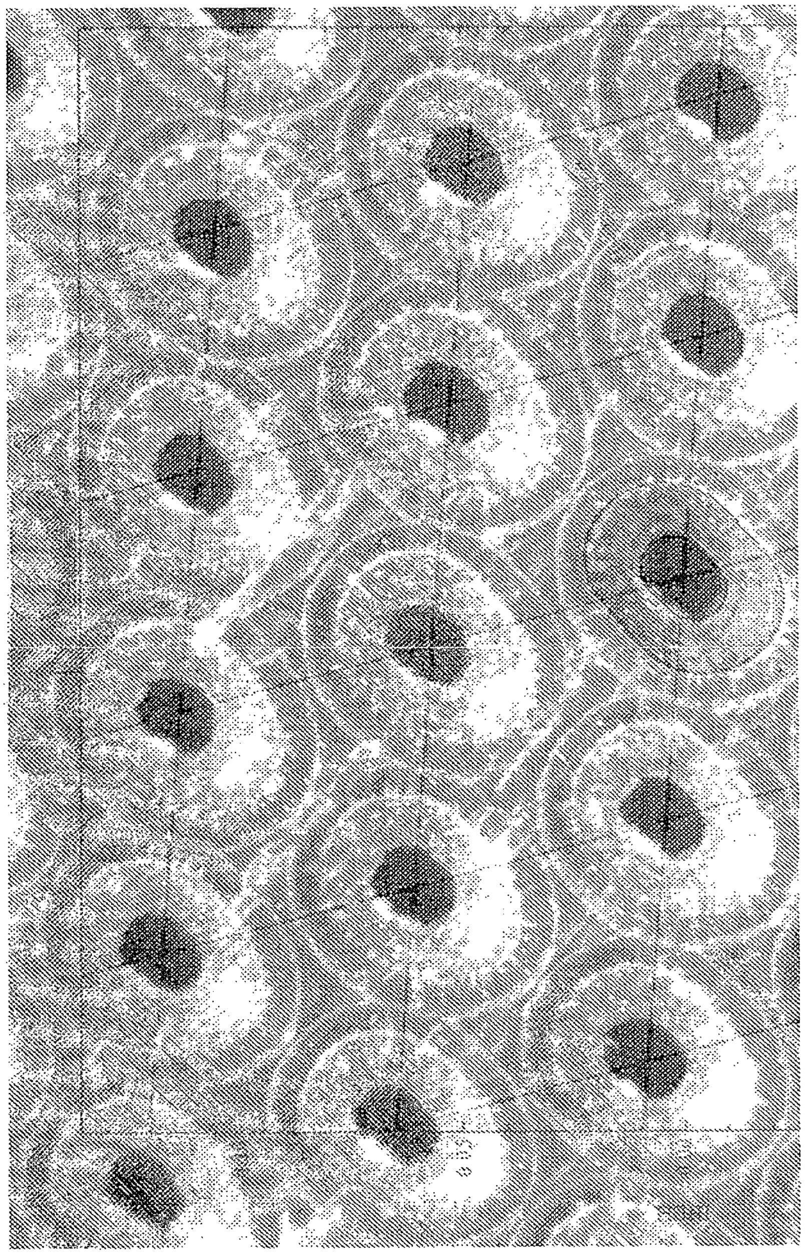
FIG. 7 illustrates the sheet contact surface of a perforated polymeric belt mentioned in Example 1.

A perforated polymer creping belt was used as described in U.S. Patent Application Publication No. 2010/0186913, entitled "Belt-Creped, Variable Local Basis Weight Absorbent Sheet Prepared With Perforated Polymeric Belt", now U.S. Pat. No. 8,293,072, the disclosure of which is incorporated herein by reference. The sheet contact surface of the perforated polymeric belt is illustrated in FIG. 7.

Figure 6:
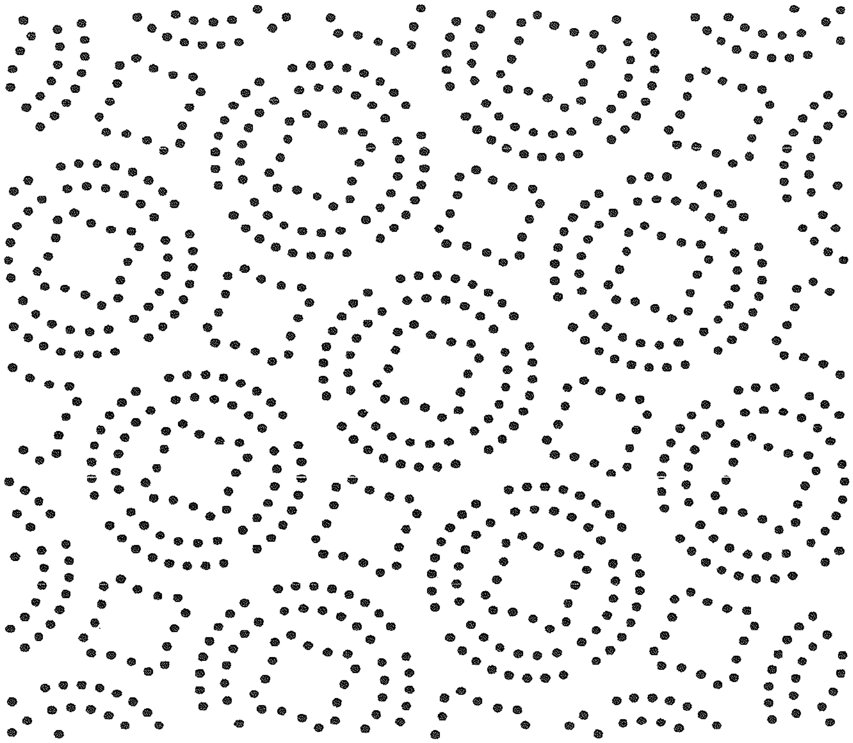
FIG. 6 illustrates the emboss pattern known as "Fantale" mentioned in Example 2.

The basesheets produced had the properties set forth in Table 7. Base-sheets were converted to two-ply sheet using Fantale emboss pattern, FIG. 6, with a THVS configuration, that is, the pattern is embossed into only one of the two plies, which is joined to the non-embossed ply by glue lamination in points to the inside configuration, such that the outer surface of the embossed ply is debossed, and the asperities created by embossing bear against and are shielded by the unembossed ply.

Softness panel, wet lint, and wipe dry tests were completed in addition to conventional strength and absorbency tests described above. Porosity of the sheets is discussed in some detail below. The results of these tests are set forth in Table 8.

TABLE 7

| Basesheet (perforated polymeric belt creped) | | | | | | | | | | | | | |
|---|---|---|---|---|---|---|---|---|---|---|---|---|---|
| Roll | CMF Percent | Amres ®, lb/t | Caliper 8 Sheet mils/8 sht | Basis Weight lb/3000 $ft^2$ | MD Tensile g/3 in. | MD Stretch % | CD Tensile g/3 in. | CD Stretch % | CD Wet Tens Finch Cured g/3 in. | SAT Capacity $g/m^2$ | GM Tensile g/3 in. | GM Break Modulus gms/% | CD Tensile Wet/Dry Unitless |
| 22989 | 0 | 12 | 77.7 | 14.0 | 1891 | 31.7 | 1556 | 6.5 | 345 | 364 | 1714 | 121 | 0.22 |
| 22988 | 0 | 12 | 77.5 | 14.5 | 1928 | 33.7 | 1539 | 6.4 | 317 | 354 | 1722 | 119 | 0.21 |
| 22990 | 20 | 12 | 74.6 | 14.1 | 1939 | 37.3 | 2068 | 7.6 | 554 | 336 | 2002 | 119 | 0.27 |
| 22992 | 20 | 12 | 73.4 | 14.3 | 2177 | 36.1 | 1886 | 6.4 | 561 | 332 | 2026 | 135 | 0.30 |
| 22996 | 40 | 12 | 86.9 | 14.0 | 1802 | 40.3 | 1931 | 9.1 | 486 | 377 | 1865 | 99 | 0.25 |
| 22997 | 40 | 12 | 83.9 | 14.5 | 1837 | 39.1 | 1766 | 8.6 | 544 | 373 | 1799 | 101 | 0.31 |
| 22998 | 60 | 12 | 94.8 | 13.8 | 1419 | 39.2 | 1324 | 9.1 | 445 | 392 | 1369 | 73 | 0.34 |
| 22999 | 60 | 12 | 94.6 | 14.8 | 1756 | 42.2 | 1340 | 9.9 | 520 | 404 | 1534 | 74 | 0.39 |
| 23010 | 0 | 40 | 88.2 | 14.3 | 1881 | 25.3 | 2490 | 6.6 | 924 | 403 | 2162 | 170 | 0.37 |
| 23012 | 0 | 40 | 84.2 | 14.9 | 2877 | 32.7 | 2086 | 6.4 | 696 | 435 | 2449 | 168 | 0.33 |
| 23015 | 20 | 40 | 87.0 | 14.0 | 2535 | 32.3 | 2701 | 8.0 | 1,155 | 410 | 2615 | 165 | 0.43 |
| 23017 | 20 | 40 | 88.2 | 14.6 | 2307 | 31.1 | 2235 | 6.3 | 1,078 | 410 | 2266 | 162 | 0.48 |
| 23019 | 40 | 40 | 89.1 | 14.5 | 2833 | 38.0 | 2393 | 8.6 | 968 | 399 | 2602 | 146 | 0.40 |
| 23020 | 40 | 40 | 93.8 | 14.6 | 2640 | 39.5 | 2468 | 9.2 | 1,147 | 400 | 2552 | 134 | 0.46 |
| 23024 | 60 | 40 | 99.4 | 14.1 | 2342 | 37.6 | 2216 | 9.8 | 1,077 | 431 | 2278 | 117 | 0.49 |
| 23025 | 60 | 40 | 92.0 | 14.5 | 2412 | 36.7 | 1868 | 8.6 | 993 | 403 | 2123 | 119 | 0.53 |
| 23027 | 40 | 40 | 97.1 | 14.0 | 2148 | 38.0 | 1950 | 9.3 | 810 | 432 | 2043 | 112 | 0.42 |
| 23028 | 40 | 40 | 93.4 | 14.4 | 2315 | 37.4 | 2075 | 9.2 | 845 | 416 | 2192 | 118 | 0.41 |
| 23032 | 60 | 40 | 104.1 | 13.8 | 2761 | 36.7 | 2453 | 9.3 | 1,325 | 473 | 2602 | 143 | 0.54 |
| 23034 | 60 | 40 | 70.6 | 14.4 | 3286 | 38.1 | 3058 | 9.5 | 1,378 | 395 | 3169 | 169 | 0.45 |
| 23036 | 40 strat Y* | 40 | 96.8 | 14.1 | 2811 | 38.2 | 2973 | 8.4 | 1,393 | 447 | 2891 | 159 | 0.47 |
| 23037 | 40 strat Y* | 40 | 95.9 | 13.9 | 3080 | 37.1 | 3047 | 7.8 | 1,432 | 446 | 3063 | 177 | 0.47 |
| 23038 | 40 strat Y* | 40 | 66.0 | 12.9 | 2895 | 37.7 | 2999 | 8.8 | 1,444 | 391 | 2946 | 163 | 0.48 |
| 23040 | 40 strat Y* | 40 | 62.4 | 13.0 | 2172 | 37.9 | 2315 | 8.0 | 1,050 | 356 | 2242 | 129 | 0.45 |

*The overall composition of the Yankee side ply is 40% CMF by weight with the Yankee side layer of the headbox issuing substantially 100% CMF.

TABLE 8

| Finished Product Data (perforated polymeric belt creped) | | | | | | | | | | |
|---|---|---|---|---|---|---|---|---|---|---|
| | Description | Basesheet | CMF | Softness Panel | Basis Weight lb/3000 $ft^2$ | Caliper 8 Sheet mils/ 8 sht | MD Tensile g/3 in. | MD Stretch % | CD Tensile g/3 in. | CD Stretch % |
| 1 | P3424.1 | 22989 22988 | 0 | 6.26 | 28.6 | 184 | 3,321 | 29 | 2,949 | 7.4 |
| 2 | P3425.1 | 23010 23012 | 0 | 4.88 | 29.6 | 204 | 4,057 | 28 | 4,547 | 8.3 |
| 3 | P3426.1 | 23033 23032 | 60 | 4.73 | 27.9 | 227 | 5,156 | 31 | 4,379 | 9.7 |
| 4 | P3427.1 | 23034 23032 | 60 | 4 62 | 28.4 | 215 | 5,191 | 30 | 4,382 | 9.6 |
| 5 | P3428.1 | 23036 23037 | 40 | 5.37 | 28.0 | 221 | 5,007 | 31 | 5,082 | 9.1 |
| 6 | P3429.1 | 23038 23040 | 40 | 5.75 | 25.8 | 185 | 4,315 | 30 | 4,499 | 8.9 |
| 7 | P3430.1 | 23024 23025 | 60 | 5.77 | 28.5 | 203 | 4,773 | 34 | 3,958 | 10.4 |
| 8 | P3431.1 | 23028 23027 | 40 | 7.29 | 27.7 | 205 | 3,791 | 31 | 3,624 | 10.2 |
| 9 | P3432,053 | 23020 23019 | 40 | | 29.2 | 182 | 5,696 | 35 | 4,999 | 9.9 |
| 10 | P3432,083 | 23020 23019 | 40 | | 29.2 | 240 | 4,487 | 31 | 4,032 | 9.6 |
| 11 | P3531,053 | 23028 23027 | 40 | | 27.8 | 183 | 4,413 | 32 | 3,970 | 10.0 |
| 12 | P3531,083 | 23028 23027 | 40 | | 27.7 | 225 | 3,825 | 31 | 3,143 | 10.2 |
| 13 | P3432.1 | 23020 23019 | 40 | 5.14 | 29.2 | 205 | 5,377 | 35 | 4,672 | 11.1 |
| 14 | P3433.1 | 22999 22998 | 60 | 8.02 | 28.3 | 193 | 3,584 | 38 | 3,142 | 12.4 |
| 15 | P3434.1 | 23015 23017 | 20 | 4.67 | 28.8 | 204 | 4,761 | 32 | 4,895 | 9.6 |
| 16 | P3435.1 | 22997 22996 | 40 | 6.75 | 28.7 | 186 | 3,579 | 36 | 3,535 | 11.0 |
| 17 | P3436.1 | 22990 22992 | 20 | 6.33 | 29.3 | 182 | 3,554 | 32 | 3,536 | 8.3 |

| | GM Tensile g/3 in. | Wet Tens Finch Cured-CD g/3 in. | CD Tensile Wet/Dry Unitless | SAT Capacity $g/m^2$ | SAT Rate $g/s^{0.5}$ | SAT Time s | Break Modulus GM g/% | Wet Extracted Lint % | Wipe Dry Top s | Wipe Dry Bottom s |
|---|---|---|---|---|---|---|---|---|---|---|
| 1 | 3,128 | 730 | 0.25 | 395 | 0.27 | 20 | 212 | 0.25 | 19 | 32 |
| 2 | 4,293 | 1,380 | 0.30 | 440 | 0.33 | 17 | 283 | 0.22 | 23 | 34 |
| 3 | 4,747 | 2,263 | 0.52 | 438 | 0.09 | 105 | 280 | 0.09 | 9 | 9 |
| 4 | 4,764 | 2,185 | 0.50 | 446 | 0.11 | 74 | 278 | 0.11 | 12 | 10 |
| 5 | 5,042 | 2,262 | 0.45 | 468 | 0.12 | 69 | 300 | 0.19 | 12 | 11 |
| 6 | 4,404 | 1,934 | 0.43 | 418 | 0.14 | 42 | 267 | 0.17 | 10 | 9 |
| 7 | 4,345 | 1,856 | 0.47 | 439 | 0.10 | 104 | 230 | 0.21 | 11 | 9 |
| 8 | 3,705 | 1,494 | 0.41 | 415 | 0.10 | 79 | 210 | 0.10 | 9 | 8 |
| 9 | 5,333 | 1,924 | 0.39 | 409 | 0.11 | 79 | 288 | 0.28 | 13 | 13 |
| 10 | 4,252 | 1,669 | 0.41 | 459 | 0.16 | 42 | 245 | 0.28 | 23 | 11 |
| 11 | 4,184 | 1,677 | 0.42 | 393 | 0.10 | 78 | 235 | 0.09 | 9 | 7 |
| 12 | 3,466 | 1,395 | 0.44 | 451 | 0.12 | 69 | 194 | 0.10 | 9 | 10 |
| 13 | 5,011 | 1,903 | 0.41 | 411 | 0.10 | 79 | 251 | 0.25 | 10 | 13 |

TABLE 8-continued

| Finished Product Data (perforated polymeric belt creped) | | | | | | | | | | |
|---|---|---|---|---|---|---|---|---|---|---|
| 14 | 3,356 | 937 | 0.30 | 395 | 0.07 | 133 | 154 | 0.14 | 5 | 5 |
| 15 | 4,825 | 1,745 | 0.36 | 430 | 0.21 | 25 | 276 | 0.21 | 25 | 17 |
| 16 | 3,556 | 1,077 | 0.30 | 391 | 0.09 | 77 | 178 | 0.13 | 9 | 9 |
| 17 | 3,545 | 1,007 | 0.29 | 353 | 0.14 | 37 | 216 | 0.39 | 15 | 18 |

Details as to base-sheet properties and converted two-ply wiper properties appear in Tables 7 and 8. From Table 8, it can be appreciated that the addition of even 20% CMF significantly improves the wipe dry characteristics of the sheets. See lines 15 and 17 in comparison to lines 1 and 2, while improvement in wipe dry starts leveling out with the addition of 40% CMF. Compare line 16 with lines 3, 4 and 7. As is shown in line 14, however, the best overall results for wipe dry and softness were obtained with 60% CMF.

Figure 2:
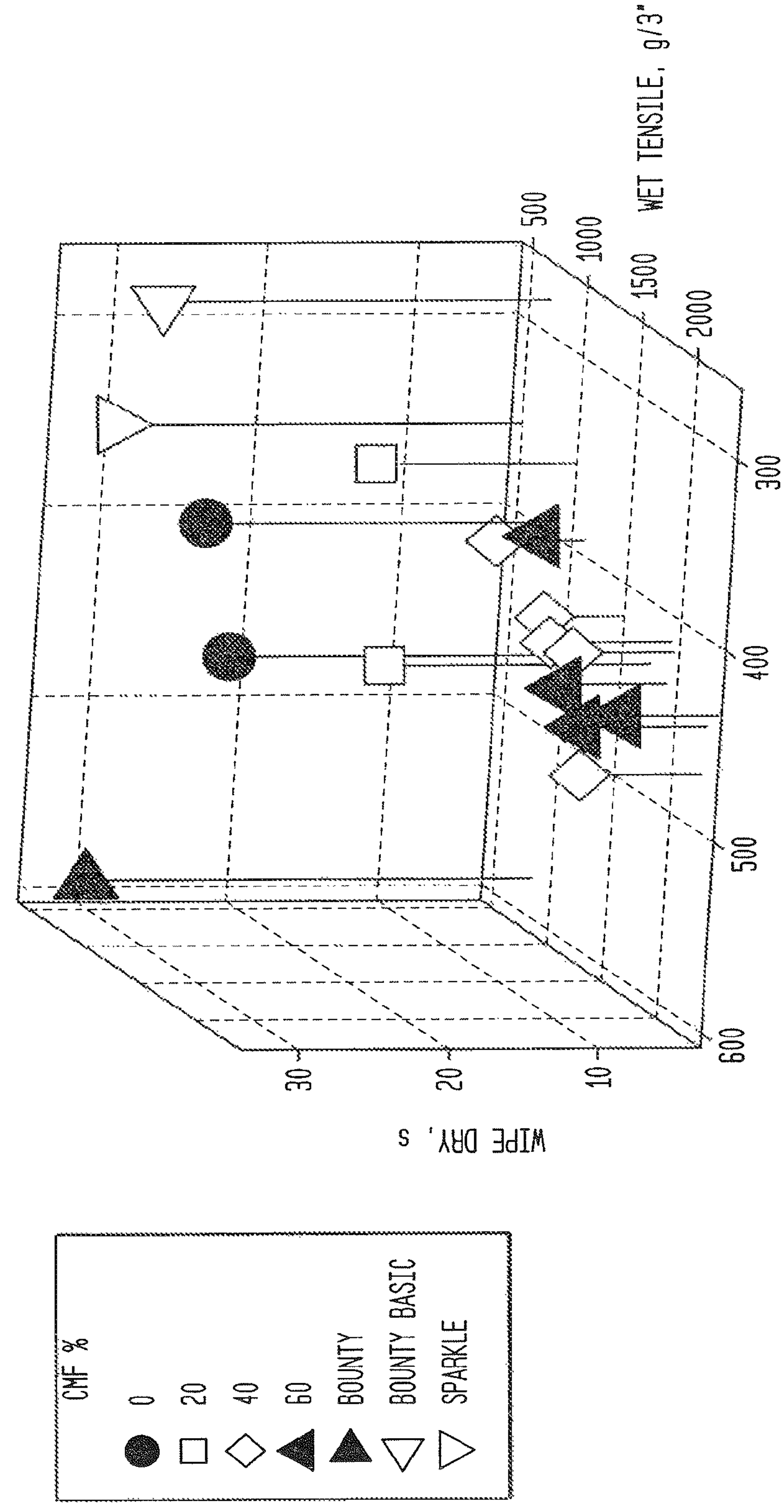
FIG. 2 illustrates the wipe dry times of three commercially available kitchen roll towel products as compared to two ply wipers containing varying amounts of CMF formed by belt creping from a transfer cylinder using an exemplary perforated belt as described herein and illustrated in FIG. 7.
Figure 10:
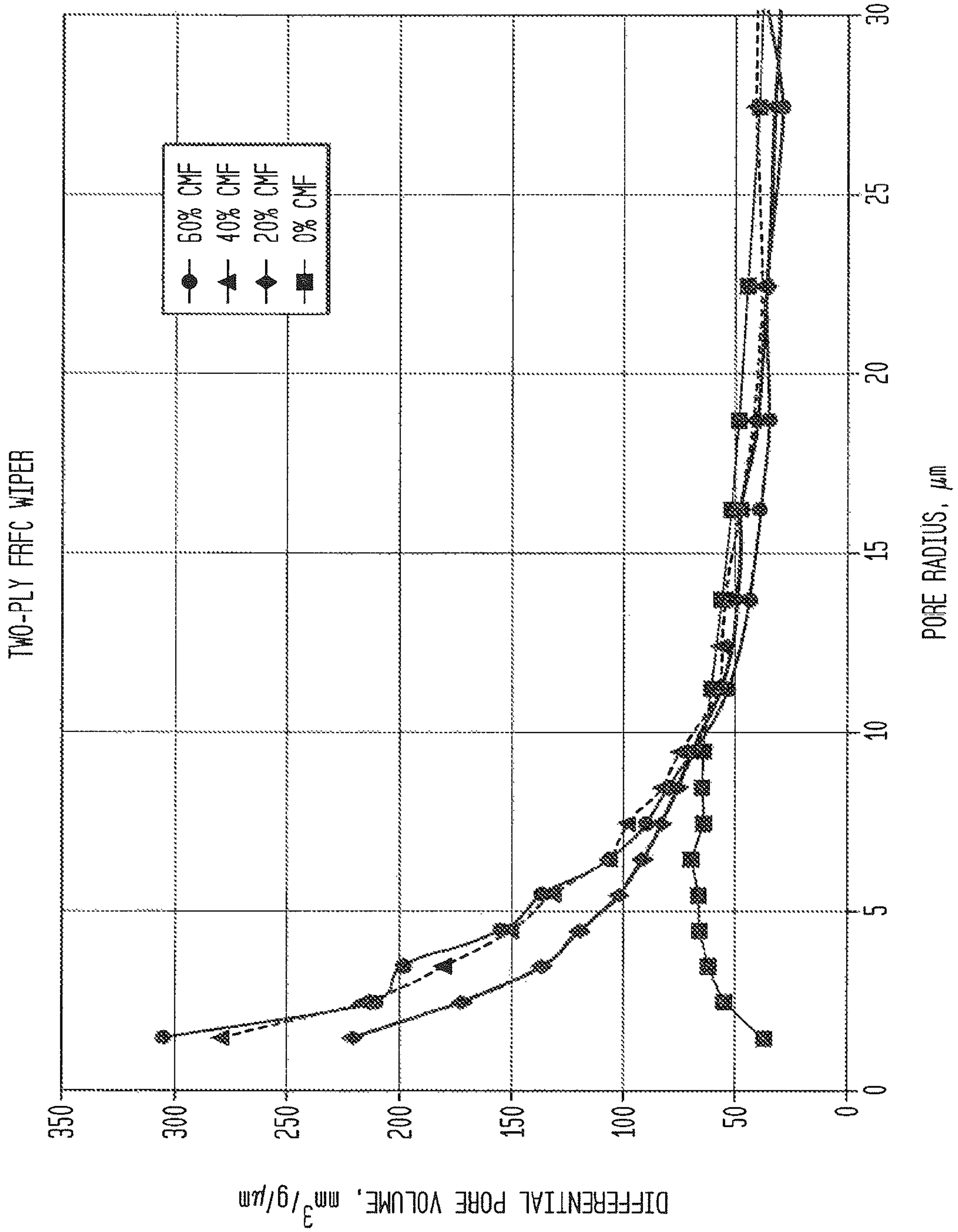
FIG. 10 illustrates the extraordinarily high percentage of very small pores attainable in wipers comprising various amounts of fibrillated cellulosic microfibers.
Figure 11:
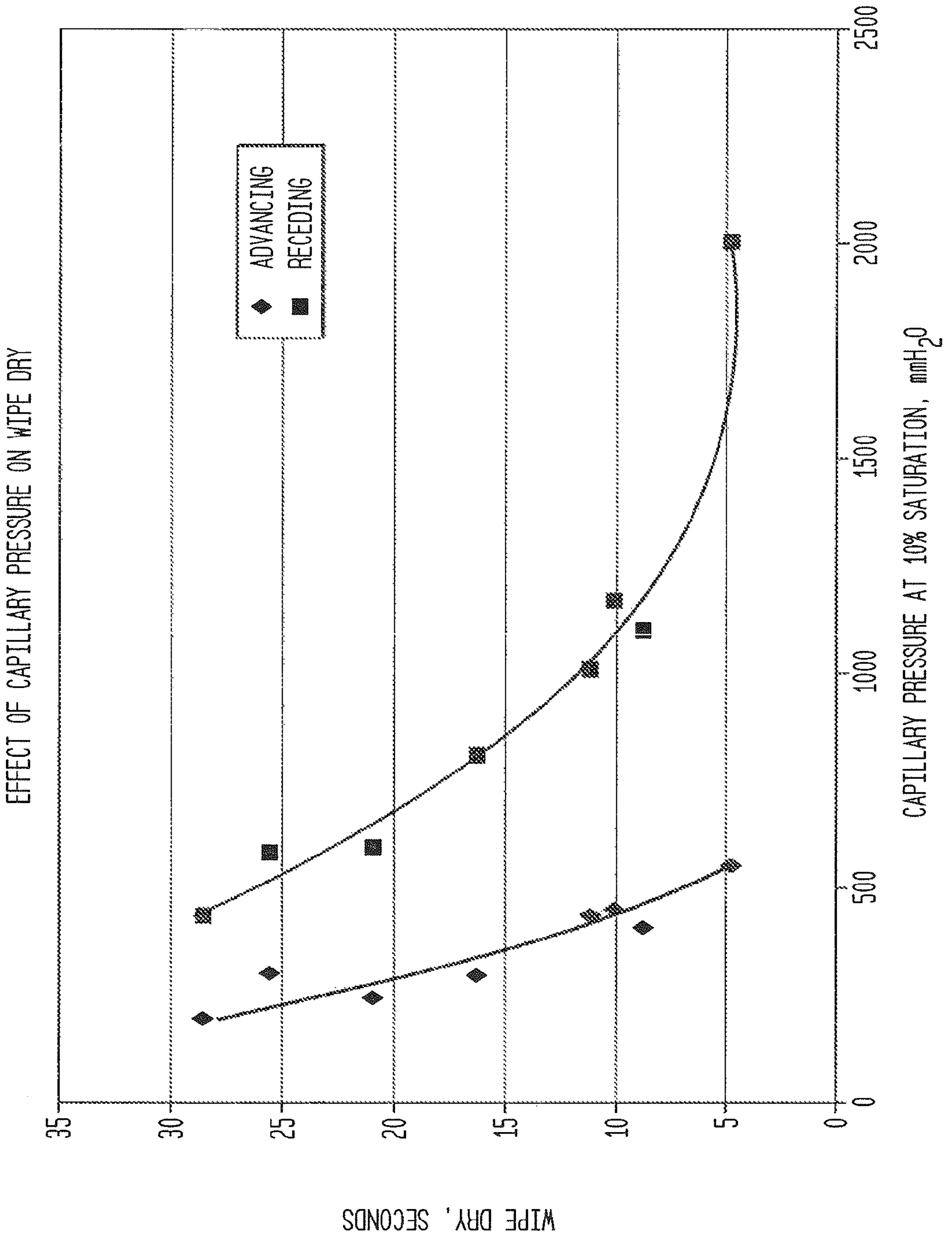
FIG. 11 illustrates the relationship between wipe dry times and capillary pressure in wipers.
Figure 12:
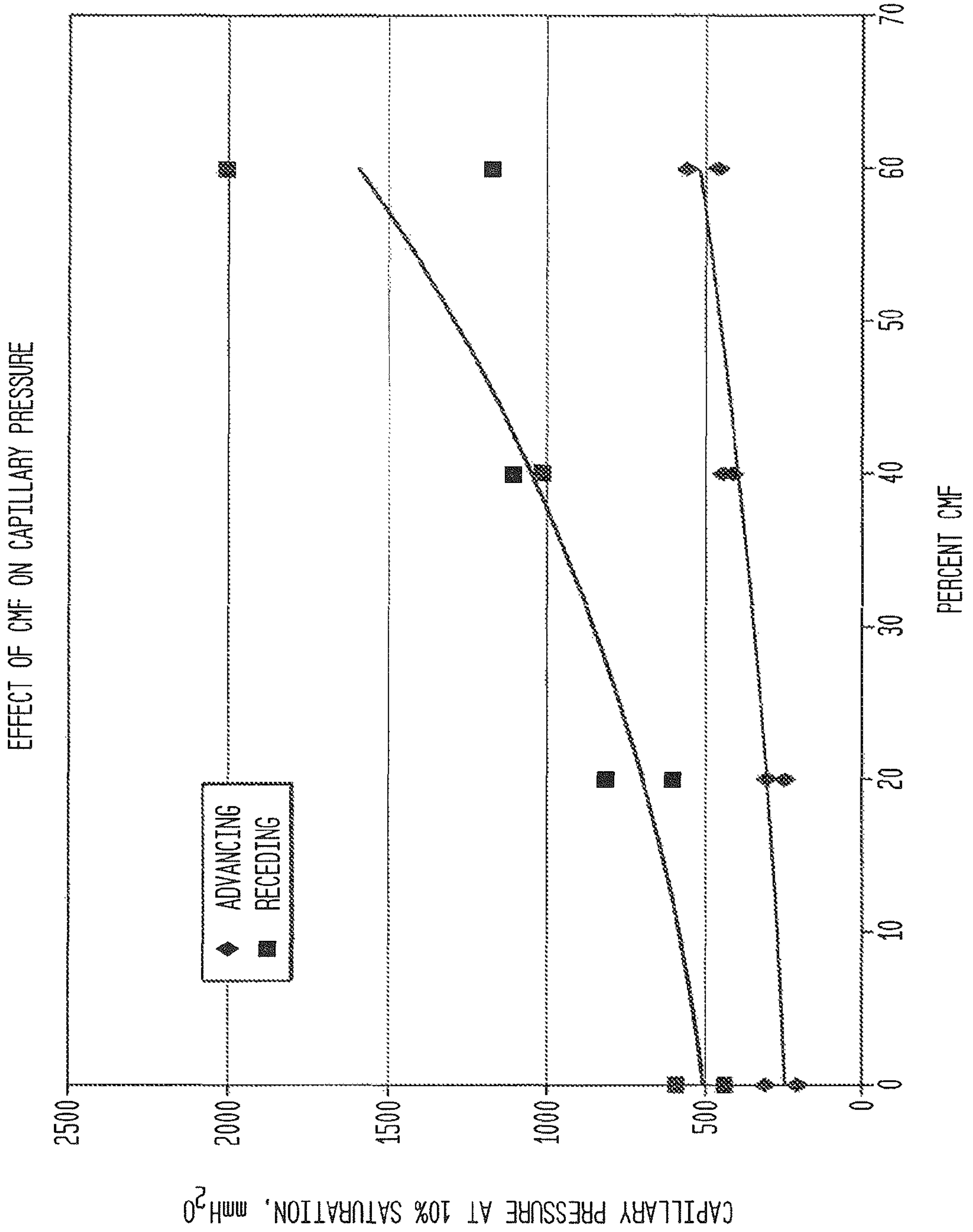
FIG. 12 illustrates the relationship between capillary pressure and fibrillated cellulosic microfibers content in wipers.

Referring to FIG. 2, it is seen that the two-ply products of the invention exhibit wipe dry and wet tensile that is far superior to that achieved with the conventional towel. As illustrated in FIGS. 10, 11, and 12, it appears that faster wipe dry times may be at least partially attributable to the micropore structure of the sheets formed. In FIG. 10, it can be seen that as CMF is increased, the number of pores less than 5 microns also increases, while the curves for products with 40 or 60% CMF are essentially similar, again, suggesting that only diminishing benefit is obtained beyond 40% CMF. This hypothesis is consistent with that shown in FIG. 10, showing that 20% CMF significantly improves wipe dry, but the effect levels off above 40% CMF. Preferred wiper towel products exhibit a differential pore volume for pores under 5 microns having a diameter of at least about 75 $mm^3$/g/micron, more preferably, above about 100 $mm^3$/g/micron, still more preferably, above about 150 $mm^3$/g/micron for pores under 2.5 microns.

FIG. 11 suggests that there is a correlation between wipe dry and capillary pressure at 10% saturation, both in advancing and receding mode. FIG. 12 shows increasing capillary pressure at 10% saturation as CMF is increased.

Figure 13:
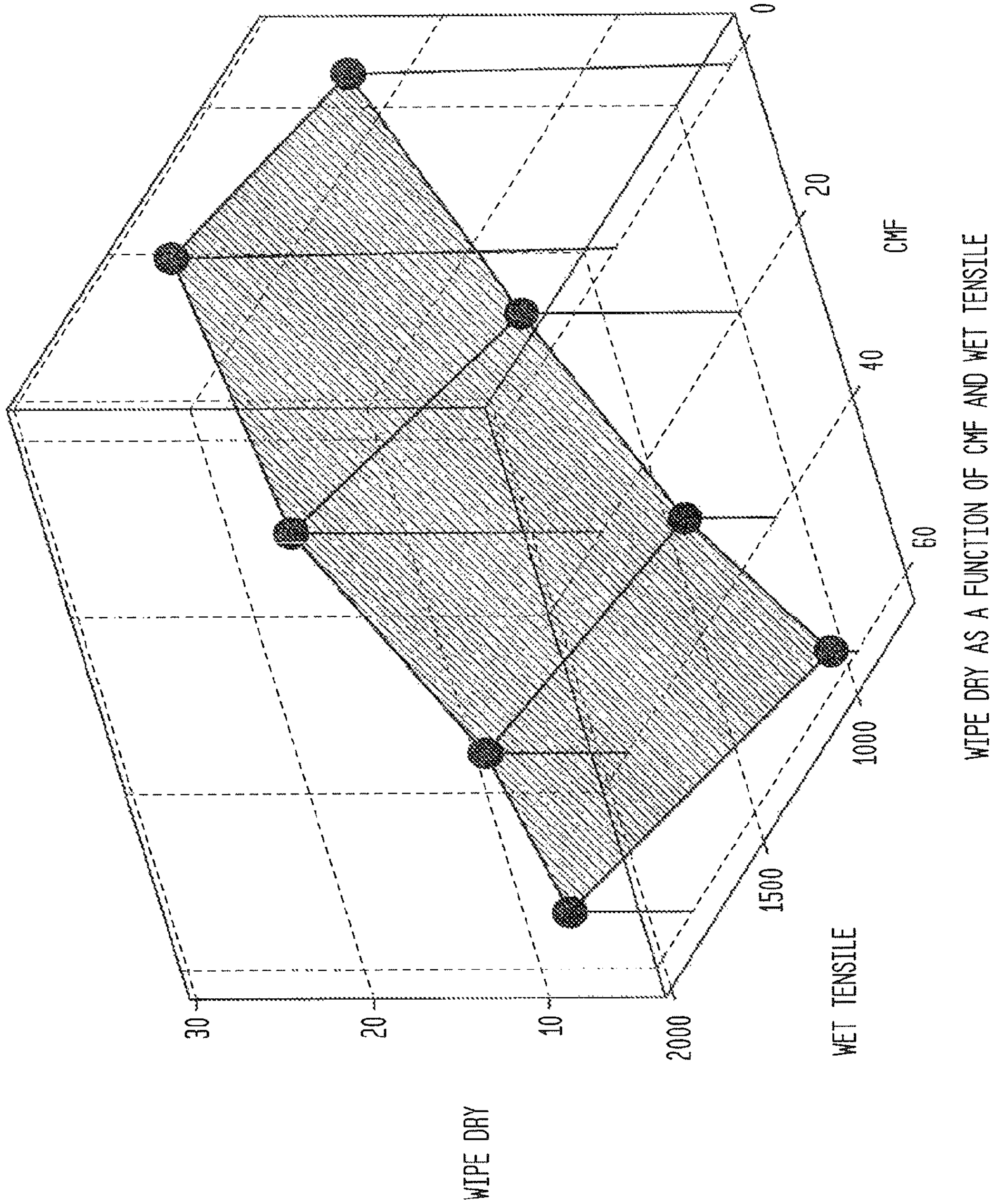
FIG. 13 illustrates the inter-relationship among wet tensile strength, wipe dry time, and content of fibrillated cellulosic microfibers content in a wiper.

FIG. 13 shows wipe dry as a function of CMF and wet strength. Cellulose microfibers (CMF) were varied between 0 and 60%, and Amres® wet strength resin was either 12 lb/ton or 40 lb/ton. Carboxymethycellulose (CMC) was added at the higher wet strength dosage to balance charge. The non-CMF portion of the furnish was NBSWK refined at a constant net specific horsepower, so that strength changes can be primarily attributed to CMF and resin rather than NBSK refining level. The two curves at roughly constant wet tensile define three planes comprising a 3-D surface on which wipe dry time beneficially decreases as the amount of CMF in the sheet is increased, indicating that wipe dry times of under 10 seconds can be obtained with 40% CMF in the sheet. The surface in FIG. 13 can be described by Equation 1:

$$\text{Wipe Dry}=22.1-0.662\cdot\text{CMF}+0.00495\cdot\text{CMF}^2+0.00493\cdot\text{Wet Tensile}\quad R^2=0.99 \qquad \text{Equation (1)}$$

Figure 3:
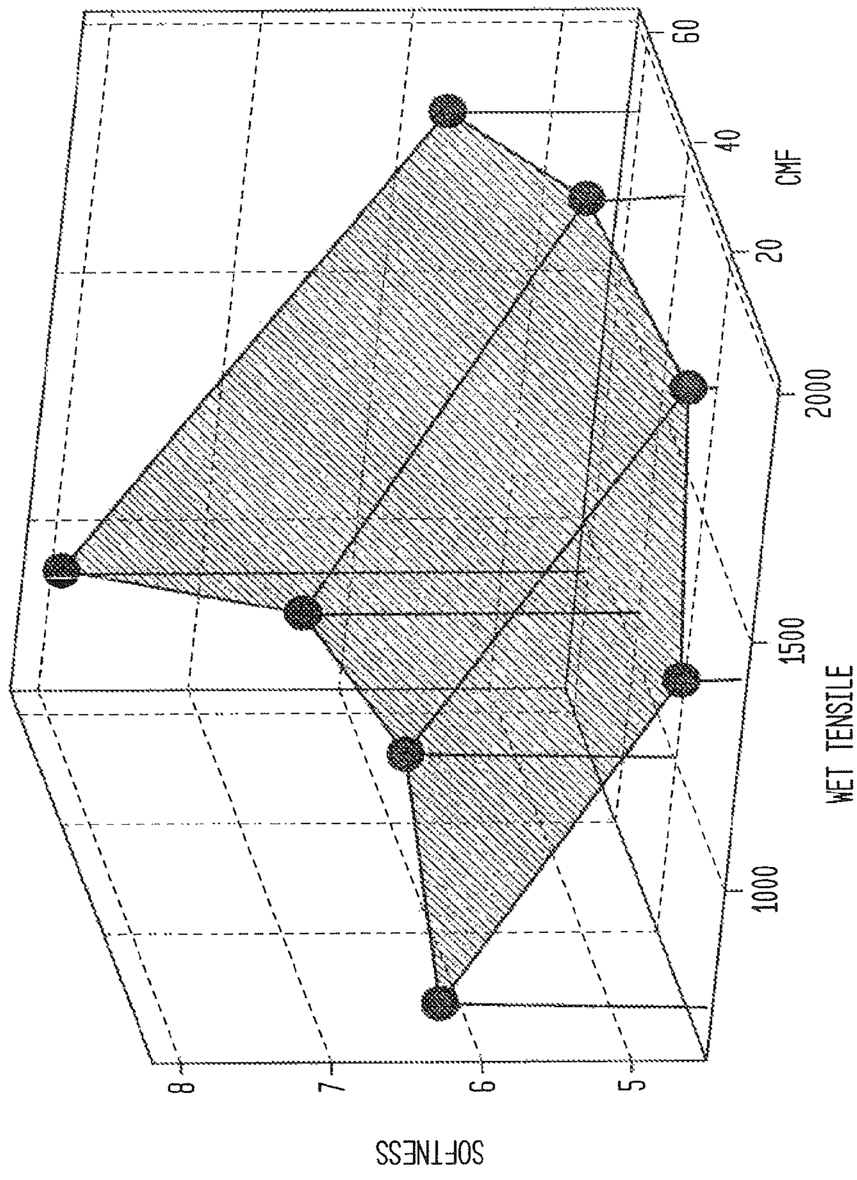
FIG. 3 illustrates the relationship among softness, wet tensile strength, and fibrillated cellulosic microfibers content in wipers.

FIG. 3 shows the impact of CMF and wet tensile on softness. CMF has a positive impact, while increasing wet tensile strength reduces softness. The surface in FIG. 3 can be described by Equation 2:

$$\text{Softness}=7.90+0.0348\text{CMF}-0.00223\ \text{Wet Tensile}\quad R^2=0.99 \qquad \text{Equation (2)}$$

Figure 14:
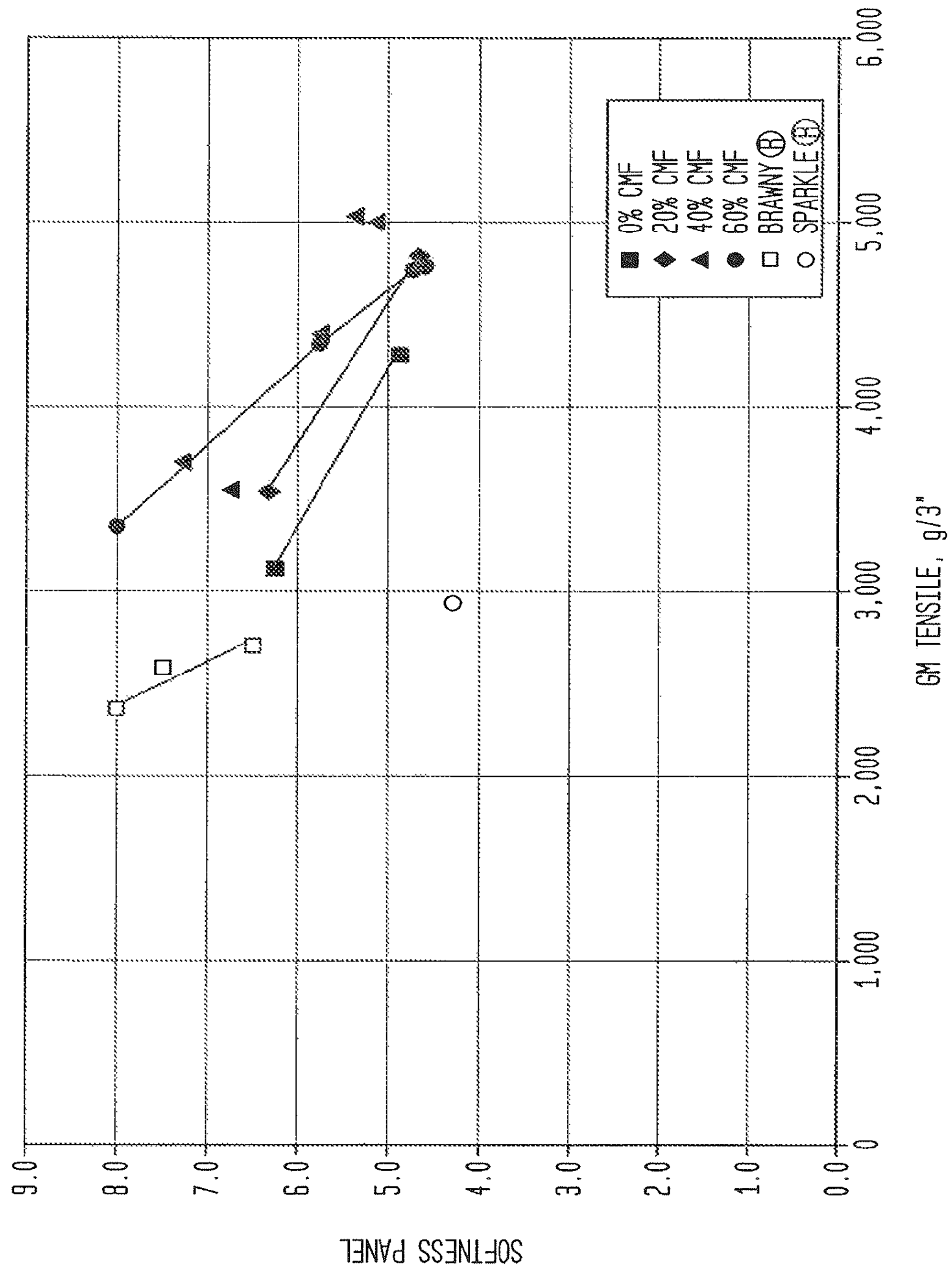
FIG. 14 illustrates the softness of a variety of wipers as a function of GM tensile strength with fibrillated cellulosic microfibers content being indicated as a parameter.
Figure 15:
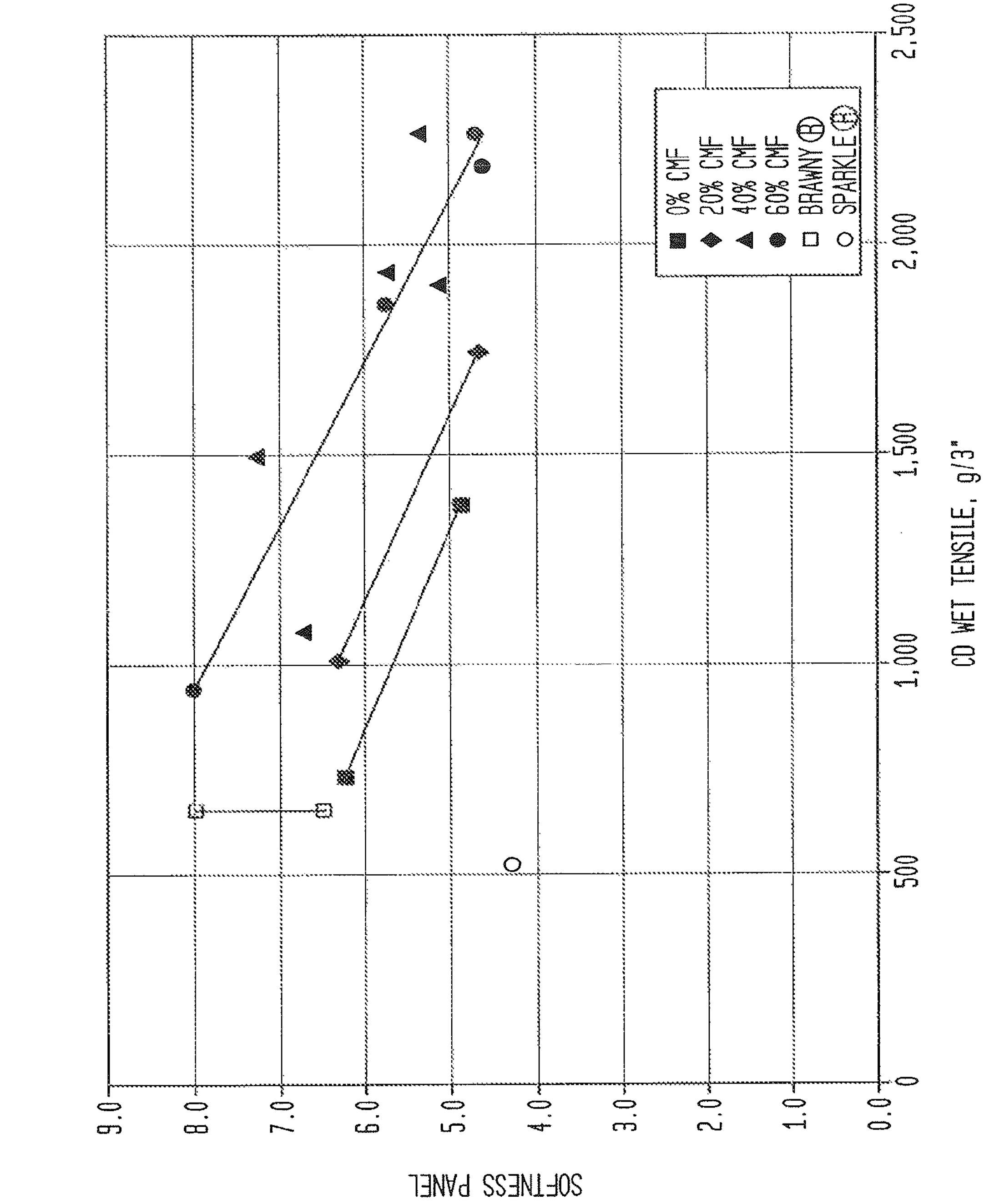
FIG. 15 illustrates the softness of a variety of wipers as a function of cross machine direction (CD) wet tensile strength with fibrillated cellulosic microfibers content being indicated as a parameter.

FIGS. 2, 14, and 15 illustrate the results of analyses of towels and wipers produced in Example 1, and include retail towel data for comparison. Surprisingly, the inventive product has higher wet tensile at a given softness level than Brawny® towels or Sparkle® towels.

Figure 16:
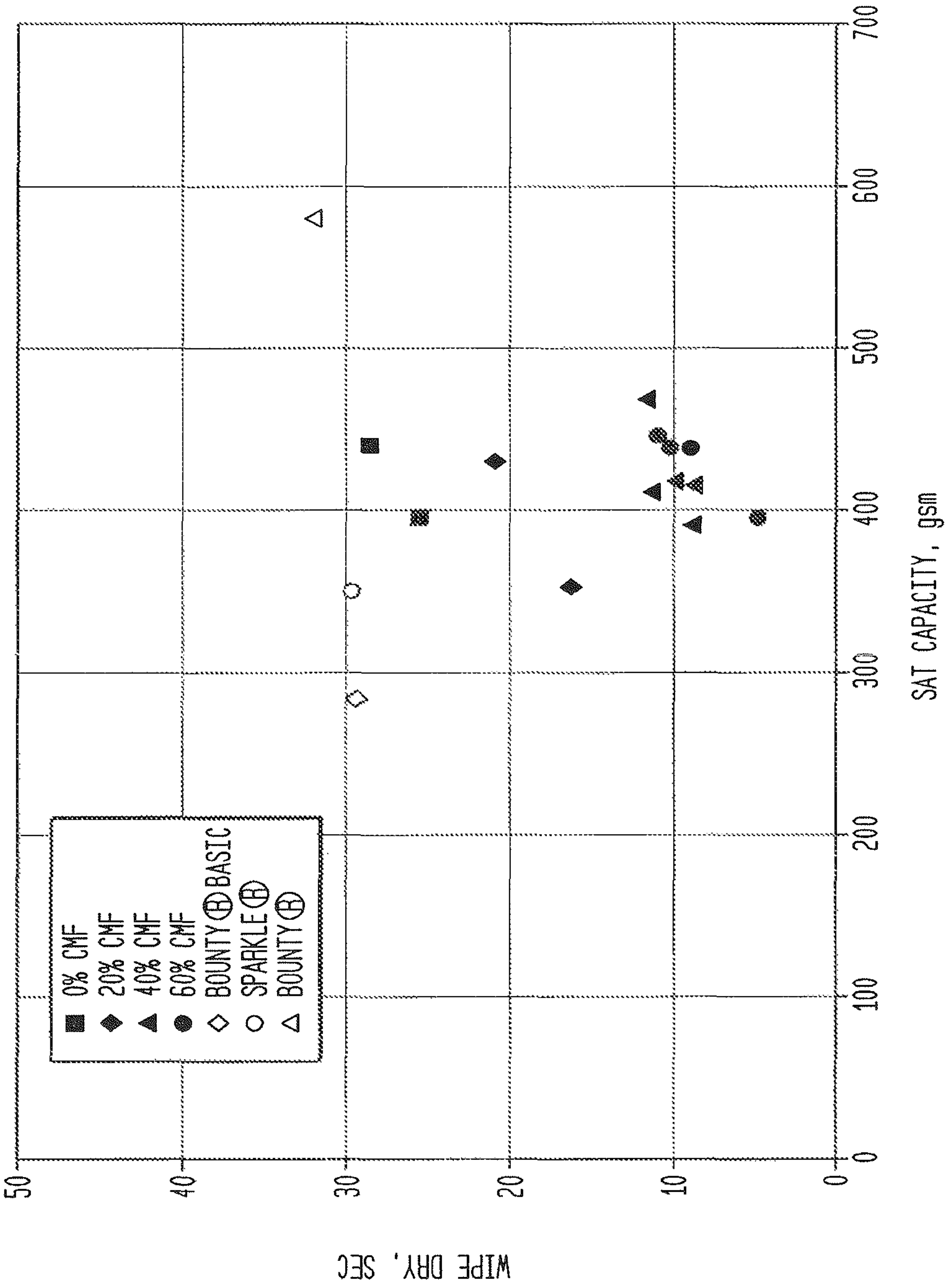
FIG. 16 illustrates wipe dry times as a function of SAT capacity with fibrillated cellulosic microfibers content being indicated as a parameter.
Figure 17:
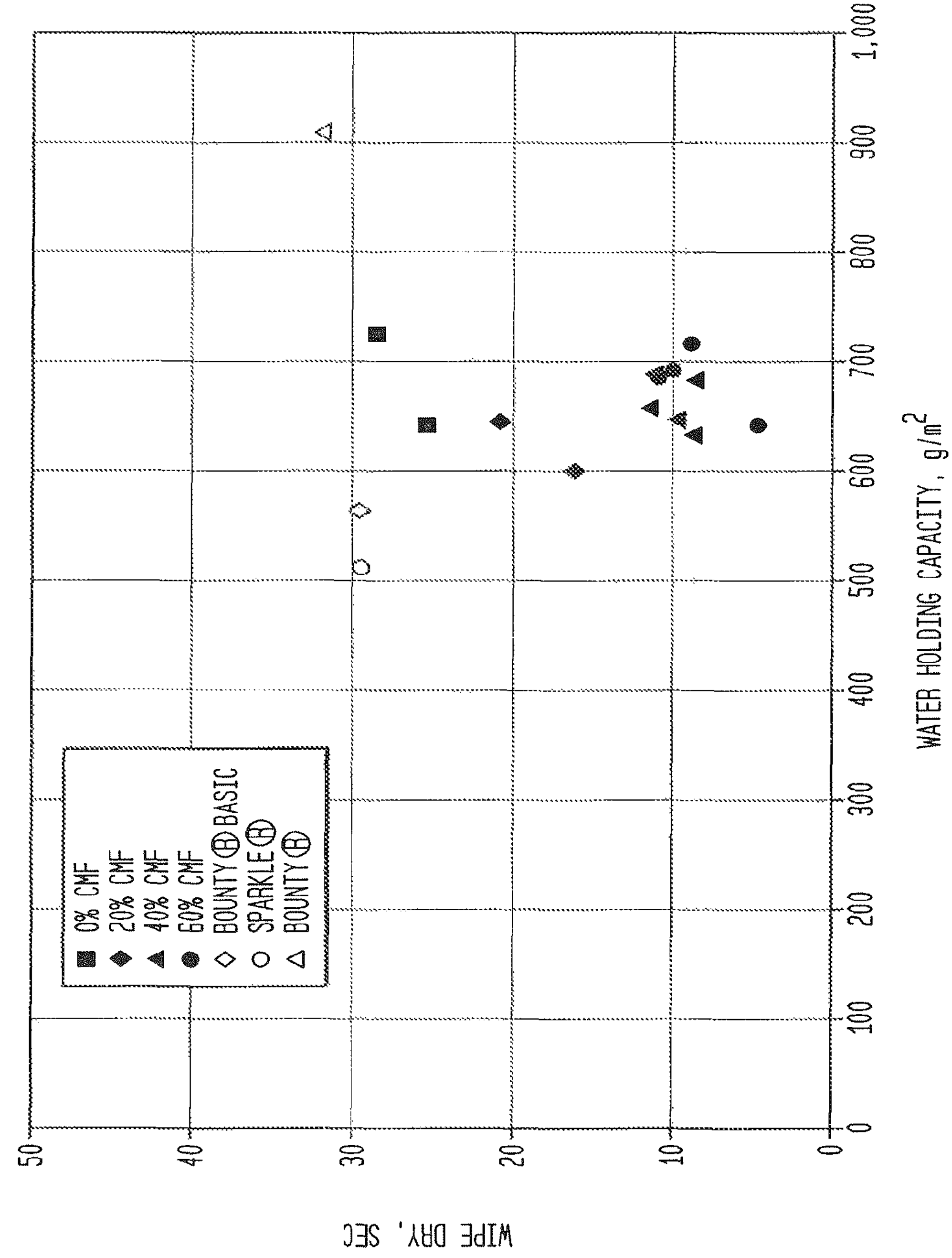
FIG. 17 illustrates wipe dry times as a function of water holding capacity with fibrillated cellulosic microfibers content being indicated as a parameter.

FIGS. 16 and 17 show that wipers with 40% or 60% CMF have very fast wipe dry times, while also having good capacity. FIG. 16 used SAT data, while FIG. 17 used the old water holding capacity test (withdrawn ASTM Standard Method D-4250-92, Standard Method for Water-Holding Capacity of Bibulous Fibrous Products). The general pattern of performance is similar with either test.

Figure 18:
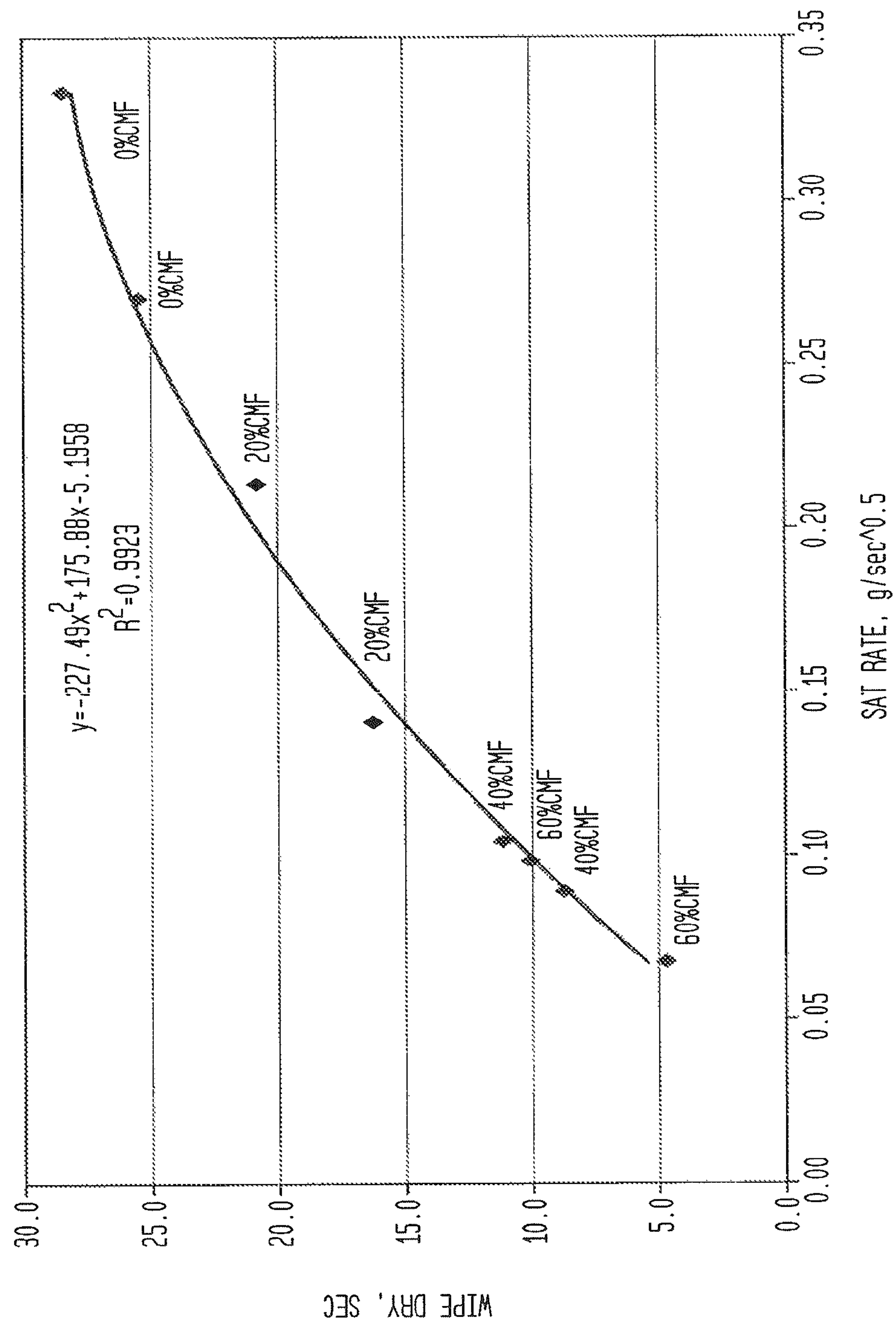
FIG. 18 illustrates wipe dry times as a function of SAT rate with fibrillated cellulosic microfibers content being indicated as a parameter.

FIG. 18 illustrates the counter-intuitive and surprising result that, as CMF is increased, we have found that, even though SAT Rate decreases, wipe dry times decrease.

Figure 19:
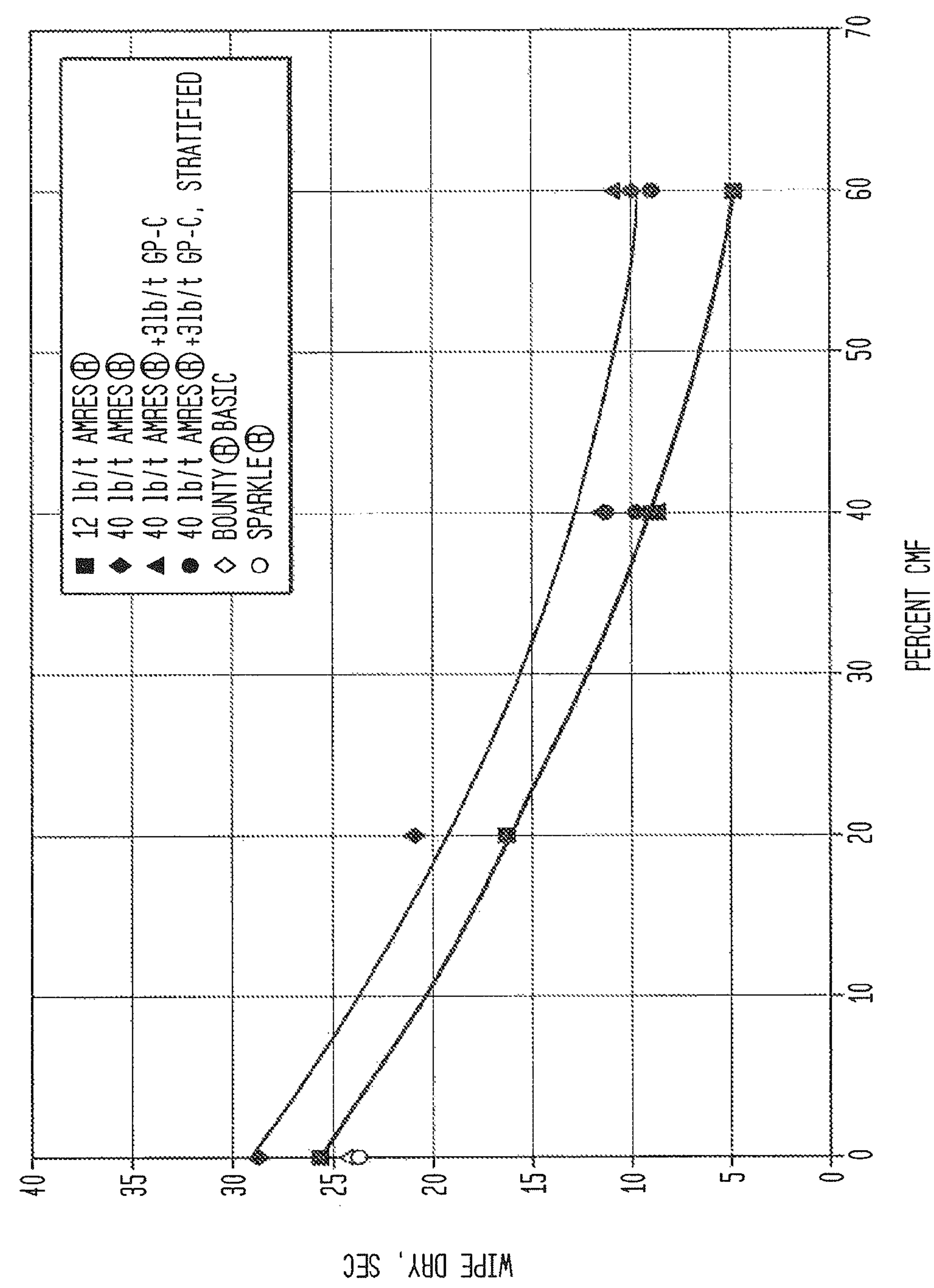
FIG. 19 illustrates wipe dry times as a function of fibrillated cellulosic microfibers content with wet strength resin content being indicated as a parameter.

FIG. 19 illustrates the effect that CMF has upon the wipe dry times at various levels of the wet strength resins Amres® and CMC. It appears that increasing the amount of resin in the outer layers increases the wipe dry times.

Figure 20:
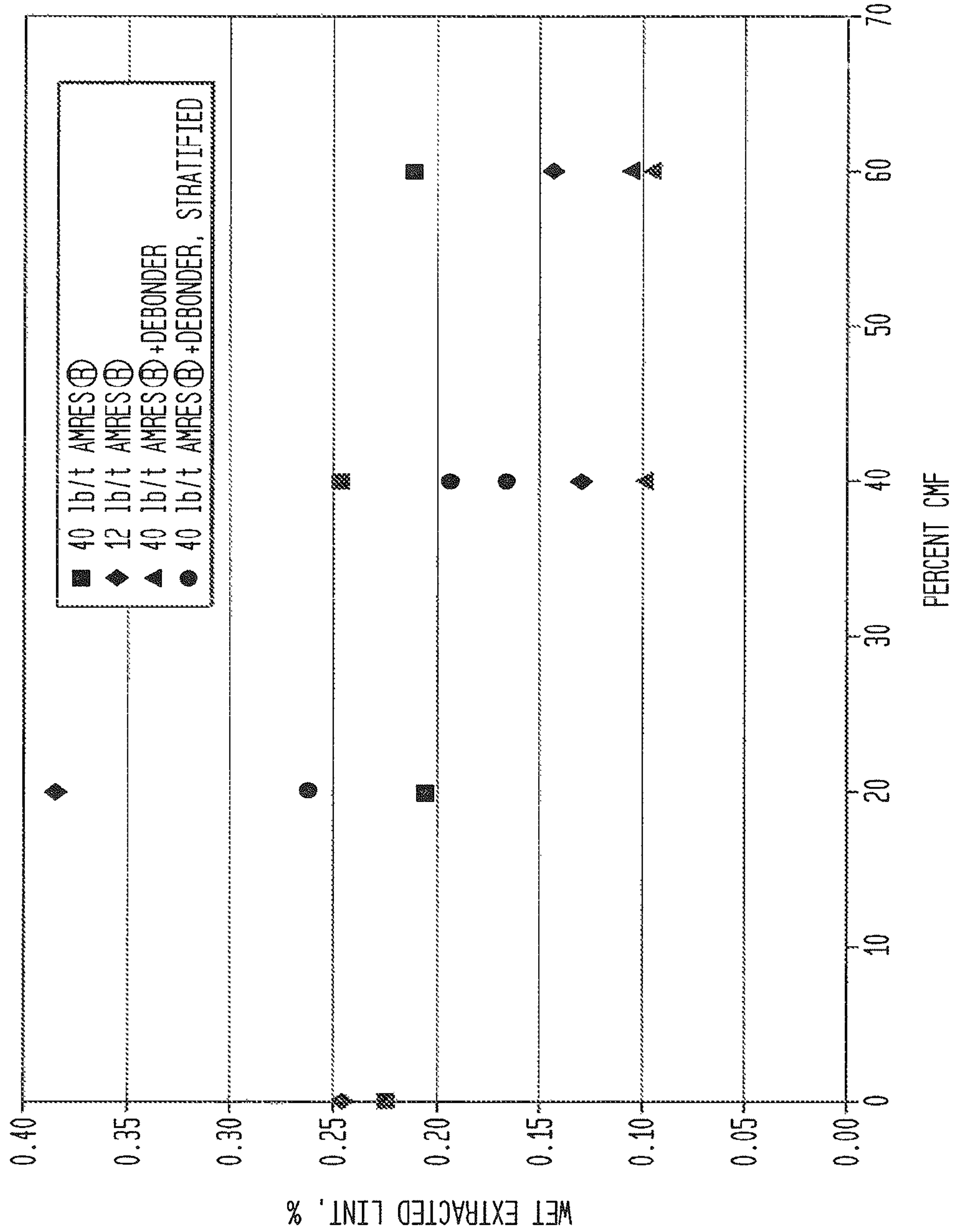
FIG. 20 illustrates variation in wet extracted lint for a variety of wipers with fibrillated cellulosic microfibers content, wet strength agent content, and debonder content being indicated.

FIG. 20 shows wet extracted lint for finished product. CMF typically reduces lint at a variety of levels of CMF and wet strength resins. It can be appreciated that linting generally decreases as the amount of CMF is increased, except that the wet extracted lint generally hovered between 0.20 and 0.25 with the Amres® containing sheets for all levels of CMF.

Figure 21:
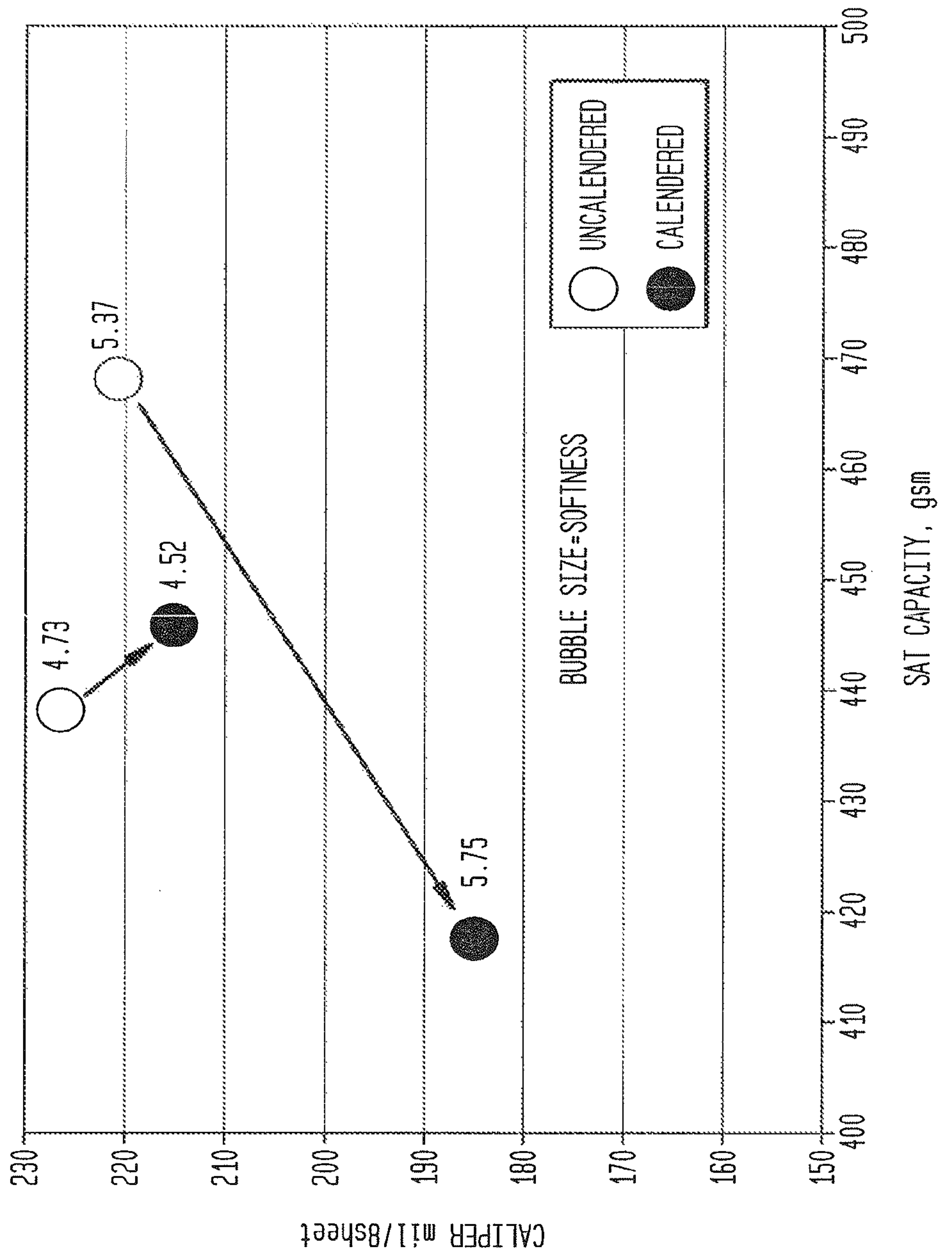
FIG. 21 illustrates the response of caliper and SAT capacity in wipers to calendering.

FIG. 21 shows that any softness benefit from calendering is obtained at a significant cost with respect to lost caliper and absorbency. In one case, a calendered, embossed ply was matched with an unembossed ply for no softness benefit and 12 mil drop in caliper. In another case, a product with two calendered plies had a 0.4 point softness increase, while dropping 35 mils of caliper (see FIG. 21) and 50 gsm SAT. In our experience with softness panels for towel products, a gain of 0.32 points of softness is enough that one product, having a softness panel score 0.32 units greater than another, would be perceived as being noticeably softer, consistently, at the 90% confidence level.

Figure 22:
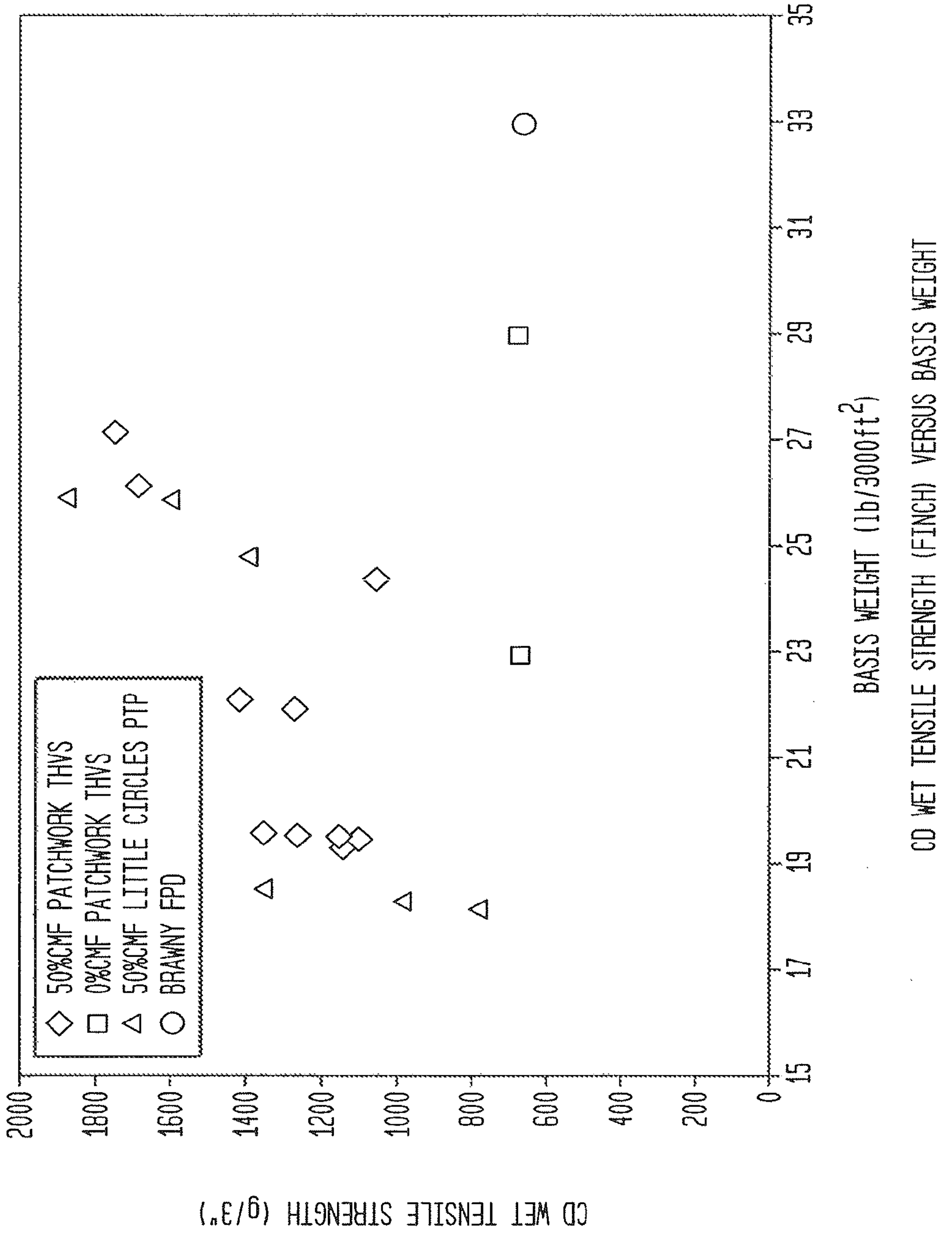
FIG. 22 illustrates variation in the cross machine direction (CD) wet tensile strength for a variety of towels as a function of basis weight.

FIG. 22 illustrates the dependence of CD Wet Tensile Strength on both resin addition and CMF. The ratio is higher with CMF at a given resin dose, but the highest ratios are achieved at high CMF and high resin levels.

Figure 23:
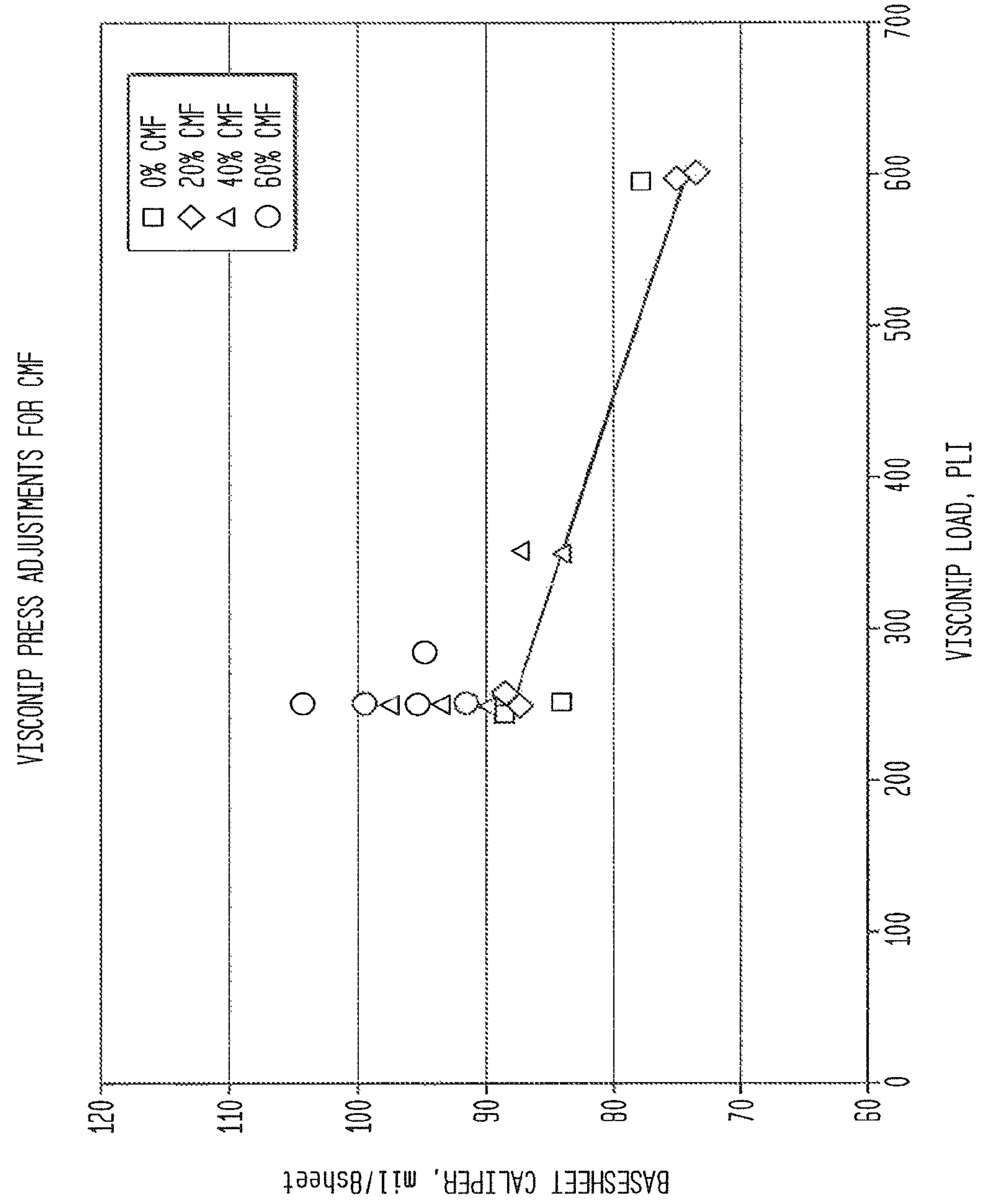
FIG. 23 illustrates the response of basesheet caliper to shoe press load in a variety of wipers.
Figure 24:
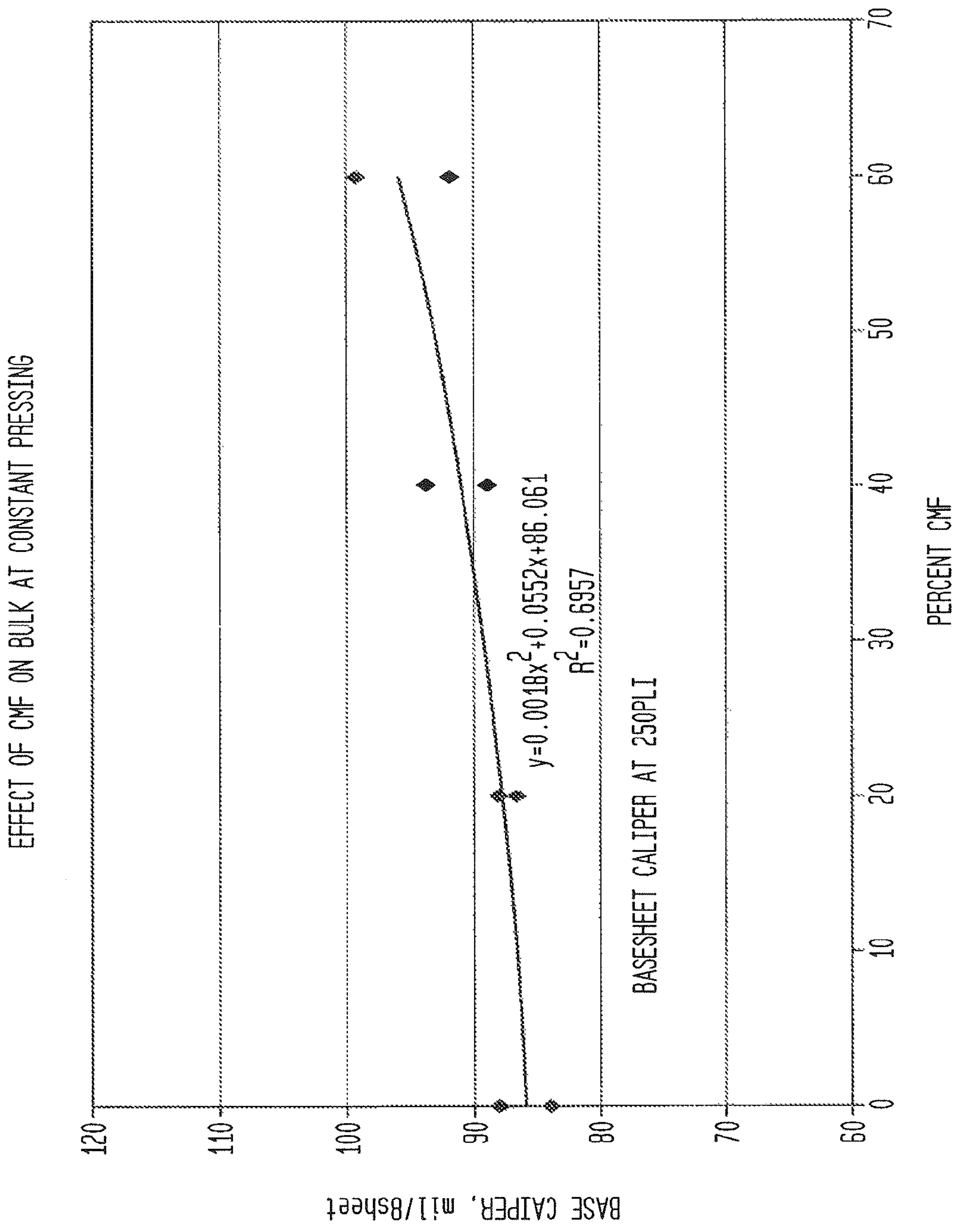
FIG. 24 illustrates basesheet caliper as a function of fibrillated cellulosic microfibers content at a constant shoe press load.

CMF makes the sheet more difficult to dewater compactively, as the tendency of the sheet to extrude itself out of the pressing nip increases as the CMF content is increased. Oftentimes, this is referred to as sheet crushing. When attempting to dewater a nascent web containing increasing amounts of CMF, the Visconip pressure had to be progressively reduced to prevent sheet crushing at the nip as the level of CMF in the sheet was increased (See FIG. 23). Even though increasing the proportion of CMF in a sheet increases the bulk attainable with a given basis weight (FIG. 24), the reduction in the pressing load that the sheet will sustain results in a wetter sheet going forward, which normally entails much higher expenses for drying energy.

Figure 33:
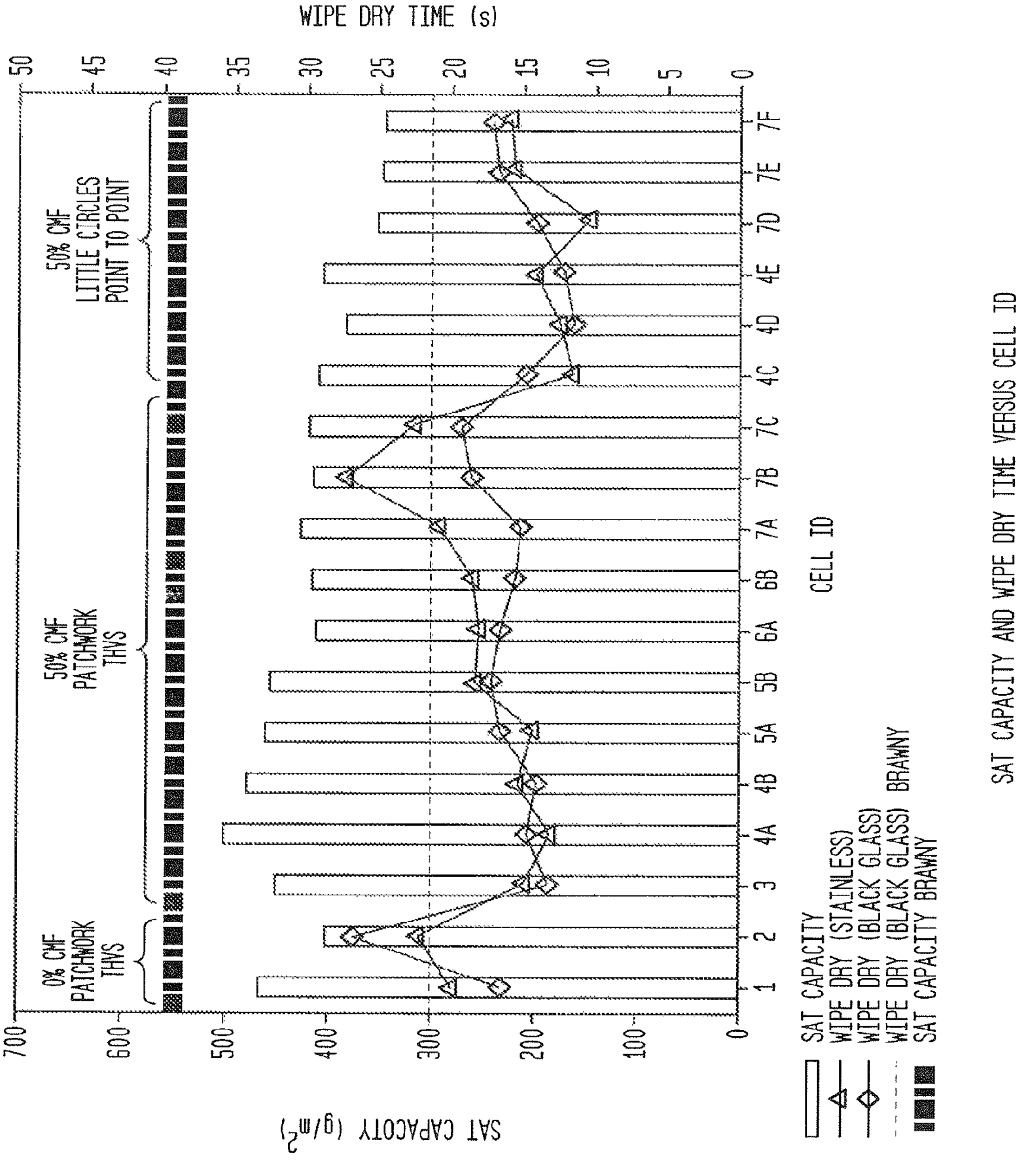
FIG. 33 presents SAT capacity and wipe dry times for both black glass and stainless steel surfaces for the wipers of Example 2.

FIG. 33 presents SAT Capacity and wipe dry times for both black glass and stainless steel surfaces for the wipers as shown in Example 2.

FIG. 34 is an SEM section (75×) along the machine direction (MD) of perforated polymeric belt creped basesheet 600, showing a domed area corresponding to a belt perforation as well as the densified pileated structure of the sheet. It is seen in FIG. 34 that the domed regions, such as region 640, have a "hollow" or domed structure with inclined and at least partially densified sidewall areas, while surround areas 618, 620 are densified, but less so than transition areas. Sidewall areas 658, 660 are inflected upwardly and inwardly, and are so highly densified as to become consolidated, especially, about the base of the dome. It is believed that these regions contribute to the very high caliper and roll firmness observed. The consolidated sidewall areas form transition areas from the densified fibrous, planar network between the domes to the domed features of the sheet and form distinct regions that may extend completely around and circumscribe the domes at their bases, or may be densified in a horseshoe or bowed shape only around part of the bases of the domes. At least portions of the transition areas are consolidated and also inflected upwardly and inwardly.

FIG. 35 is another SEM (120×) along the MD of basesheet 600 showing region 640, as well as consolidated sidewall areas 658 and 660. It is seen in this SEM that the cap 662 is fiber-enriched, of a relatively high basis weight as compared with areas 618, 620, 658, 660. CD fiber orientation bias is also apparent in the sidewalls and dome.

FIG. 36 is an SEM section (120×) along the machine direction (MD) of basesheet 700, in which consolidated sidewall areas 758, 760 are densified and are inflected inwardly and upwardly.

Example 2

Fabric Creping

Figure 26:
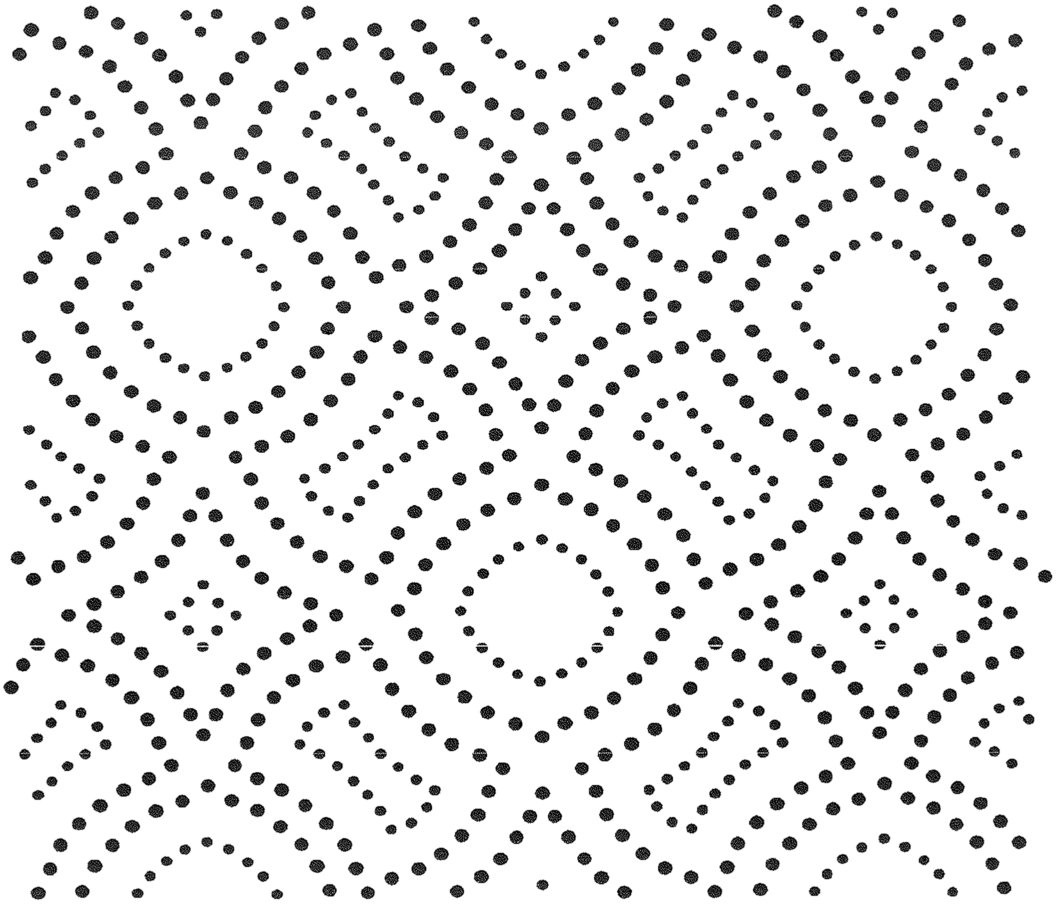
FIG. 26 illustrates an emboss pattern known as "Patchwork" mentioned in Example 2.
Figure 27:
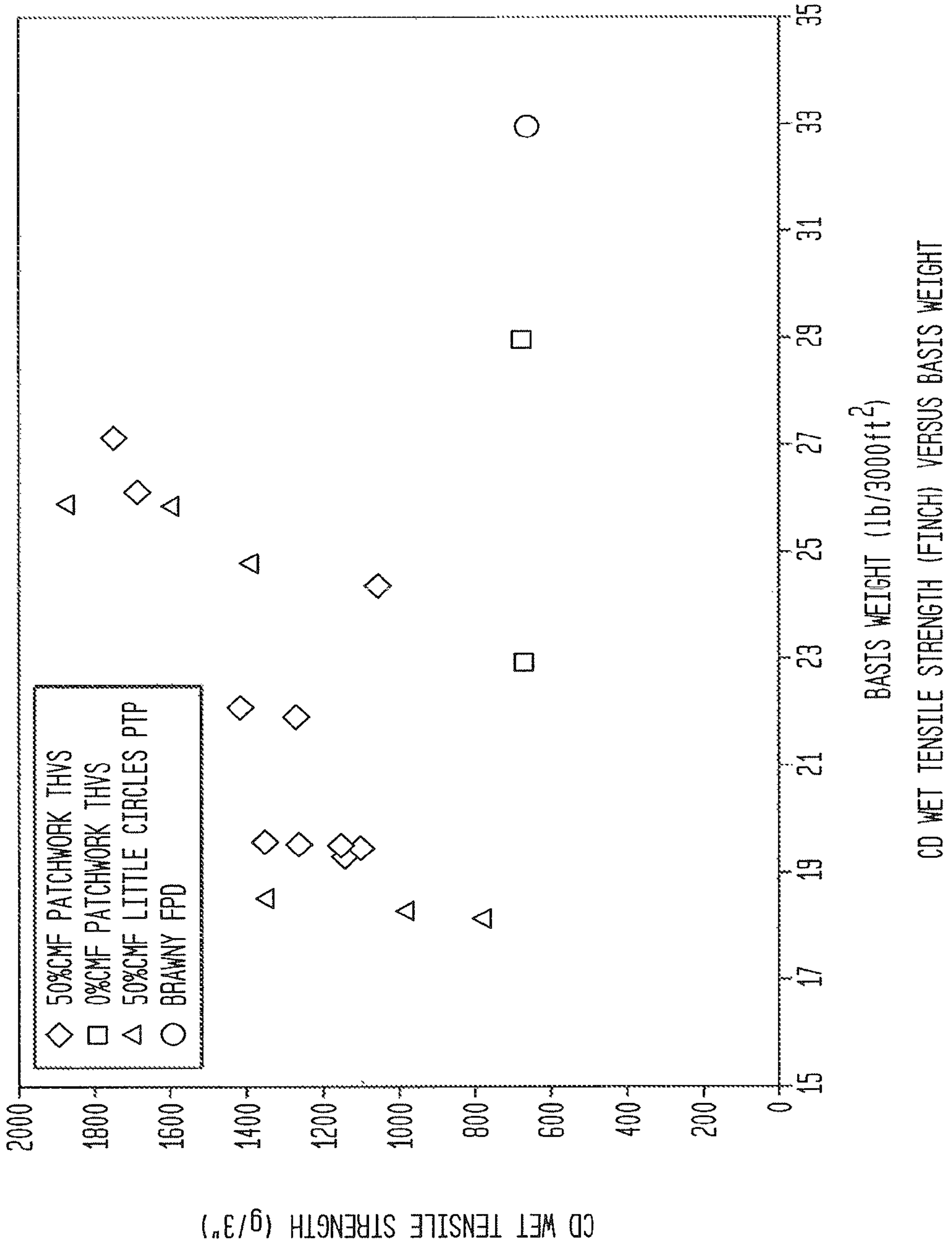
FIG. 27 illustrates the CD wet tensile strength of a variety of towels as a function of basis weight.
Figure 28:
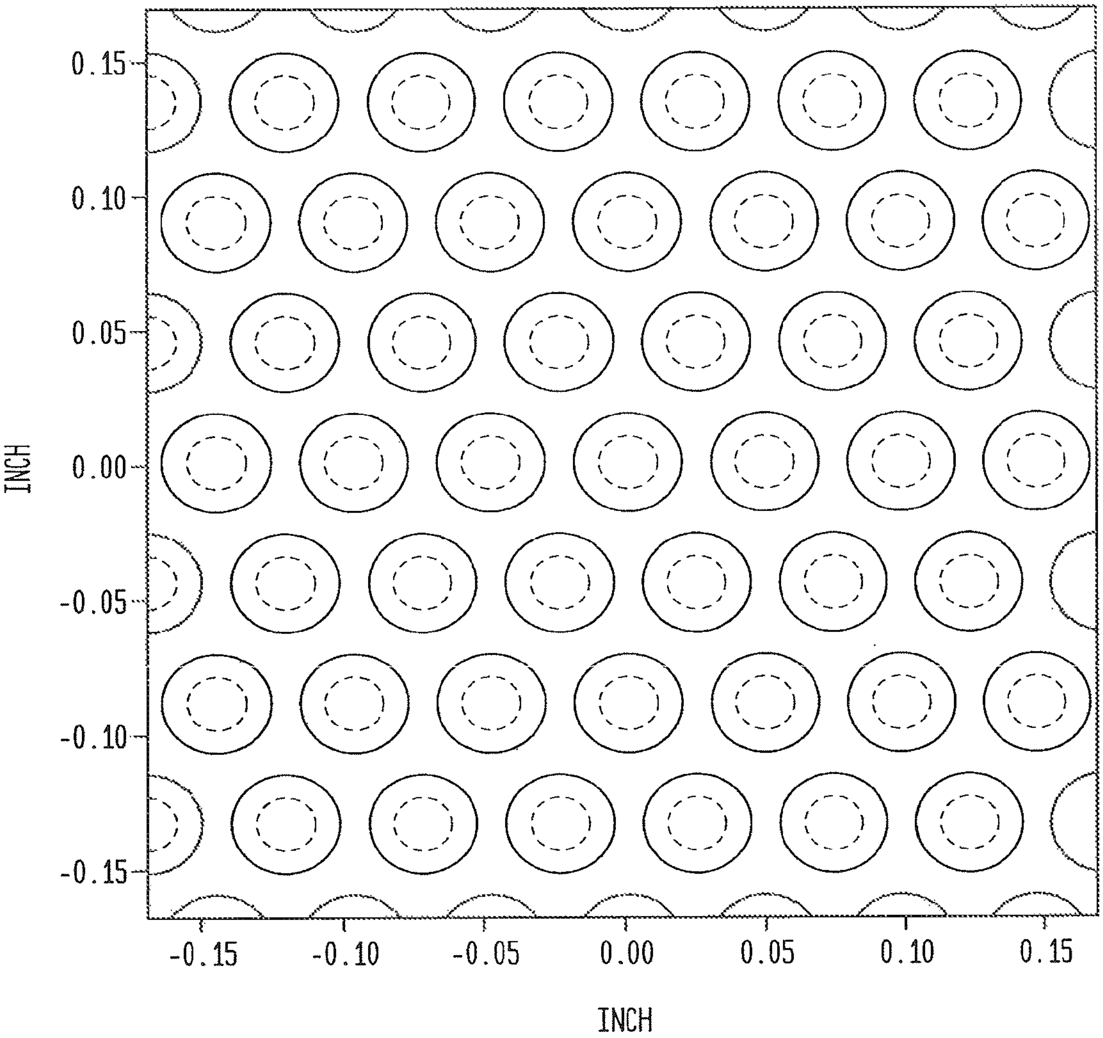
FIG. 28 is a schematic scale drawing of a preferred belt usable in the practice of the present invention.
Figure 29:
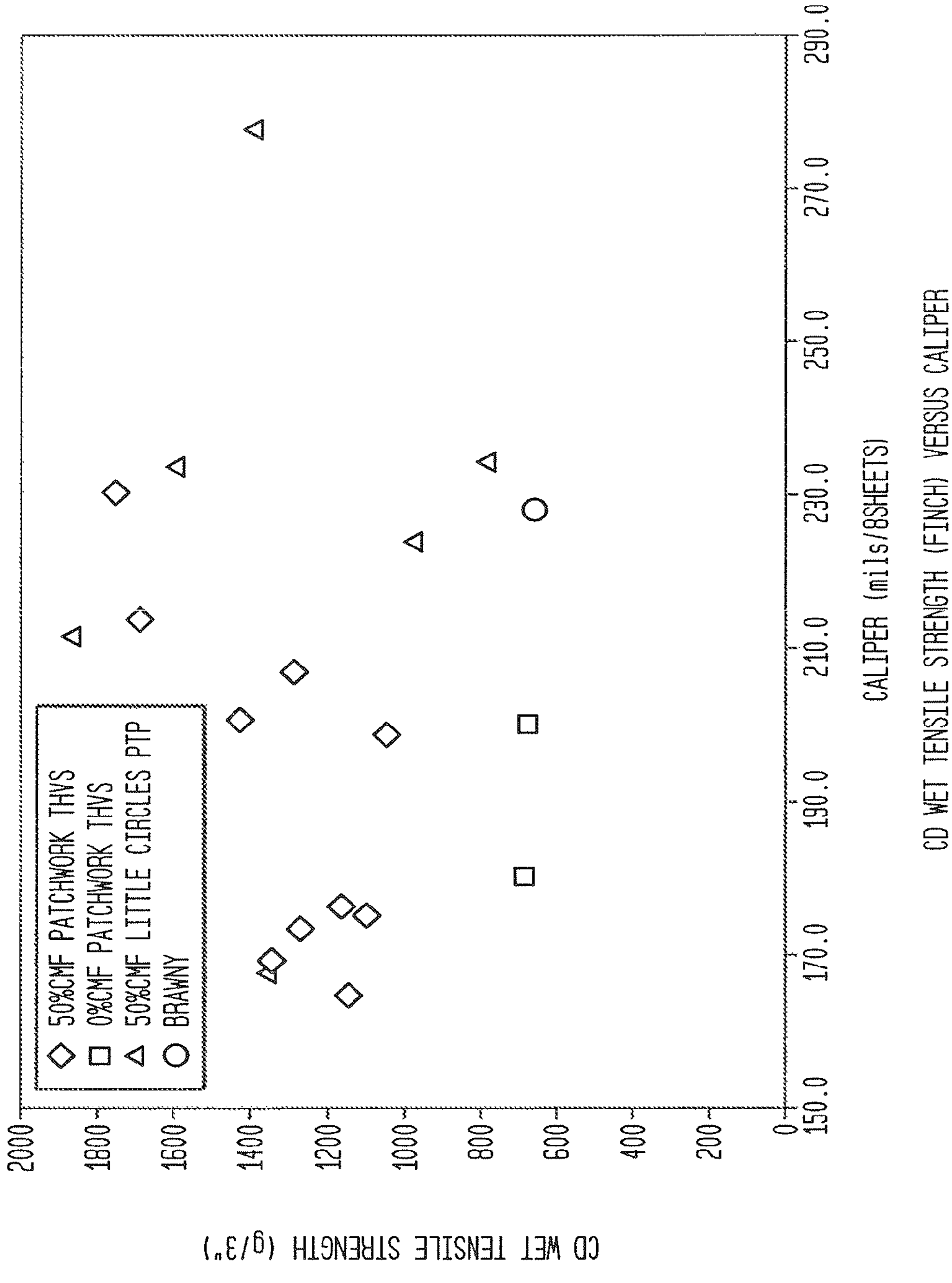
FIG. 29 illustrates the CD wet tensile strength of a variety of towels as a function of caliper.
Figure 30:
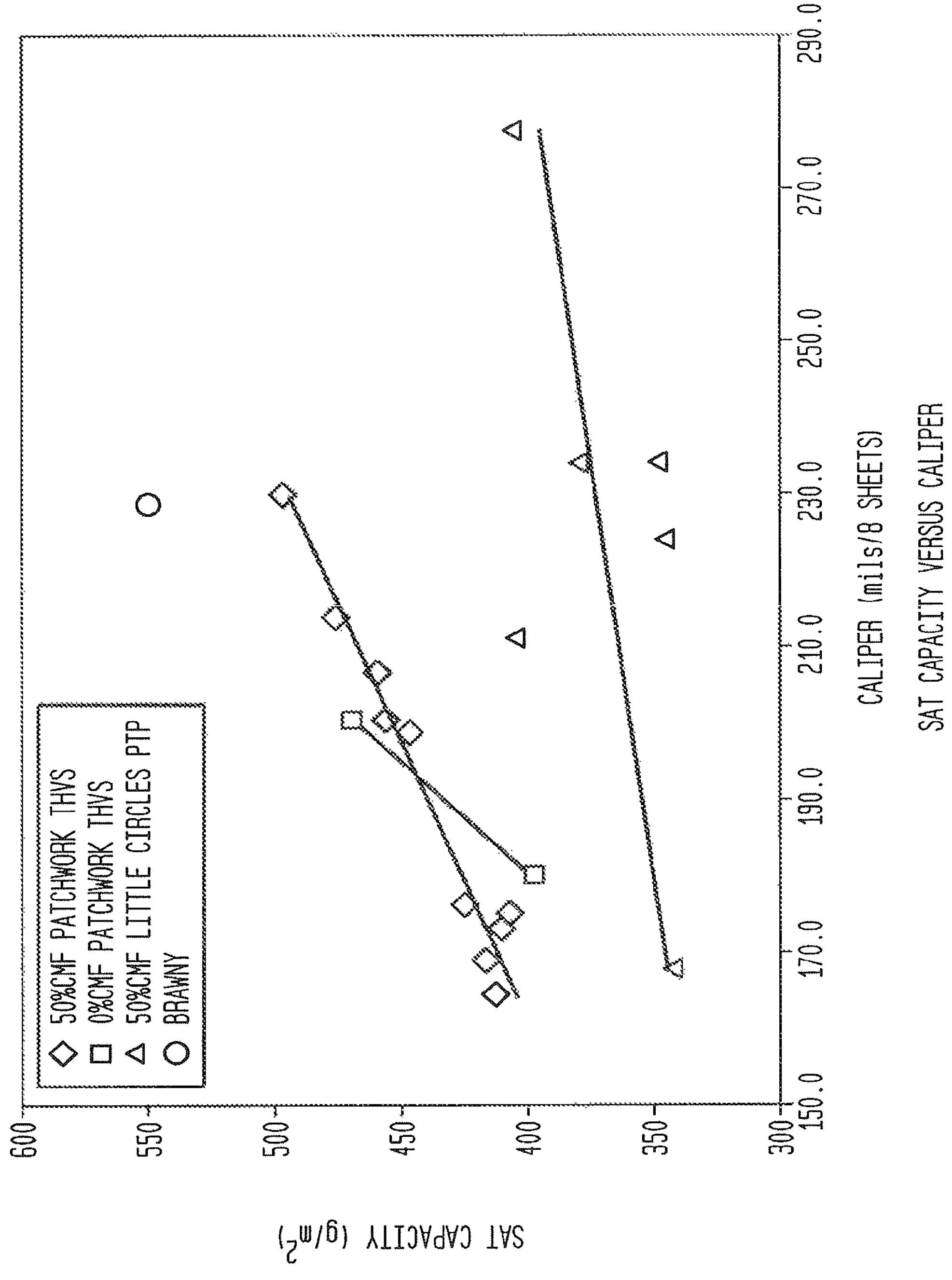
FIG. 30 illustrates the SAT capacity of a variety of towels as a function of caliper.
Figure 31:
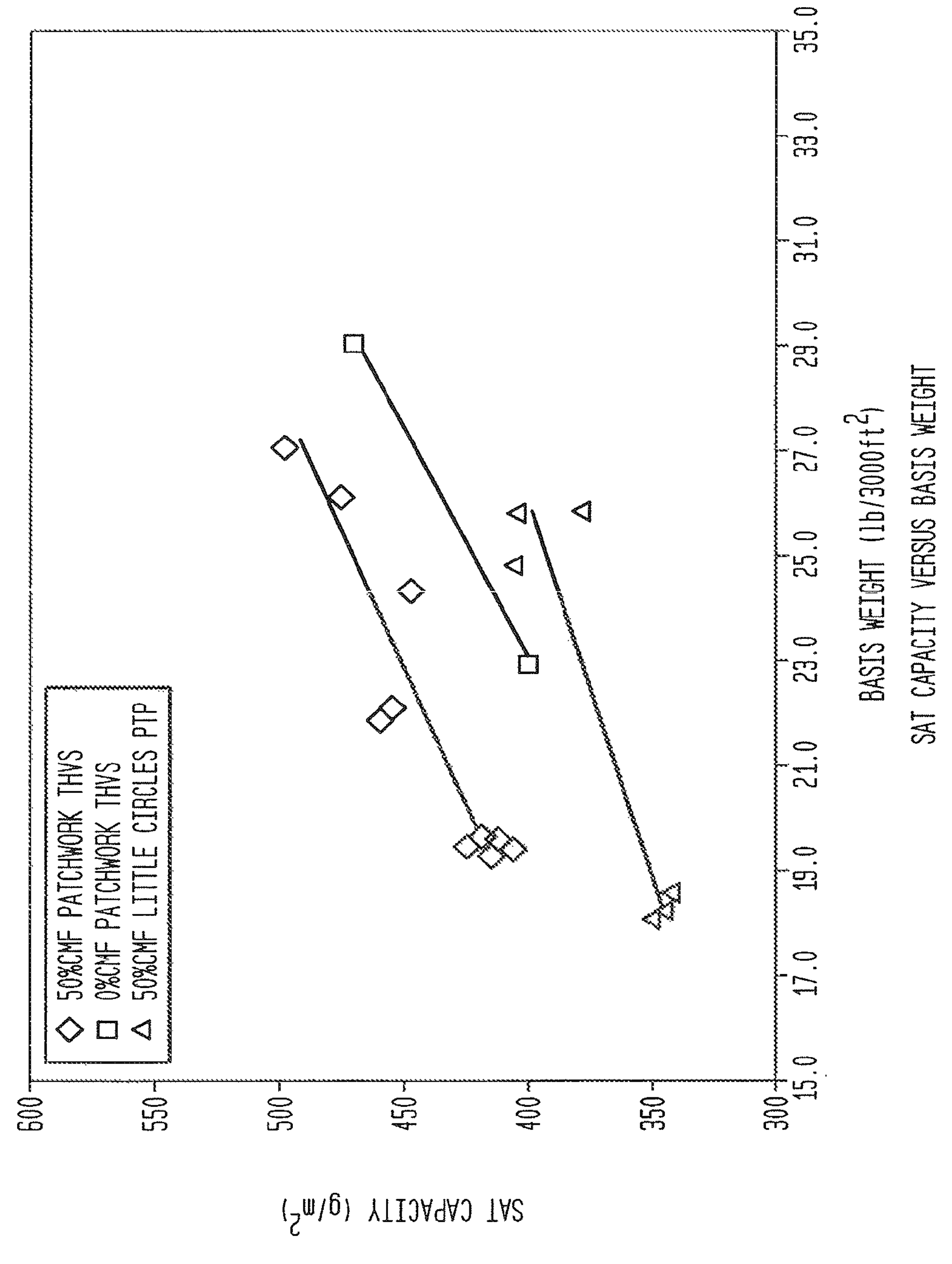
FIG. 31 illustrates variation in SAT capacity for a variety of towels as a function of basis weight.
Figure 32:
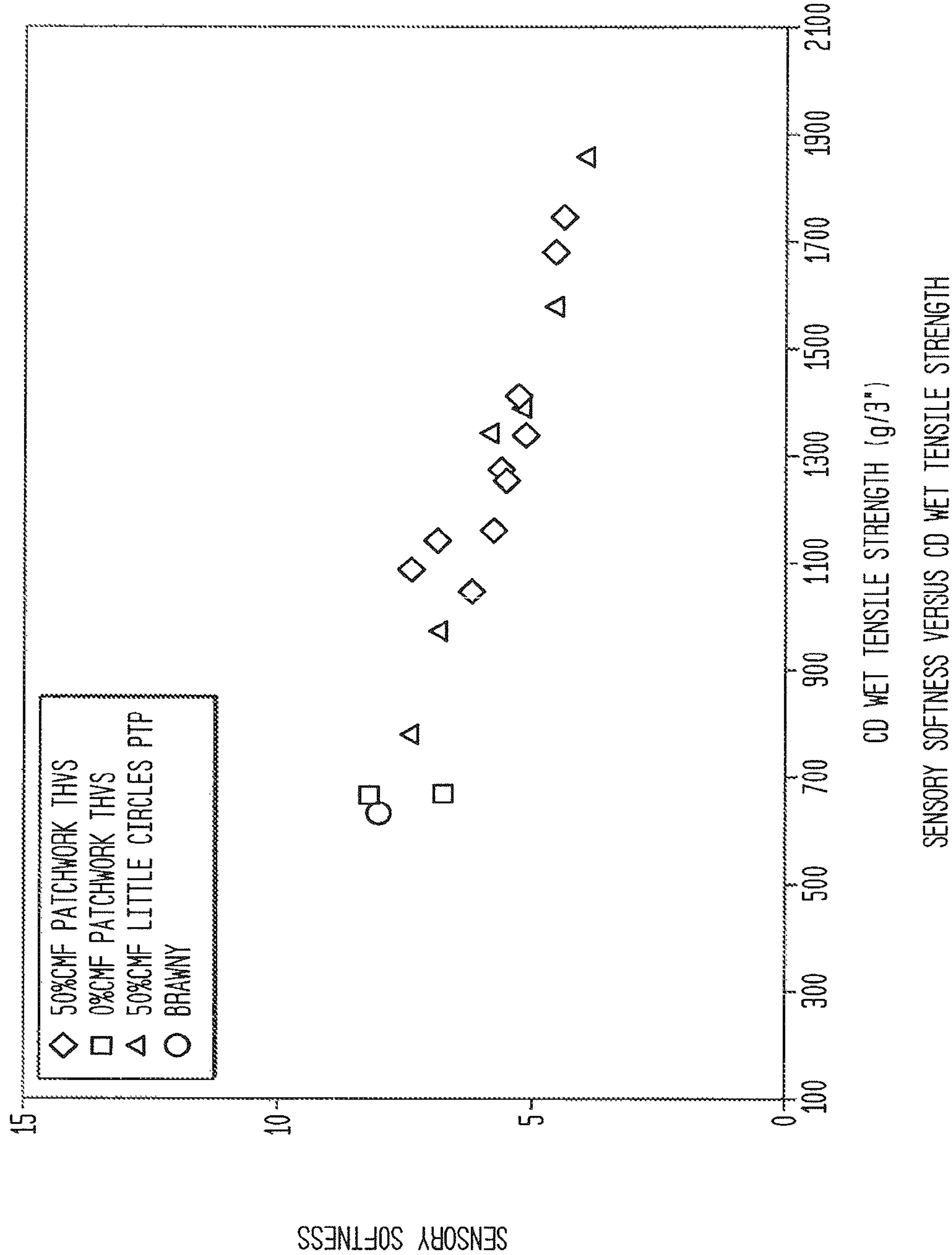
FIG. 32 illustrates the relationship between CD wet tensile strength and Sensory Softness for a variety of towels.

Basesheets having the properties set forth in Table 9 were made using fabric creping technology in which the nascent webs were creped from a creping cylinder using a woven creping fabric. These basesheets were converted to finished product towels by embossing one ply with the emboss pattern shown in FIG. 26 (Patches) and glue laminating it to an unembossed ply, as set forth in Tables 9 and 10.

TABLE 9

FRFC/CMF Basesheet Data, (fabric creped) Basesheet Properties

| Cell | Emboss ply | TL 2008-1905 | Description | Furnish | 8 Sheet Caliper mils/8 sht | Basis Weight lb/3000 ft$^2$ | MD Tensile g/3 in. | MD Stretch % | CD Tensile g/3 in. | CD Stretch % | CD Wet Tens Finch Cured- g/3 in. |
|---|---|---|---|---|---|---|---|---|---|---|---|
| 1 | x | 14-1 | 19721 229 | 50/50 M/A | 85.1 | 15.3 | 1754 | 26.4 | 1638 | 5.5 | 587 |
| | | 15-1 | 19723 239 | 50/50 M/A | 83.2 | 15.3 | 1695 | 23.3 | 1527 | 5.8 | 521 |
| | | 15 lb/ream Control Average (Calendered) | | | 84.1 | 15.3 | 1,724 | 24.9 | 1,582 | 5.6 | 554 |
| 2 | | 22-1 | 19731 1008 | 50/50 M/A | 82.1 | 11.7 | 1745 | 19.8 | 1454 | 5.5 | 504 |
| | x | 24-1 | 19733 1030 | 50/50 M/A | 77.1 | 11.6 | 2054 | 20.8 | 1338 | 5.1 | 520 |
| | | 12 lb/ream Control Average (Uncalendered) | | | 79.6 | 11.7 | 1,899 | 20.3 | 1,396 | 5.3 | 512 |
| 3 | x | 29- 1 | 197381140 | 50/50 M/MCF | 95.5 | 12.6 | 2059 | 30.9 | 1604 | 6.7 | 831 |
| | | 30-1 | 19739 1154 | 50/50 M/CMF | 94.8 | 12.6 | 1972 | 30.6 | 1526 | 7.4 | 699 |
| | | 12 lb/ream Microfiber Average (Uncalendered) | | | 95.1 | 12.6 | 2,016 | 30.8 | 1,565 | 7.0 | 765 |
| 4 | | 36-1 | 19755 155 | 50/50 M/CMF | 110.4 | 14.5 | 2791 | 33.6 | 2298 | 7.2 | 1,075 |
| | x | 37-1 | 19756 205 | 50/50 M/CMF | 114.6 | 13.6 | 2429 | 37.4 | 2160 | 7.2 | 1,129 |
| | | 12 lb/ream Microfiber Average (Uncal, higher FC) | | | 112.5 | 14.0 | 2,610 | 36.7 | 1,437 | 8.8 | 621 |
| 5 | x | 37-1 | 19756 205 | 50/50 M/CMF | 114.6 | 13.6 | 2429 | 37.4 | 2160 | 7.2 | 1,129 |
| | | 38-1 | 19757 216 | 50/50 M/CMF | 105.7 | 9.9 | 1,449 | 36.7 | 1,437 | 8.8 | 621 |
| | | 10 lb/ream Microfiber (Uncal higher FC) | | | | | | | | | |
| 6 | | 38-1 | 19757 216 | 50/50 M/CMF | 105.7 | 9.9 | 1,449 | 36.7 | 1,437 | 8.8 | 621 |
| | x | 43-1 | 19762 310 | 50/50 M/CMF | 59.4 | 9.9 | 1,612 | 27.1 | 1,362 | 8.0 | 768 |
| | | 10 lb/ream Microfiber (Calendered) | | | | | | | | | |
| 7 | x | 41-1 | 19760 248 | 50/50 M/CMF | 94.8 | 10.2 | 1796 | 31.2 | 1550 | 8.1 | 791 |
| | | 42-1 | 19761 300 | 50/50 M/CMF | 93.2 | 10.3 | 1921 | 29.3 | 1451 | 7.8 | 802 |
| | | 10 lb/ream Microfiber Average (Uncalendered) | | | 94.0 | 10.2 | 1859 | 30.2 | 1501 | 7.9 | 797 |

| Cell | Emboss ply | TL 2008-1905 | Description | Furnish | GM Tensile g/3 in. | GM Break Modulus gm/s/% | Tensile Ratio Dry % | CD Tensile Wet/Dry Unitless | CD Wet Breaking length, m | Specific Bulk, cc/g |
|---|---|---|---|---|---|---|---|---|---|---|
| 1 | x | 14-1 | 19721 229 | 50/50 M/A | 1693 | 142 | 1.07 | 0.36 | 310 | 10.9 |
| | | 15-1 | 19723 239 | 50/50 M/A | 1607 | 140 | 1.11 | 0.34 | 274 | 10.6 |
| | | 15 lb/ream Control Average (Calendered) | | | 1,650 | 141 | 1.09 | 0.35 | 292 | 10.7 |
| 2 | | 22-1 | 19731 1008 | 50/50 M/A | 1590 | 157 | 1.21 | 0.35 | 346 | 13.7 |
| | x | 24-1 | 19733 1030 | 50/50 M/A | 1657 | 164 | 1.54 | 0.39 | 361 | 13.0 |
| | | 12 lb/ream Control Average (Uncalendered) | | | 1,624 | 160 | 1.37 | 0.37 | 354 | 13.3 |
| 3 | x | 29- 1 | 197381140 | 50/50 M/MCF | 1816 | 126 | 1.29 | 0.52 | 530 | 14.7 |
| | | 30-1 | 19739 1154 | 50/50 M/CMF | 1734 | 116 | 1.30 | 0.46 | 446 | 14.6 |
| | | 12 lb/ream Microfiber Average (Uncalendered) | | | 1,775 | 121 | 1.29 | 0.49 | 488 | 14.7 |
| 4 | | 36-1 | 19755 155 | 50/50 M/CMF | 2532 | 14.6 | 1.21 | 0.47 | 599 | 14.9 |
| | x | 37-1 | 19756 205 | 50/50 M/CMF | 2290 | 14.7 | 1.13 | 0.52 | 670 | 16.5 |
| | | 12 lb/ream Microfiber Average (Uncal, higher FC) | | | 1,442 | 81 | 1.01 | 0.43 | 507 | 20.9 |
| 5 | x | 37-1 | 19756 205 | 50/50 M/CMF | 2290 | 141 | 1.13 | 0.52 | 670 | 16.5 |
| | | 38-1 | 19757 216 | 50/50 M/CMF | 1,442 | 81 | 1.01 | 0.43 | 507 | 20.9 |
| | | 10 lb/ream Microfiber (Uncal higher FC) | | | | | | | | |
| 6 | | 38-1 | 19757 216 | 50/50 M/CMF | 1,442 | 81 | 1.01 | 0.43 | 507 | 20.9 |
| | x | 43-1 | 19762 310 | 50/50 M/CMF | 1,482 | 102 | 1.18 | 0.56 | 623 | 11.7 |
| | | 10 lb/ream Microfiber (Calendered) | | | | | | | | |
| 7 | x | 41-1 | 19760 248 | 50/50 M/CMF | 1668 | 105.2 | 1.16 | 0.51 | 625 | 18.2 |
| | | 42-1 | 19761 300 | 50/50 M/CMF | 1669 | 111.1 | 1.32 | 0.55 | 628 | 17.6 |
| | | 10 lb/ream Microfiber Average (Uncalendered) | | | 1669 | 108 | 1.24 | 0.53 | 626 | 17.9 |

M = Northern SW Kraft; A—Aracruz Eucalyptus Kraft

TABLE 10

| Base Sheet Assignment and Estimated Finished Product Physical Properties | | | | | | | |
|---|---|---|---|---|---|---|---|
| cell | Emboss Ply | Basesheet Roll # | Sheet Count | Caliper (mils/8 sheets) | Roll Diameter (inches) | CD Wet Tensile ("Finch Cup") (g/3 in.) | Emboss Penetration |
| 1 | x | 19721 | 48 | 248 ± 5 | 5.0 ± 0.1 | 500 | 65 |
| | | 19723 | | | | | |
| 2 | | 19731 | 48 | float | float | 500 | |
| | x | 19733 | | | | | 65 |
| 3 | x | 19738 | 48 | float | float | 750 | 65 |
| | | 19739 | | | | | |
| 4A | | 19755 | 48 | float | float | 1100 | |
| | x | 19756 | | | | | 65 |
| 4B | | 19755 | 48 | max | >5.0 | >1100 | |
| | x | 19756 | | | | | 60 |
| 5A | x | 19756 | 48 | float | float | 850 | 65 |
| | | 19757 | | | | | |
| 5B | x | 19756 | 48 | max | >5.0 | >850 | 60 |
| | | 19757 | | | | | |
| 6A | | 19757 | 48 | float | float | 700 | 65 |
| | x | 19762 | | | | | |
| 6B | | 19757 | 48 | float | float | 700 | 60 |
| | x | 19762 | | | | | |
| 7A | x | 19760 | 48 | float | float | 800 | 65 |
| | | 19761 | | | | | |
| 7B | x | 19760 | 48 | float | float | 800 | 60 |
| | | 19761 | | | | | |
| 7C | x | 19760 | 48 | float | float | 800 | 55 |
| | | 19761 | | | | | |

Figure 25A:
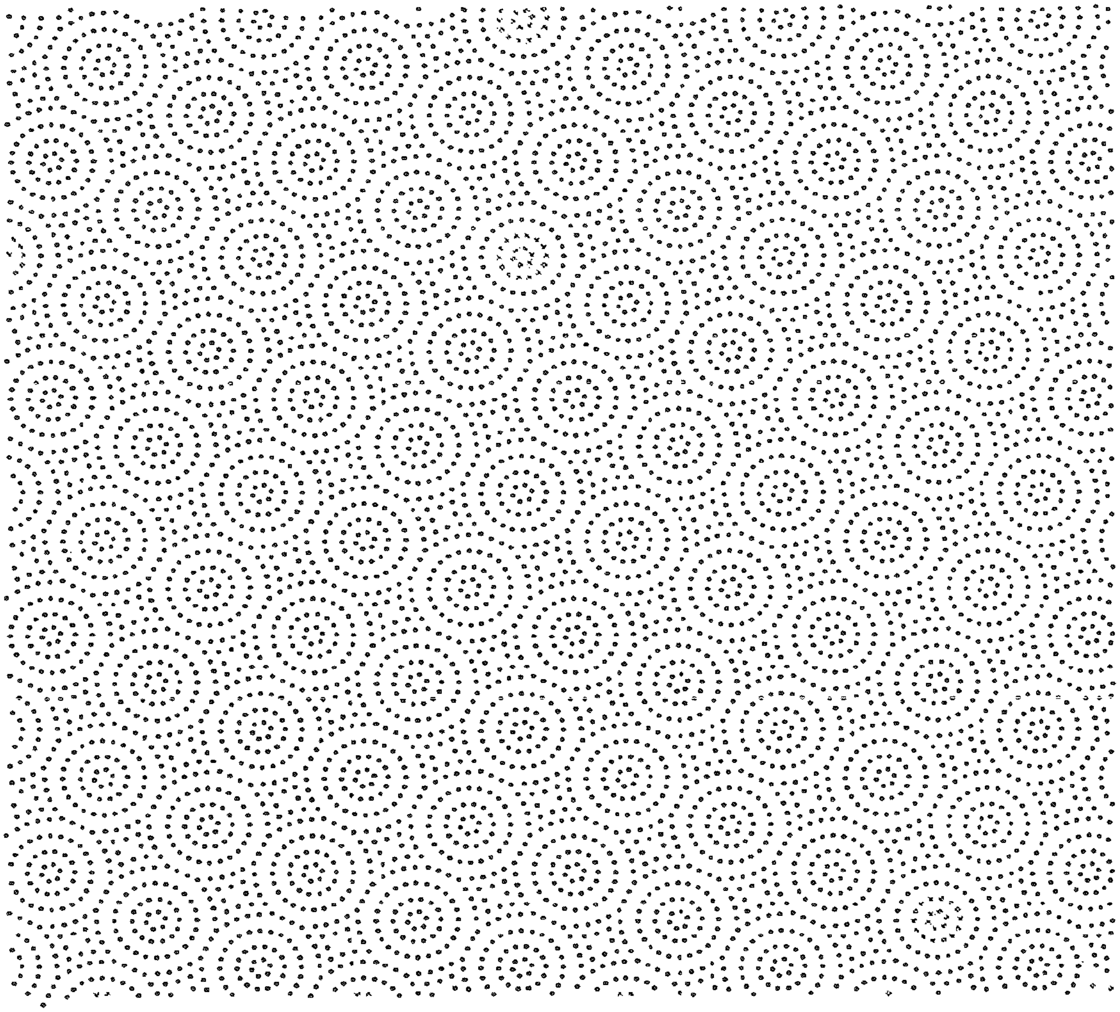
FIGS. 25A and 25B illustrate an emboss pattern known as "Little Circles" mentioned in Example 2.
Figure 25B:
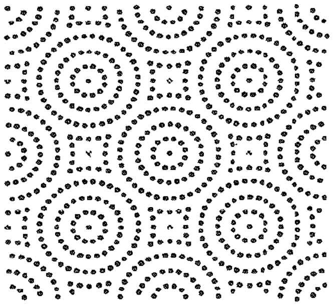

When tested for physical properties, the results set forth in Table 11 were obtained. Subsequently, other rolls of basesheet were converted using the emboss design shown in FIG. 25A (Little Circles) in a point to point mode, i.e., registered debosses were formed in the outer surface of each ply with the depths of the debossed regions in each ply being pressed so forcefully against the debossed regions in the other, that the plies are thereby bonded to each other. In some cases, the contact regions between the plies may be glassined. When Little Circles is used in point to point mode both surfaces show the pattern of FIG. 25A. In cases when a nested mode is used, one surface bears the pattern of FIG. 25A, while the other bears the pattern of FIG. 25B. The physicals of the rolls thereby formed are set forth in Table 11 and the preliminary evaluation of performance is set forth in Table 12.

TABLE 11

| Appendix I. Properties of Rolls Converted with THVS Emboss in THVS Mode | | | | | | | | | | |
|---|---|---|---|---|---|---|---|---|---|---|
| Cell ID | | 1 | 2 | 3 | 4A | 4B | 5A | 5B | 6A | 6B |
| Furnish | | 50/50 M/Aracruz | | | | | 50/50 M/CMF | | | |
| Basis Weight (lb/3000 $ft^2$) | | 29.0 | 23.0 | 24.4 | 27.2 | 26.2 | 22.0 | 22.1 | 19.5 | 19.4 |
| Caliper (mils/8 sheet) | | 200 | 180 | 199 | 230 | 214 | 207 | 200 | 175 | 165 |
| MD Tensile (g/3 in.) | | 2539 | 2487 | 3599 | 5713 | 6007 | 3638 | 3856 | 2554 | 3051 |
| MD Stretch (%) | | 19.2 | 15.6 | 21.1 | 25.1 | 26.3 | 24.1 | 24.6 | 20.9 | 21.1 |
| CD Tensile (g/3 in.) | | 2317 | 1974 | 2473 | 3739 | 3738 | 2828 | 3113 | 2332 | 2619 |
| CD Stretch (%) | | 5.4 | 5.4 | 7.3 | 6.9 | 7.6 | 8.3 | 8.3 | 8.3 | 8.3 |
| GM Tensile (g/3 in.) | | 2423 | 2215 | 2982 | 4620 | 4736 | 3206 | 3464 | 2438 | 2824 |
| CD Wet Tensile-Finch (g/3 in.) | | 670 | 676 | 1048 | 1749 | 1683 | 1278 | 1418 | 1095 | 1141 |
| CD Tensile Wet/Dry (Unitless) | | 0.29 | 0.34 | 0.42 | 0.47 | 0.45 | 0.45 | 0.46 | 0.47 | 0.44 |
| SAT Capacity (g/$m^2$) | | 469 | 399 | 447 | 497 | 476 | 460 | 456 | 408 | 413 |
| GM Break Modulus (g/%) | | 242.4 | 241.9 | 239.7 | 346.3 | 330.3 | 223.9 | 246.4 | 187.2 | 211.4 |
| GM Modulus (g/% Stretch) | | 42.0 | 46.3 | 37.3 | 44.8 | 40.6 | 34.2 | 33.8 | 34.3 | 34.7 |
| Roll Diameter (in) | | 4.98 | 4.78 | 4.82 | 5.25 | 4.89 | 4.81 | 4.77 | 4.55 | 4.35 |
| Roll Compress Value (%) | | 19.7 | 20.4 | 16.5 | 20.9 | 16.4 | 15.7 | 14.5 | 14.6 | 14.3 |
| Sensory Softness | | 8.19 | 6.76 | 6.19 | 4.30 | 4.52 | 5.54 | 5.26 | 7.35 | 6.94 |
| Wet Extracted Lint (%) | | 0.069 | 0.050 | 0.063 | 0.076 | 0.080 | 0.062 | 0.069 | 0.055 | 0.063 |
| Wipe Dry | Top | 17 | 26 | 14 | 13 | 15 | 15 | 14 | 15 | 13 |
| (Black Glass) | Bottom | 16 | 28 | 12 | 15 | 13 | 17 | 20 | 19 | 18 |
| (s) | Average | 16 | 27 | 13 | 14 | 14 | 16 | 17 | 17 | 15 |
| Wipe Dry | Top | 18 | 26 | 14 | 16 | 16 | 22 | 20 | 24 | 21 |
| (Stainless Steel) | Bottom | 20 | 22 | 15 | 13 | 15 | 14 | 18 | 18 | 19 |
| (s) | Average | 20 | 22 | 15 | 13 | 15 | 14 | 18 | 18 | 19 |
| Wet Lint (Pigskin)-FQAFiber Count (Number) | | 1601 | 808 | 786 | 884 | 814 | 631 | 829 | 676 | 577 |
| Cell ID | | 7A | 7B | 7C | 4C | 4D | 4E | 7D | 7E | 7F |
| Furnish | | | | | | 50/50 M/CMF | | | | |
| Basis Weight (lb/3000 $ft^2$) | | 19.5 | 19.6 | 19.6 | 24.8 | 25.9 | 25.9 | 18.2 | 18.3 | 18.6 |

TABLE 11-continued

| Appendix I. Properties of Rolls Converted with THVS Emboss in THVS Mode | | | | | | | | | | |
|---|---|---|---|---|---|---|---|---|---|---|
| Caliper (mils/8 sheet) | | 176 | 173 | 169 | 278 | 234 | 211 | 234 | 224 | 168 |
| MD Tensile (g/3 in.) | | 3539 | 3680 | 3971 | 5188 | 5555 | 6413 | 2749 | 3308 | 4242 |
| MD Stretch (%) | | 21.1 | 21.1 | 21.2 | 18.0 | 17.9 | 20.3 | 13.2 | 14.3 | 15.7 |
| CD Tensile (g/3 in.) | | 2598 | 2702 | 2983 | 2952 | 3589 | 4203 | 1725 | 2065 | 2934 |
| CD Stretch (%) | | 8.0 | 7.9 | 8.2 | 10.0 | 9.4 | 8.3 | 10.0 | 9.7 | 8.7 |
| GM Tensile (g/3 in.) | | 3031 | 3152 | 3441 | 3913 | 4460 | 5191 | 2174 | 2612 | 3527 |
| CD Wet Tensile-Finch (g/3 in.) | | 1162 | 1263 | 1343 | 1389 | 1591 | 1865 | 780 | 974 | 1349 |
| CD Tensile Wet/Dry (Unitless) | | 0.45 | 0.47 | 0.45 | 0.47 | 0.44 | 0.44 | 0.45 | 0.47 | 0.46 |
| SAT Capacity ($g/m^2$) | | 424 | 411 | 416 | 406 | 379 | 405 | 349 | 345 | 342 |
| GM Break Modulus (g/%) | | 235.2 | 246.0 | 263.1 | 289.6 | 341.4 | 401.6 | 188.5 | 224.5 | 300.1 |
| GM Modulus (g/% Stretch) | | 34.9 | 35.9 | 36.1 | 39.1 | 46.0 | 48.8 | 31.2 | 33.8 | 44.2 |
| Roll Diameter (in) | | 4.67 | 4.63 | 4.34 | 5.52 | 5.10 | 4.88 | 5.32 | 5.17 | 4.52 |
| Roll Compress Value (%) | | 16.5 | 17.2 | 13.5 | 14.2 | 13.3 | 15.2 | 16.4 | 16.1 | 15.1 |
| Sensory Softness | | 5.75 | 5.47 | 5.12 | 5.17 | 4.51 | 3.92 | 7.48 | 6.85 | 5.83 |
| Wet Extracted Lint (%) | | 0.048 | 0.048 | 0.050 | 0.057 | 0.082 | 0.075 | 0.050 | 0.052 | 0.056 |
| Wipe Dry | Top | 14 | 17 | 18 | 12 | 12 | 14 | 10 | 16 | 16 |
| (Black Glass) | Bottom | 16 | 20 | 20 | 17 | 11 | 10 | 17 | 17 | 17 |
| (s) | Average | 15 | 18 | 19 | 14 | 11 | 12 | 14 | 16 | 17 |
| Wipe Dry | Top | 25 | 28 | 21 | 15 | 12 | 10 | 17 | 17 | 17 |
| (Stainless Steel) | Bottom | 21 | 27 | 23 | 12 | 12 | 14 | 10 | 16 | 16 |
| (s) | Average | 21 | 27 | 23 | 12 | 12 | 14 | 10 | 16 | 16 |
| Wet Lint (Pigskin)-FQA Fiber Count (Number) | | 572 | 616 | 594 | 561 | 902 | 726 | 679 | 600 | 689 |

TABLE 12

Wipe Dry Data using Wiper Test Method (Single Sheet) (Preliminary Results)

| Cell ID | 1 | 2 | 3 | 4A | 4B | 5A | 5B | 6A | 6B | 7A | 4C | 4D | 4E | 7D | 7E | 7F | 4C | 4D |
|---|---|---|---|---|---|---|---|---|---|---|---|---|---|---|---|---|---|---|
| Furnish | 50/50 M/Aracruz | | | | | | | | | 50/50 M/CMF | | | | | | | | |
| Basis Weight (lb/3000 $ft^2$) | 29.0 | 23.0 | 24.4 | 27.2 | 26.2 | 22.0 | 22.1 | 19.5 | 19.4 | 19.5 | 24.8 | 25.9 | 25.9 | 18.2 | 18.3 | 18.6 | 24.8 | 25.9 |
| Caliper (mils/8 sheet) | 200 | 180 | 199 | 230 | 214 | 207 | 200 | 175 | 165 | 176 | 278 | 234 | 211 | 234 | 224 | 168 | 278 | 234 |
| SAT Capacity ($g/m^2$) | 469 | 399 | 447 | 497 | 476 | 460 | 456 | 408 | 413 | 424 | 406 | 379 | 405 | 349 | 345 | 342 | 406 | 379 |
| Wipe Dry | Top | | 92 | 64 | 95 | 133 | 134 | 131 | 123 | 110 | 231 | 115 | 155 | 137 | 165 | 114 | 231 | 115 |
| (Black Glass) | Bottom | 59 | 109 | 73 | 113 | 101 | 113 | 133 | 95 | 87 | 222 | 139 | 109 | 129 | 140 | 114 | 222 | 139 |
| (s) | Average | 59 | 101 | 68 | 104 | 117 | 123 | 132 | 109 | 99 | 227 | 127 | 132 | 133 | 152 | 114 | 227 | 127 |
| Wipe Dry | Top | 41 | 64 | 50 | 71 | 59 | 76 | 79 | 69 | 68 | 104 | 69 | 58 | 120 | 78 | 61 | 104 | 69 |
| (Stainless Steel) | Bottom | 43 | 63 | 56 | 49 | 71 | 88 | 81 | 67 | 76 | 78 | 70 | 82 | 134 | 80 | 66 | 78 | 70 |
| (s) | Average | 43 | 63 | 56 | 49 | 71 | 88 | 81 | 67 | 76 | 78 | 70 | 82 | 134 | 80 | 66 | 78 | 70 |

Figure 1G:
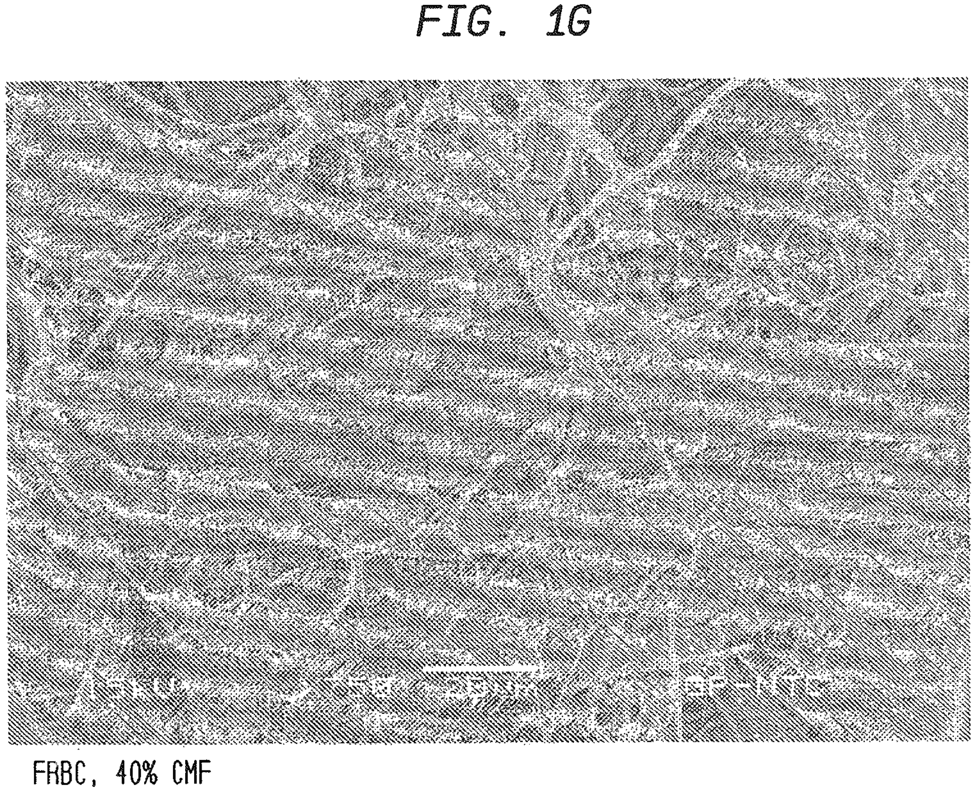
Figure 1H:
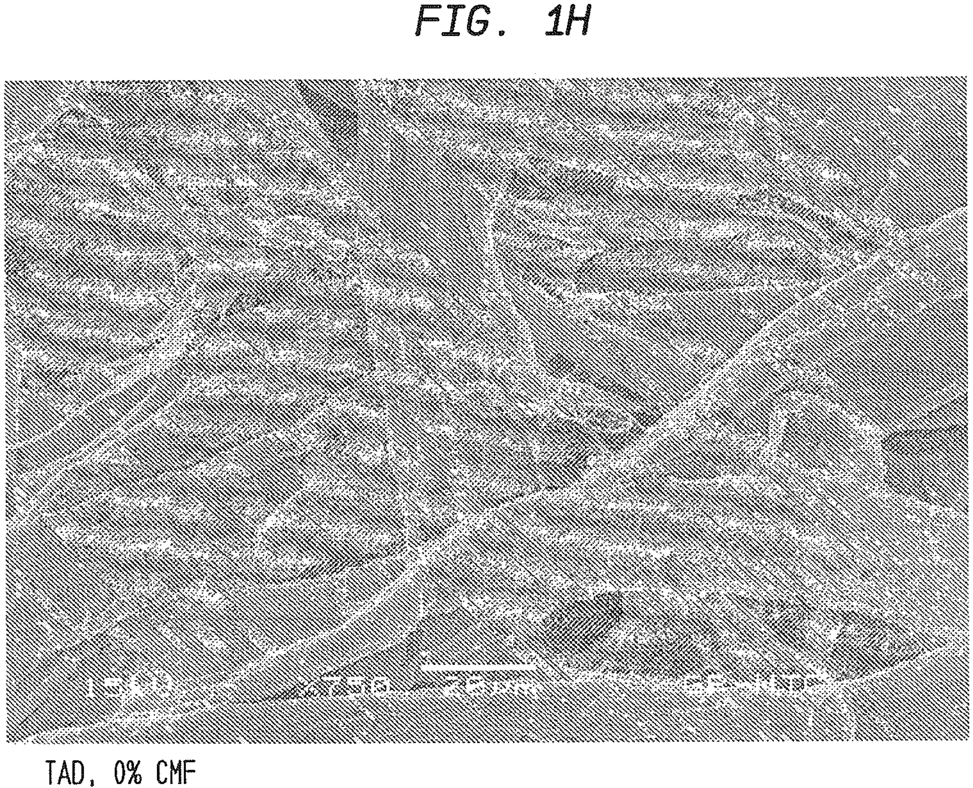
Figure 1J:
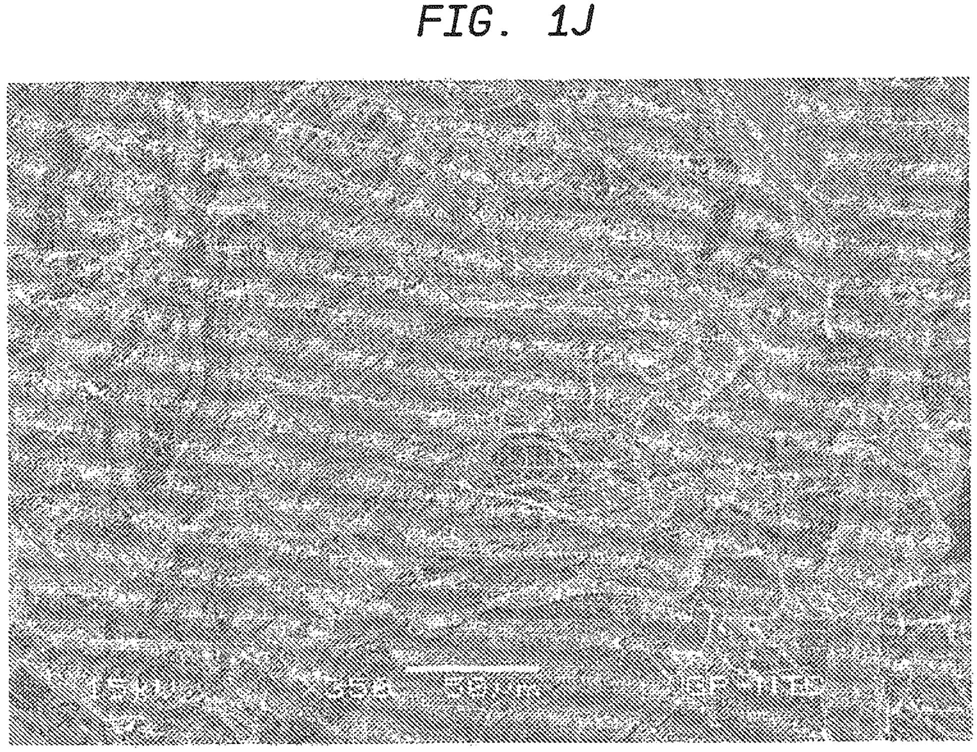
Figure 1K:
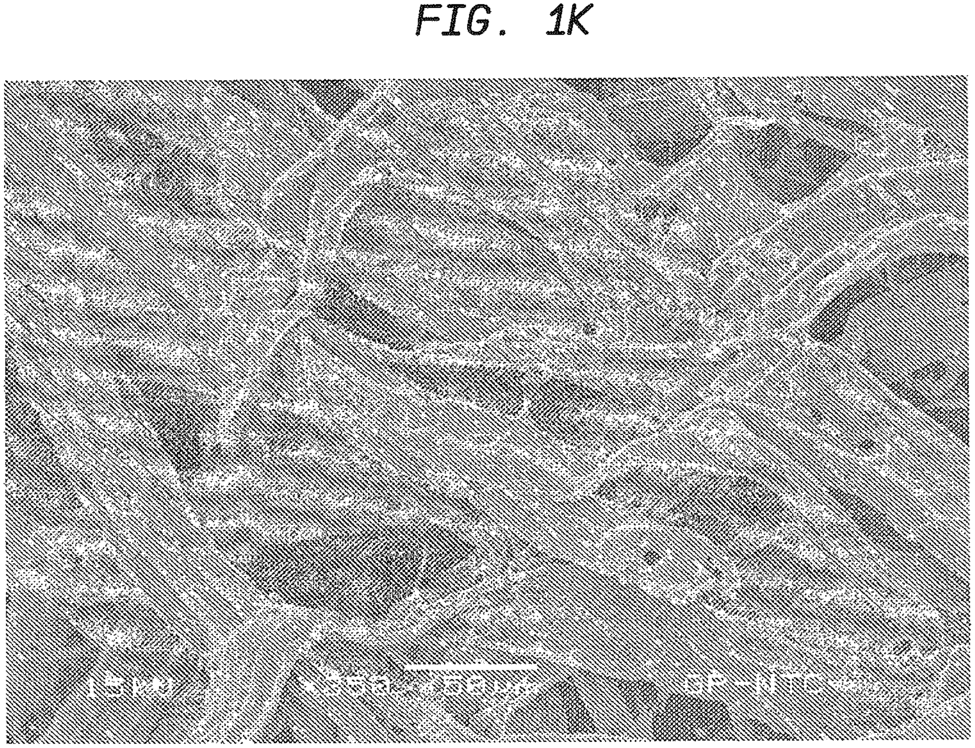
Figure 1L:
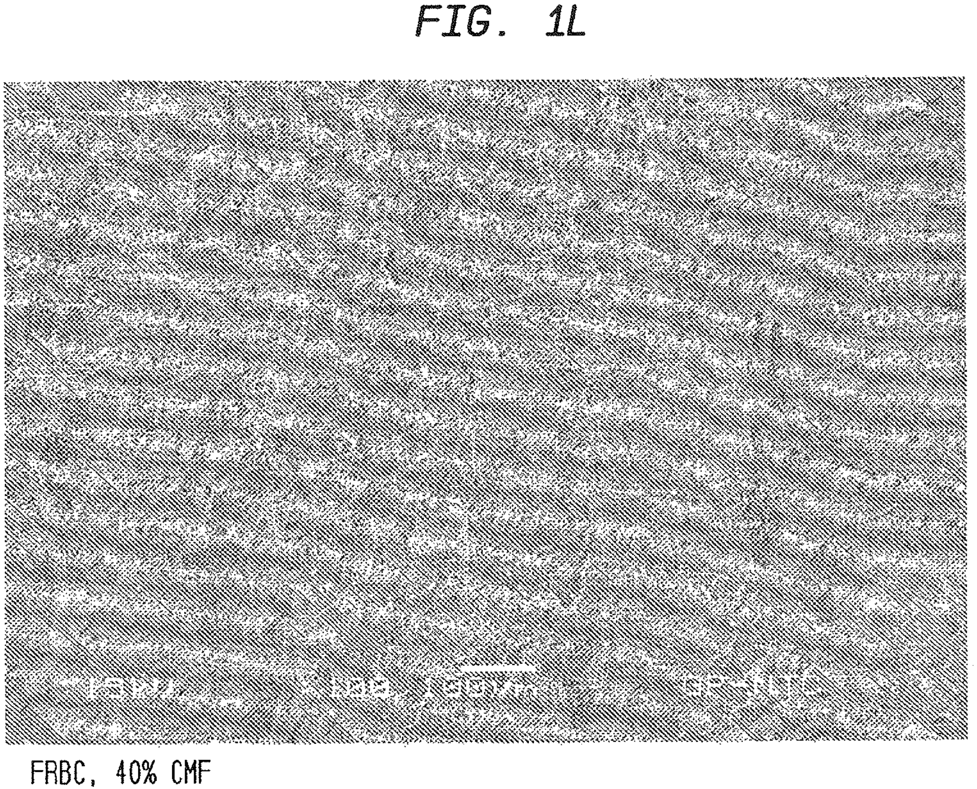
Figure 1M:
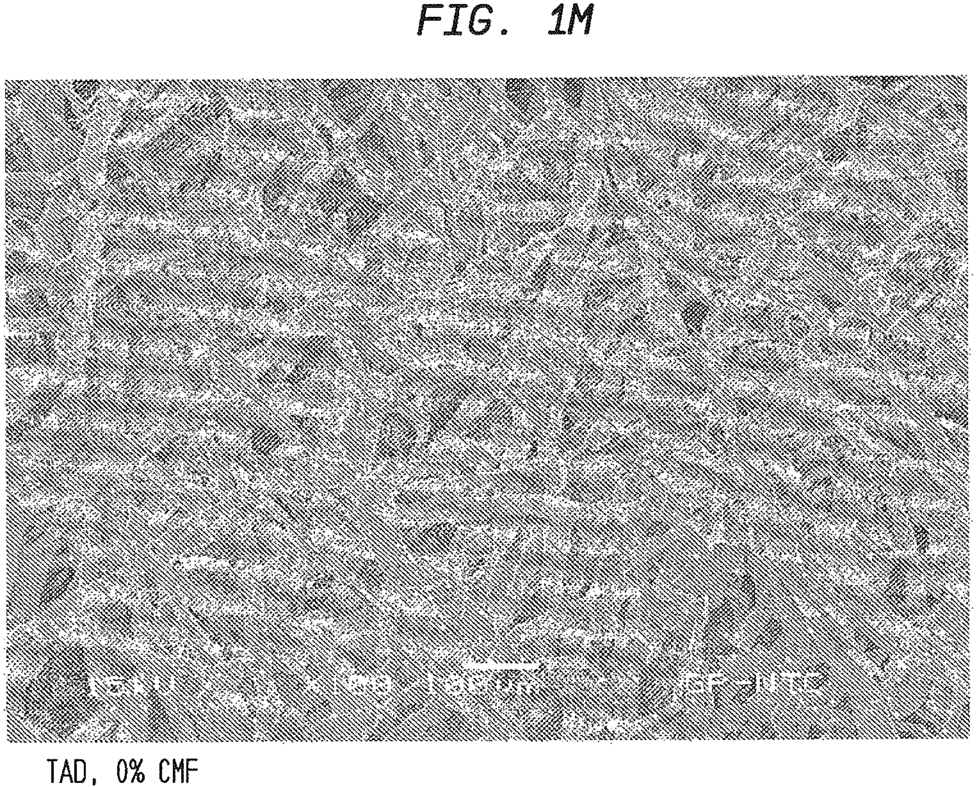
Figure 1N:
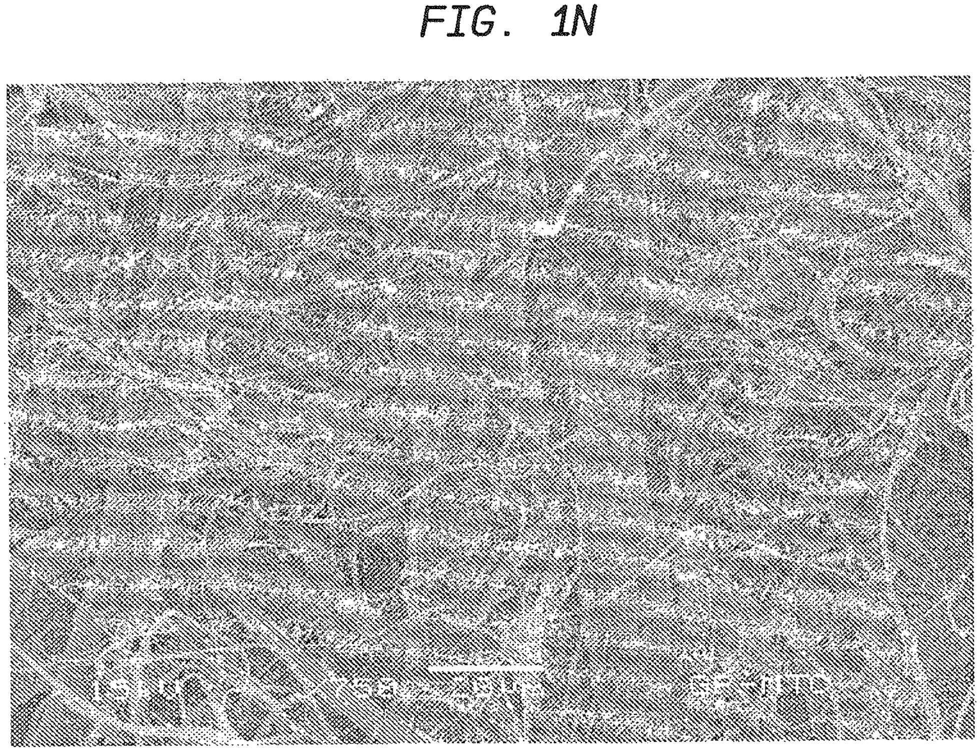
Figure 1P:
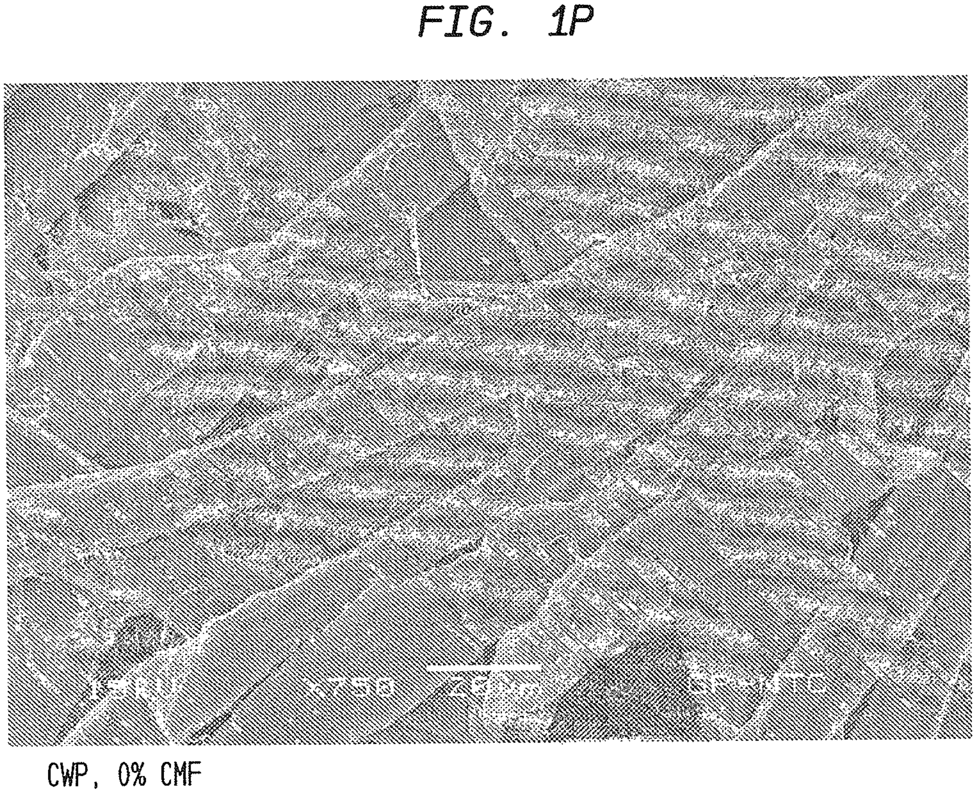
Figure 1Q:
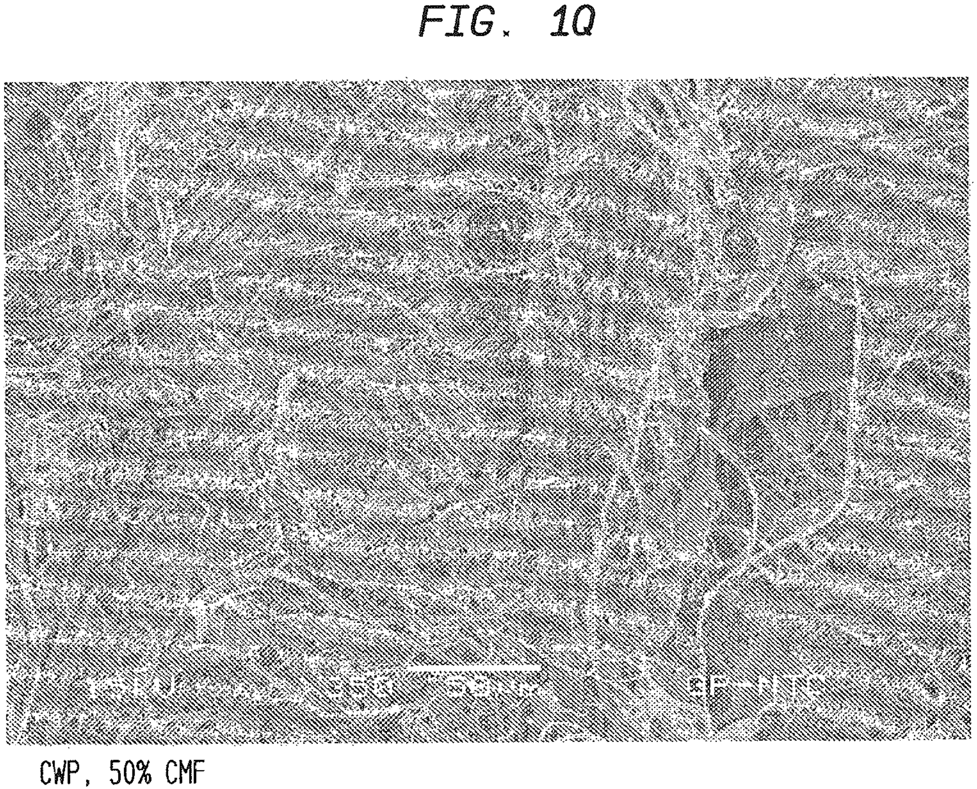
Figure 1R:
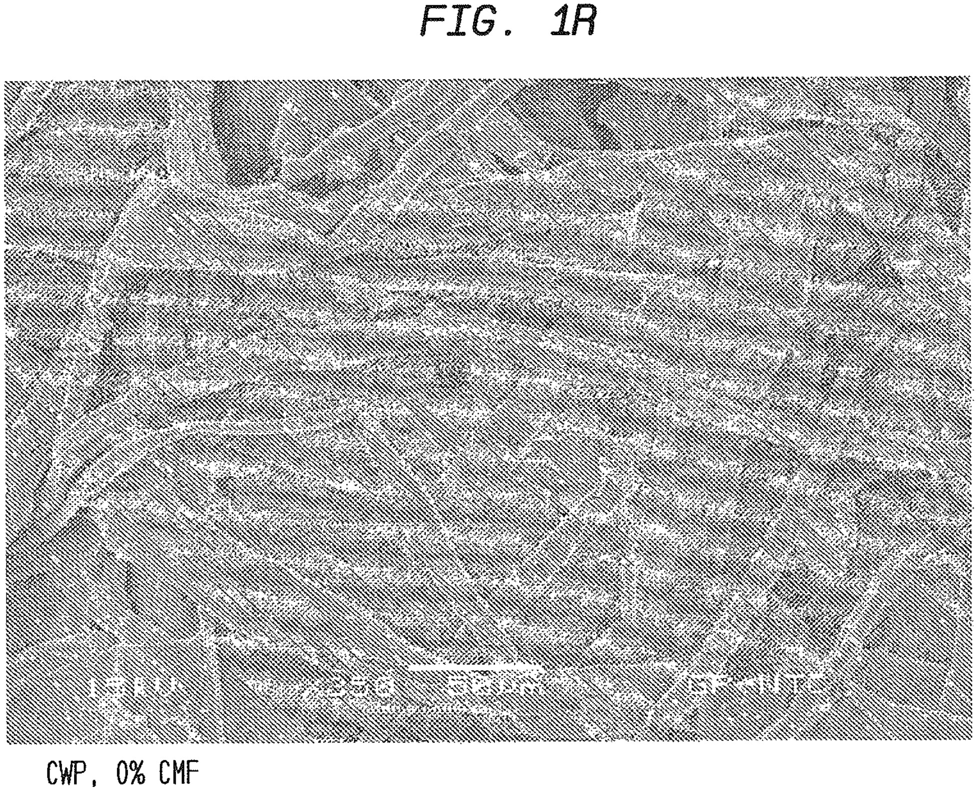
Figure 1S:
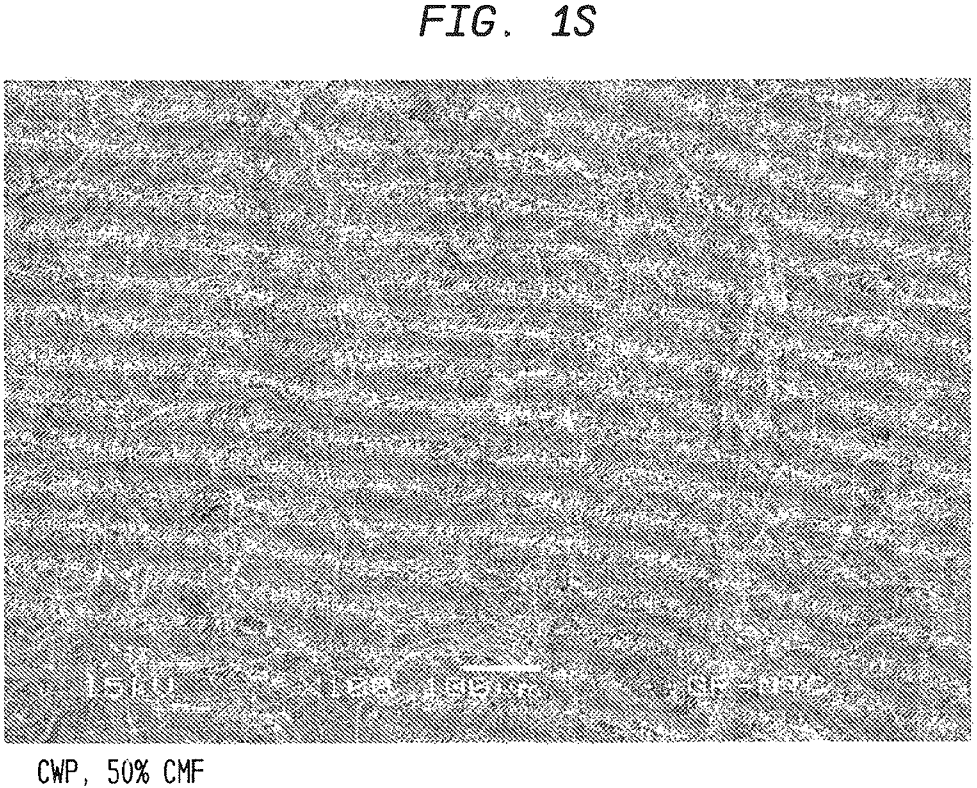
Figure 1T:
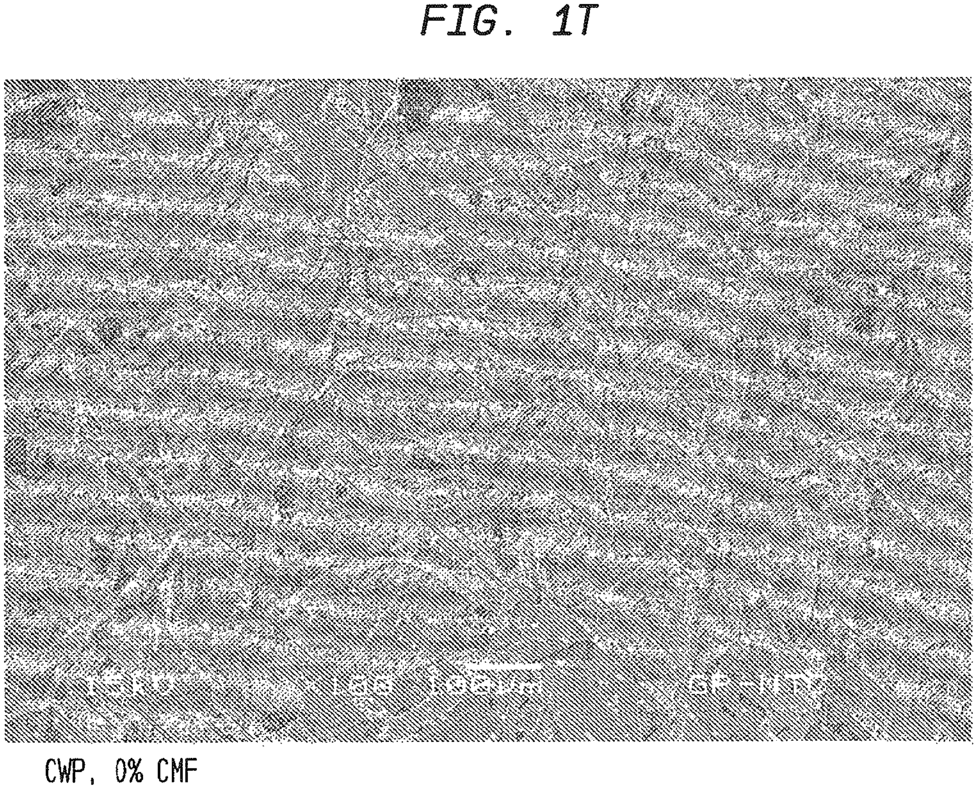

By comparing FIGS. 1G, 1J, and 1L, of structures formed by creping from a transfer surface with a perforated polymeric belt, with micrographs of CMF containing structures formed by a variety of other methods, including creping from a transfer surface with a woven fabric, conventional wet pressing, and through-air drying (TAD), it can be appreciated that structures formed by creping from a transfer surface with a perforated polymeric belt exhibit "venation" in some regions in which the CMF fibrils are tightly adhered to an underlying consolidated structure with line contact between the CMF and the underlying consolidated structure. This venation resembles the vein that can be seen in the undersurface of a leaf, and contrasts strongly with the structure formed by the other methods, in which the CMF is part of an open structure more closely resembling ivy growing on a wall than the veins on a leaf. As mentioned previously, without being bound by theory, it is hypothesized that this line surface contact may create micropores that are responsible for the remarkable wipe dry properties of these structures as discussed above. In any event, the superior wipe dry properties of the sheets formed using the perforated polymeric belt and exhibiting venation are undeniable—no matter what the explanation.

Figure 37:
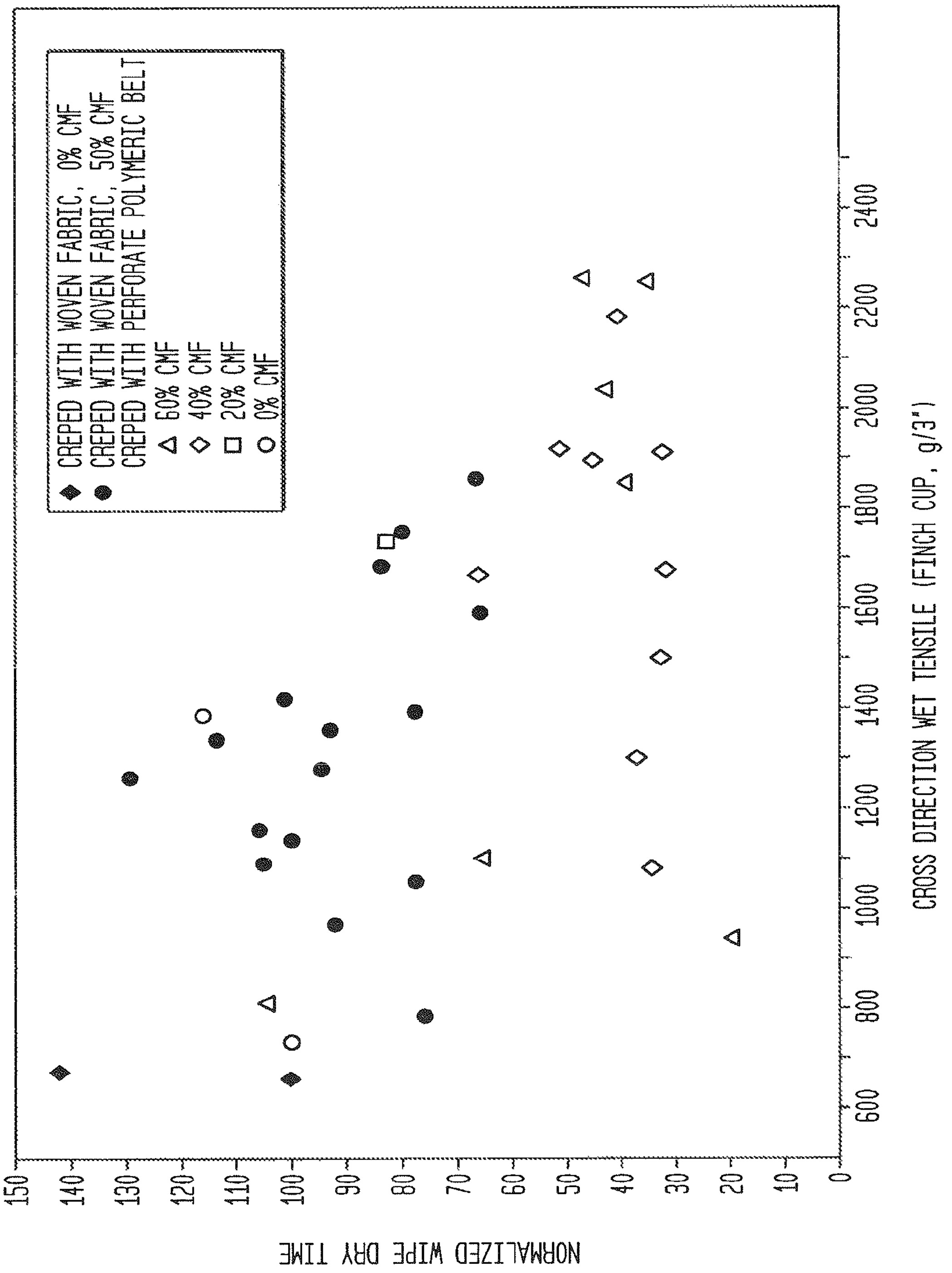
FIG. 37 compares the relative improvements in wipe dry of wipers made by creping with a woven fabric as compared to wipers made by belt creping using a perforated polymeric belt.

FIG. 37 compares the results of Examples 1 and 2 on a normalized basis obtained by dividing the wipe dry time for each cell by the best wipe dry time obtained with a 0% CMF in each of Examples 1 and 2, then plotting these against the CD wet tensile of the wiper in that cell with the fabric creped sheets being indicated by solid symbols, and the samples obtained by creping with a perforated polymeric belt being indicated by hollow symbols in accordance with the legend. It can be appreciated that there is quite a substantial difference between the wipers obtained using the fabric and those using the perforated polymeric belt, particularly, when it is considered that the fabric creped samples indicated by the solid circle contain 50% CMF, while many of the belt creped samples contain far less CMF, the hollow diamonds indicating the presence of 40% CMF and the hollow squares indicating only 20%.

Figure 38:
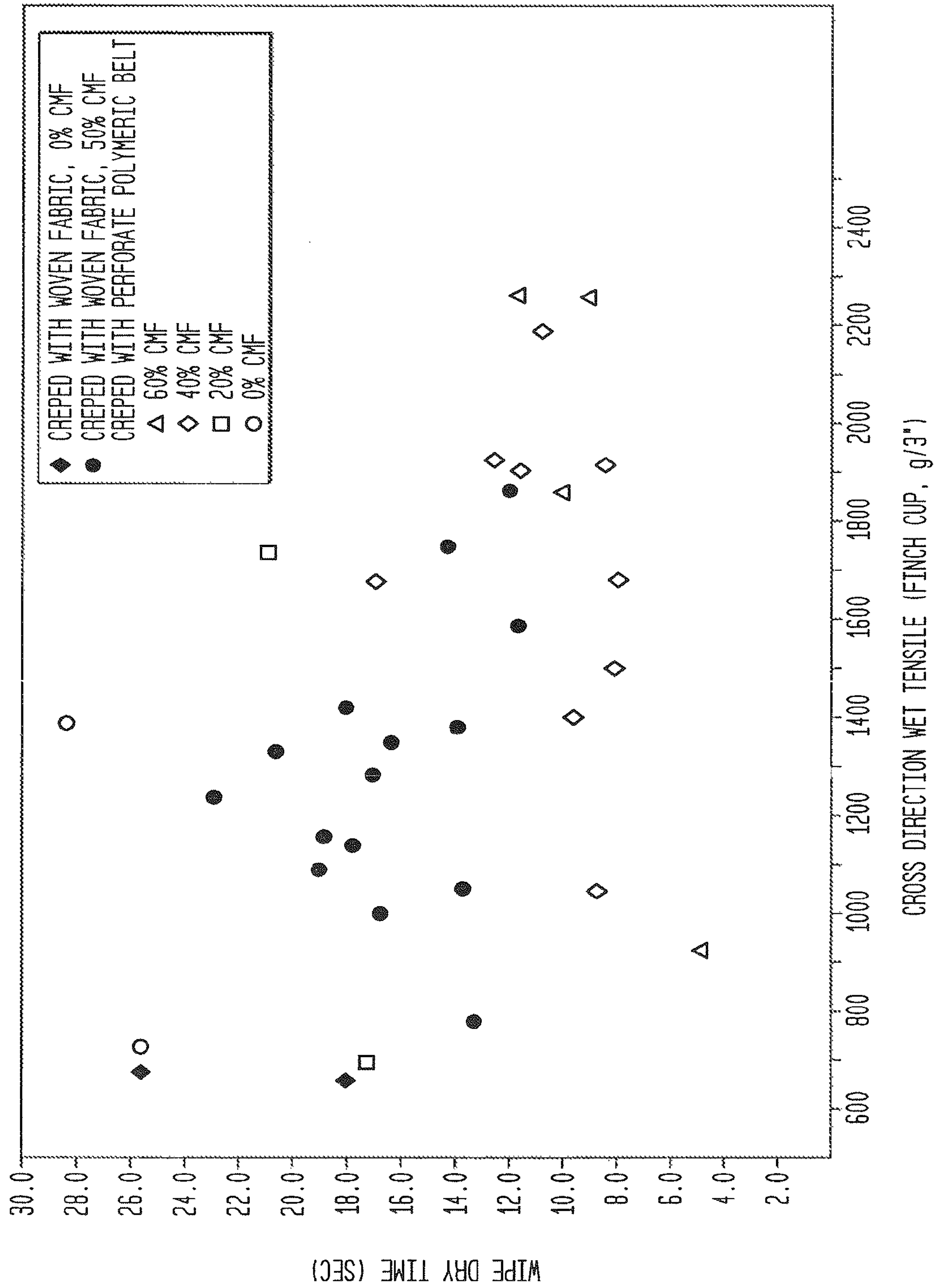
FIG. 38 compares wipe dry of wipers made by creping with a woven fabric as compared to wipers made by belt creping using a perforated polymeric belt.

FIG. 38 compares the results of Examples 1 and 2 without normalization of the wipe dry times so that the wipe dry times are compared directly. Again, it can be appreciated that the wipers produced with the perforated polymeric belt are far superior to those produced with a fabric, particularly, when differences in CMF content are considered.

Figure 39:
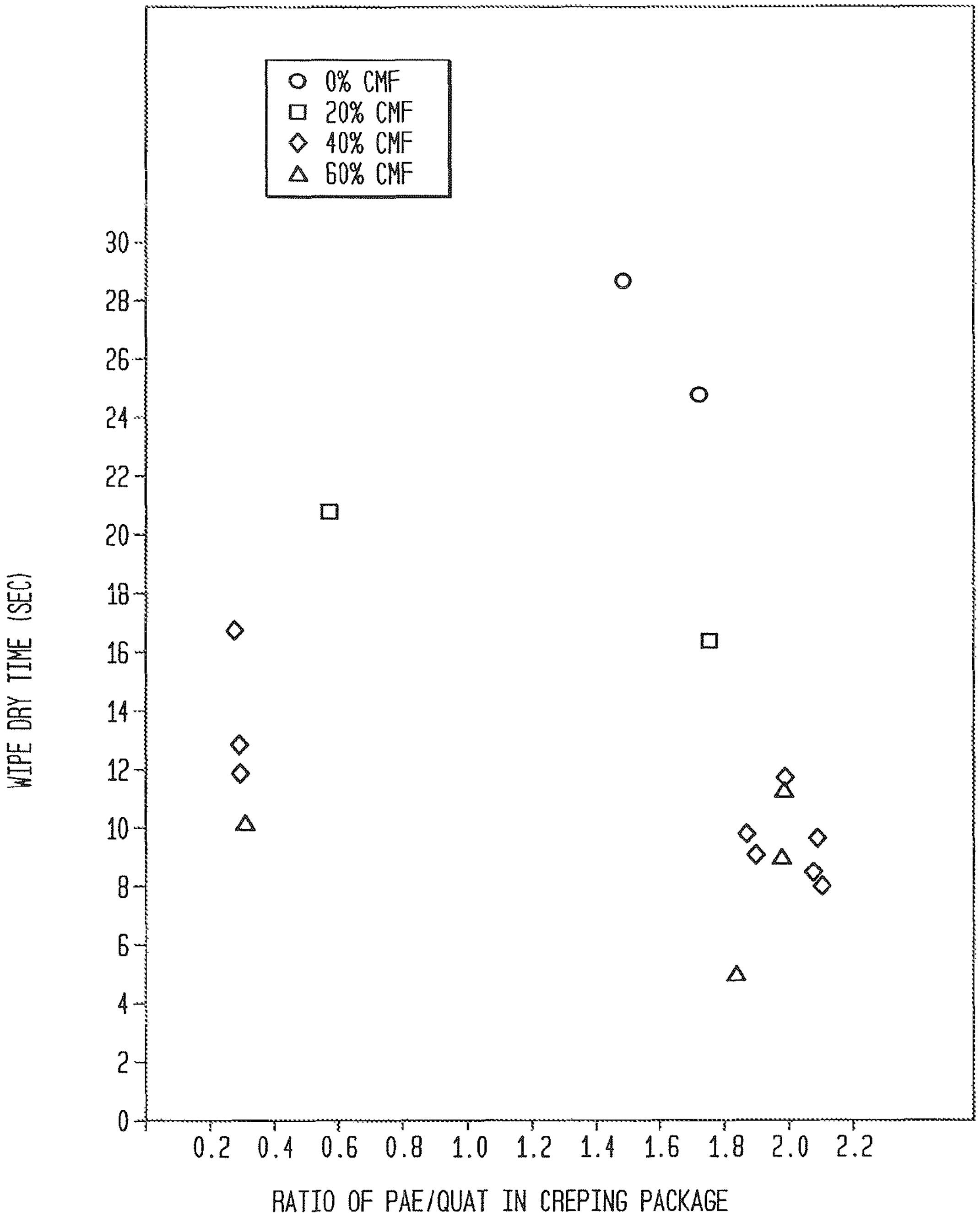
FIG. 39 illustrates the effect of excessive quaternary ammonium salt release agent on wipers made by belt creping using a perforated polymeric belt.

FIG. 39 shows the wipe dry times from Example 1 plotted against the ratio of PAE adhesive to quaternary ammonia salt based release agent in the creping package. It can be appreciated that wipe dry times suffer at low values of this ratio (high levels of quaternary ammonia salt release agent). Therefore, in those cases when, as is common, the outer surface of the wiper is the Yankee side, care should be exercised to ensure that the level of quaternary ammonium salt retained on the surface of the web is sufficiently low that the wipe dry time is not increased unduly. In the present case, this point is primarily important as being the most likely reason why a few of the wipers with 40% CMF exhibited anomalously high wipe dry times as shown in FIGS. 37 and 38.

While the invention has been described in detail, modifications within the spirit and scope of the invention will be readily apparent to those of skill in the art. In view of the foregoing discussion, relevant knowledge in the art and references including the copending applications discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

We claim:

1. A multi-ply wiper/towel product comprising:

at least one wet laid web comprising (a) at least 10% fibrillated regenerated cellulosic microfibers, and (b) at least about 40% wood pulp derived papermaking fibers, the at least one wet laid web having formed therein:

(i) a plurality of fiber-enriched hollow domed regions on an upper side of the at least one wet laid web, the hollow domed regions having respective sidewalls of a relatively high local basis weight formed along at least a leading edge thereof;

(ii) connecting regions of a relatively lower local basis weight forming a network interconnecting the hollow domed regions of the at least one wet laid web; and (iii) transition areas with consolidated fibrous regions that transition from the connecting regions into the hollow domed regions, by extending upwardly and inwardly from the connecting regions into the sidewalls of the hollow domed regions.

2. The multi-ply wiper/towel product according to claim 1, wherein the fibrillated regenerated cellulosic microfibers present in the at least one wet laid web form venation on the surface of the consolidated fibrous regions, such that the surface has raised, generally continuous ridges defined thereacross.

3. The multi-ply wiper/towel product according to claim 1, wherein the consolidated fibrous regions are saddle shaped, and more than 35% by weight of the fibrillated regenerated cellulosic microfibers has a Canadian Standard Freeness (CSF) value of less than 175 mL.

4. The multi-ply wiper/towel product according to claim 1, wherein the fiber-enriched hollow domed regions in the at least one wet laid web exhibit a local basis weight of at least 5% higher than the mean basis weight of a product sheet, and the fibrillated regenerated cellulosic microfibers have a number average diameter of less than about 2 microns.

5. The multi-ply wiper/towel product according to claim 1, wherein the fiber-enriched hollow domed regions in the at least one wet laid web exhibit a local basis weight of at least 10% higher than the mean basis weight of a sheet, and the fibrillated cellulosic microfibers have a fiber count of greater than 2 billion fibers/gram.

6. The multi-ply wiper/towel product according to claim 1, wherein one of at least a portion of the fiber-enriched hollow domed regions and the transition areas in the at least one wet laid web exhibits a cross machine direction (CD) fiber orientation bias, and the fibrillated regenerated cellulosic microfibers have a fiber count of greater than 10 billion fibers/gram.

7. The multi-ply wiper/towel product according to claim 1, wherein at least a portion of the connecting regions in the at least one wet laid web exhibits a cross machine direction (CD) fiber orientation bias.

8. The multi-ply wiper/towel product according to claim 1, wherein at least a portion of the sidewalls of the hollow domed regions exhibits a matted structure on both their outer and inner surfaces, and the fibrillated regenerated cellulosic microfibers form venation thereupon, such that the surfaces have raised, generally continuous ridges defined thereacross.

9. The multi-ply wiper/towel product according to claim 1, wherein the fibrillated regenerated cellulosic microfibers have a characteristic Canadian Standard Freeness (CSF) value of less than 175 ml.

10. The multi-ply wiper/towel product according to claim 1, wherein the product has a caliper of from 7.5 to 12 mils/8 sheets/per pound per ream and exhibits a wipe-dry time of less than about 20 seconds.

11. The multi-ply wiper/towel product according to claim 1, wherein the product has an SAT capacity in the range of about 9.5 to about 11.0 g/g.

12. The multi-ply wiper/towel product according to claim 1, wherein the product has an SAT rate in the range of about 0.05 to about 0.25 $g/s^{0.5}$.

13. The multi-ply wiper/towel product according to claim 1, wherein the product has a wet/dry CD tensile ratio of from about 40% to about 60%.

14. The multi-ply wiper/towel product according to claim 1, wherein the product has a cross machine direction (CD) wet breaking length in the range of about 300 to about 800 m.

15. The multi-ply wiper/towel product according to claim 14, wherein the fibrillated regenerated cellulosic microfibers exhibit a CD wet breaking length in the range of about 350 to about 800 m.

16. The multi-ply wiper/towel product according to claim 14, wherein the fibrillated regenerated cellulosic microfibers exhibit a CD wet breaking length in the range of about 400 to about 800 m.

17. The multi-ply wiper/towel product according to claim 1, wherein the fibrillated regenerated cellulosic microfibers have a number average diameter of less than about 2 microns.

18. The multi-ply wiper/towel product according to claim 1, wherein the fibrillated regenerated cellulosic microfibers have a number average diameter of from about 0.1 to about 2 microns.

19. The multi-ply wiper/towel product according to claim 1, wherein the fibrillated regenerated cellulosic microfibers have a fiber count of greater than about 400 million fibers/gram.

20. The multi-ply wiper/towel product according to claim 1, wherein the fibrillated regenerated cellulosic microfibers have a fiber count of greater than about 50 billion fibers/gram.

21. The multi-ply wiper/towel product according to claim 1, wherein the fibrillated regenerated cellulosic microfibers have a fiber count greater than about 200 billion fibers/gram.

22. The multi-ply wiper/towel product according to claim 1, wherein:

(i) the consolidated fibrous regions are saddle shaped, and more than 35% by weight of the fibrillated regenerated cellulosic microfibers have a Canadian Standard Freeness (CSF) value of less than 175 mL;

(ii) the fiber-enriched hollow domed regions exhibit a local basis weight of at least 10% higher than the mean basis weight of a product sheet;

(iii) at least a portion of one of the fiber-enriched hollow domed regions and the transition areas exhibits a cross machine direction (CD) fiber orientation bias, and the fibrillated regenerated cellulosic microfibers have a fiber count of greater than 10 billion fibers/gram;

(iv) at least a portion of the connecting regions exhibits a CD fiber orientation bias;

(v) at least a portion of the sidewalls of the hollow domed regions exhibits a matted structure on both their outer and inner surfaces, and the fibrillated regenerated cellulosic microfibers form venation thereupon, such that the surfaces have raised, generally continuous ridges defined thereacross; and (vi) the multi-ply wiper/towel product has a caliper of from 7.5 to 12 mils/8 sheets/per pound per ream and exhibits a wipe-dry time of less than 20 seconds, an SAT capacity in the range of about 9.5 to about 11.0 g/g, an SAT rate in the range of about 0.05 to about 0.25 $g/s^{0.5}$, a CD wet breaking length in the range of about 300 to about 800 m, and a wet/dry CD tensile ratio of from about 40% to about 60%.

23. The multi-ply wiper/towel product according to claim 22, wherein the fibrillated regenerated cellulosic microfibers exhibit a CD wet breaking length in the range of about 350 to about 800 m.

24. The multi-ply wiper/towel product according to claim 22, wherein the fibrillated regenerated cellulosic microfibers exhibit a CD wet breaking length in the range of about 400 to about 800 m.

25. A multi-ply wiper/towel product of cellulosic fibers, the wiper/towel product comprising:

(A) at least about 10% fibrillated regenerated cellulosic microfibers having a Canadian Standard Freeness (CSF) value of less than 175 mL and (B) at least about 40% wood pulp derived papermaking fibers, the wiper/towel product having formed therein:

(a) a plurality of fiber-enriched regions including (i) hollow domed portions having respective sidewalls of a relatively high local basis weight formed along at least a leading edge thereof and (ii) pileated fiber-enriched portions with a cross machine direction (CD) fiber orientation bias adjacent to the hollow domed portions, the fiber-enriched portions being interconnected with:

(b) connecting regions of a relatively lower local basis weight, wherein the hollow domed portions have upwardly projecting densified sidewalls, at least a portion of each of the upwardly projecting densified sidewalls comprising a densified region that extends inwardly.

26. The multi-ply wiper/towel product according to claim 25, the product having a caliper of from 7.5 to 12 mils/8 sheets/per pound per ream and exhibiting a wipe-dry time of less than 20 seconds.

27. The multi-ply wiper/towel product according to claim 25, the product having an SAT capacity in the range of about 9.5 to about 11.0 g/g, and an SAT rate in the range of about 0.05 to about 0.25 $g/s^{0.5}$.

28. The multi-ply wiper/towel product according to claim 25, the product having a wet/dry CD tensile ratio of from about 40% to about 60%.

29. The multi-ply wiper/towel product according to claim 25, the product having a CD wet breaking length in the range of about 300 to about 800 m.

30. The multi-ply wiper/towel product according to claim 25, wherein the fibrillated regenerated cellulosic microfibers exhibit a CD wet breaking length in the range of about 350 to about 800 m.

31. The multi-ply wiper/towel product according to claim 25, wherein the fibrillated regenerated cellulosic microfibers exhibit a CD wet breaking length in the range of about 400 to about 800 m.

32. A multi-ply wiper/towel product comprising:

at least one wet laid web comprising (a) at least about 10% fibrillated regenerated cellulosic microfibers, and (b) at least about 40% wood pulp derived papermaking fibers, the wiper/towel product being formed with upper and lower surfaces and comprising:

(i) a plurality of fiber-enriched hollow domed regions protruding from the upper surface of a sheet, the hollow domed regions having respective sidewalls of a relatively high local basis weight formed along at least a leading edge thereof;

(ii) connecting regions of a relatively lower local basis weight forming a network interconnecting the fiber-enriched hollow domed regions of the sheet; and (iii) consolidated groupings of fibers extending upwardly from the connecting regions into the respective sidewalls of the fiber-enriched hollow domed regions formed along at least the leading edge thereof.

33. The multi-ply wiper/towel product according to claim 32, wherein the consolidated groupings of fibers extend inwardly and upwardly from the connecting regions into the respective sidewalls of the fiber-enriched hollow domed regions formed along at least a leading edge thereof.

34. The multi-ply wiper/towel product according to claim 33, wherein:

(i) the fiber-enriched hollow domed regions include an inclined sidewall;

(ii) the fibrillated regenerated cellulosic microfibers form venation on the surface of the consolidated groupings of fibers, such that the surface has raised, generally continuous ridges defined thereacross; and (iii) the wiper/towel product exhibits a differential pore volume for pores under 4 microns in a diameter of at least about 100 $mm^3$/g/micron.

35. The multi-ply wiper/towel product according to claim 32, wherein the fiber-enriched hollow domed regions exhibit a local basis weight of at least 5% higher than the mean basis weight of the sheet.

36. The multi-ply wiper/towel product according to claim 32, wherein the fiber-enriched hollow domed regions in the at least one wet laid web exhibit a local basis weight of at least 10% higher than the mean basis weight of the sheet, and the one wet laid web in the wiper/towel product exhibits a differential pore volume for pores under 3 microns in a diameter of at least about 100 $mm^3$/g/micron.

37. The multi-ply wiper/towel product according to claim 32, wherein, in the at least one wet laid web, the respective sidewalls of the relatively high local basis weight formed along at least a leading edge of the fiber-enriched hollow domed regions comprise regions of consolidated fiber that extend upwardly and inwardly.

38. The multi-ply wiper/towel product according to claim 32, wherein, in the at least one wet laid web, consolidated saddle shaped groupings of fibers extend upwardly from the connecting regions into the respective sidewalls of the fiber-enriched hollow domed regions formed along at least the leading edge thereof.

39. The multi-ply wiper/towel product according to claim 32, wherein, in the at least one wet laid web, the respective sidewalls of the relatively high local basis weight formed along at least a leading edge of the fiber-enriched hollow domed regions comprises consolidated groupings of fibers forming saddle shaped regions extending at least partially around the domed regions.

40. The multi-ply wiper/towel product according to claim 32, wherein, in the at least one wet laid web, the respective sidewalls extend upwardly and inwardly, forming saddle shaped, highly densified, consolidated fibrous regions about the base of a dome.

41. The multi-ply wiper/towel product according to claim 32, wherein, in the at least one wet laid web, saddle shaped transition areas with consolidated fibrous regions extend upwardly and inwardly from the connecting regions into the respective sidewalls of the relatively high local basis weight formed along at least a leading edge of the hollow domed regions.

42. The multi-ply wiper/towel product according to claim 41, wherein the fibrillated regenerated cellulosic microfibers have a fiber count of greater than about 2 billion fibers/gram.

43. The multi-ply wiper/towel product according to claim 32, wherein the at least one wet laid web in the wiper/towel product has a caliper of from 7.5 to 12 mils/8 sheets/per pound per ream and exhibits a wipe-dry time of less than about 20 seconds.

44. The multi-ply wiper/towel product according to claim 32, wherein the at least one wet laid web in the wiper/towel product has an SAT capacity in the range of about 9.5 to about 11.0 g/g.

45. The multi-ply wiper/towel product according to claim 32, wherein the at least one wet laid web in the wiper/towel product has an SAT rate in the range of about 0.05 to about 0.25 $g/s^{0.5}$.

46. The multi-ply wiper/towel product according to claim 32, wherein the at least one wet laid web in the wiper/towel product has a wet/dry CD tensile ratio of from about 40% to about 60%.

47. The multi-ply wiper/towel product according to claim 32, wherein the at least one wet laid web in the wiper/towel product has a cross machine direction (CD) wet breaking length in the range of about 300 to about 800 m.

48. The multi-ply wiper/towel product according to claim 47, wherein the fibrillated regenerated cellulosic microfibers exhibit a CD wet breaking length in the range of about 350 to about 800 m.

49. The multi-ply wiper/towel product according to claim 47, wherein the fibrillated regenerated cellulosic microfibers exhibit a CD wet breaking length in the range of about 400 to about 800 m.

50. The multi-ply wiper/towel product according to claim 32, wherein the at least one wet laid web has transition areas with consolidated fibers extending upwardly and inwardly from the connecting regions into the respective sidewalls of the relatively high local basis weight formed along at least a leading edge of the hollow domed regions that at least partially circumscribe the domes at their bases.

51. The multi-ply wiper/towel product according to claim 32, wherein the at least one wet laid web has transition areas with consolidated fibers extending upwardly and inwardly from the connecting regions into the respective sidewalls of the relatively high local basis weight formed along at least a leading edge of the hollow domed regions densified in a bowed shape around a portion of the bases of the domes.

52. A multi-ply wiper/towel product comprising:

at least one wet laid web comprising (A) at least about 10% fibrillated regenerated cellulosic microfibers having a Canadian Standard Freeness (CSF) value of less than 175 mL, 40% by weight of which is finer than 14 mesh, and (B) at least about 40% wood pulp derived papermaking fibers, the at least one wet laid web having:

(a) a plurality of fiber-enriched regions including (i) hollow domed portions having respective sidewalls of a relatively high local basis weight formed along at least a leading edge thereof and (ii) pileated fiber-enriched portions with a cross machine direction (CD) fiber orientation bias adjacent to the hollow domed portions, the fiber-enriched portions being interconnected with:

(b) connecting regions of a relatively lower local basis weight, wherein the hollow domed portions have upwardly projecting densified sidewalls, at least a portion of each of the upwardly projecting densified sidewalls comprising a densified saddle shaped region that extends inwardly.

53. The multi-ply wiper/towel product according to claim 52, wherein the at least one wet laid web includes transition areas with consolidated fibrous regions that transition from the connecting regions to the fiber-enriched regions.

54. The multi-ply wiper/towel product according to claim 52, wherein the fibrillated regenerated cellulosic microfibers have a fiber count of greater than about 400 million fibers/gram.

55. The multi-ply wiper/towel product according to claim 52, wherein the at least one wet laid web has a caliper of from 7.5 to 12 mils/8 sheets/per pound per ream and exhibits a wipe-dry time of less than about 20 seconds.

56. The multi-ply wiper/towel product according to claim 52, wherein the at least one wet laid web has an SAT capacity in the range of about 9.5 to about 11.0 g/g.

57. The multi-ply wiper/towel product according to claim 52, wherein the at least one wet laid web has an SAT rate in the range of about 0.05 to about 0.25 $g/s^{0.5}$.

58. The multi-ply wiper/towel product according to claim 52, wherein the at least one wet laid web has a wet/dry CD tensile ratio of from about 40% to about 60%.

59. The multi-ply wiper/towel product according to claim 52, wherein the at least one wet laid web has a CD wet breaking length in the range of about 300 to about 800 m.

60. The multi-ply wiper/towel product according to claim 59, wherein the fibrillated regenerated cellulosic microfibers exhibit a CD wet breaking length in the range of about 350 to about 800 m.

61. The multi-ply wiper/towel product according to claim 59, wherein the fibrillated regenerated cellulosic microfibers exhibit a CD wet breaking length in the range of about 400 to about 800 m.

62. The multi-ply wiper/towel product according to claim 52, wherein the at least one wet laid web has a caliper of from 7.5 to 12 mils/8 sheets/per pound per ream and exhibits a wipe-dry time of less than about 20 seconds, an SAT capacity in the range of about 9.5 to about 11.0 g/g, an SAT rate in the range of about 0.05 to about 0.25 $g/s^{0.5}$, a CD wet breaking length in the range of about 300 to about 800 m, and a wet/dry CD tensile ratio of from about 40% to about 60%.

63. The multi-ply wiper/towel product according to claim 62, wherein the fibrillated regenerated cellulosic microfibers exhibit a CD wet breaking length in the range of about 350 to about 800 m.

64. The multi-ply wiper/towel product according to claim 62, wherein the fibrillated regenerated cellulosic microfibers exhibit a CD wet breaking length in the range of about 400 to about 800 m.

65. The multi-ply wiper/towel product according to claim 62, wherein the fibrillated regenerated cellulosic microfibers have a fiber count of greater than about 50 billion fibers/gram.

66. The multi-ply wiper/towel product according to claim 52, wherein the fibrillated regenerated cellulosic microfibers have a fiber count of greater than about 10 billion fibers/gram.

67. The multi-ply wiper/towel product according to claim 62, wherein the fibrillated regenerated cellulosic microfibers have a fiber count of greater than about 10 billion fibers/gram.

68. A multi-ply wiper/towel product of cellulosic fibers, the wiper/towel product comprising:

at least one wet laid web comprising (A) at least about 10% fibrillated regenerated cellulosic microfibers having a Canadian Standard Freeness (CSF) value of less than 175 mL, and (B) at least about 40% wood pulp derived papermaking fibers, the wiper/towel product having formed therein:

(a) a plurality of fiber-enriched regions including (i) hollow domed portions having respective sidewalls of a relatively high local basis weight formed along at least a leading edge thereof and (ii) pileated fiber-enriched portions with cross machine direction (CD) fiber orientation bias adjacent to the hollow domed portions, the fiber-enriched portions being interconnected with:

(b) connecting regions of a relatively lower local basis weight, wherein the hollow domed portions have upwardly projecting densified sidewalls, at least a portion of each of the upwardly projecting densified sidewalls comprising a densified region that extends inwardly.

69. The multi-ply wiper/towel product according to claim 68, wherein the wiper/towel product has a bulk of from about 9 to about 19 $cm^3/g$ and exhibits a wipe-dry time of less than about 20 seconds.

70. The multi-ply wiper/towel product according to claim 68, wherein the wiper/towel product has an SAT capacity in the range of about 9.5 to about 11.0 g/g.

71. The multi-ply wiper/towel product according to claim 68, wherein the wiper/towel product has an SAT rate in the range of about 0.05 to about 0.25 $g/s^{0.5}$.

72. The multi-ply wiper/towel product according to claim 68, wherein the wiper/towel product has a wet/dry CD tensile ratio of from about 40% to about 60%.

73. The multi-ply wiper/towel product according to claim 68, wherein the wiper/towel product has a cross machine direction (CD) wet breaking length in the range of about 300 to about 800 m.

74. The multi-ply wiper/towel product according to claim 68, wherein the fibrillated regenerated cellulosic microfibers exhibit a CD wet breaking length in the range of about 350 to about 800 m.

75. The multi-ply wiper/towel product according to claim 68, wherein the fibrillated regenerated cellulosic microfibers exhibit a CD wet breaking length in the range of about 400 to about 800 m.

76. The multi-ply wiper/towel product according to claim 68, wherein the fibrillated regenerated cellulosic microfibers have a fiber count of greater than about 10 billion fibers/gram.

77. The multi-ply wiper/towel product according to claim 68, wherein the fibrillated regenerated cellulosic microfibers have a fiber count of greater than 50 billion fibers/gram, the wiper/towel product exhibiting a differential pore volume for pores under 5 microns in a diameter of at least about 100 $mm^3/g/micron$.

78. A multi-ply absorbent sheet comprising:

at least one wet laid web comprising (a) at least 10% fibrillated regenerated cellulosic microfibers and (b) at least about 40% wood pulp derived papermaking fibers, the absorbent sheet comprising a multi-ply wiper/towel product being formed with upper and lower surfaces having formed therein:

(i) a plurality of fiber-enriched hollow domed regions protruding from the upper surface of the wiper/towel product, the hollow domed regions having respective sidewalls of a relatively high local basis weight formed along at least a leading edge thereof; and (ii) connecting regions of a relatively lower local basis weight forming a network interconnecting the fiber-enriched hollow domed regions of the wiper/towel product, wherein the fibrous composition of the web, the geometry of the fibrillated regenerated cellulosic microfibers, and the number average count are chosen such that the multi-ply wiper/towel product exhibits a wipe-dry time of less than about 20 seconds.

79. The multi-ply absorbent sheet of claim 78, wherein the sheet exhibits a wipe-dry time of at most 10 seconds.

80. The multi-ply absorbent sheet according to claim 78, wherein the sheet exhibits a cross machine direction (CD) wet breaking length in the range of about 300 to about 800 m.

81. The multi-ply absorbent sheet according to claim 78, wherein the sheet exhibits a cross machine direction (CD) wet breaking length in the range of about 400 to about 800 m.

82. The multi-ply absorbent sheet according to claim 78, wherein the sheet exhibits a differential pore volume of at least about 10% for pores under 5 microns in diameter.

83. A multi-ply absorbent sheet comprising:

at least one wet laid web comprising (a) at least 10% fibrillated regenerated cellulosic microfibers and (b) at least about 40% wood pulp derived papermaking fibers, the absorbent sheet comprising a multi-ply wiper/towel product being formed with upper and lower surfaces having formed therein:

(i) a plurality of fiber-enriched hollow domed regions protruding from the upper surface of the wiper/towel product, the hollow domed regions having respective sidewalls of a relatively high local basis weight formed along at least a leading edge thereof; and (ii) connecting regions of a relatively lower local basis weight forming a network interconnecting the fiber-enriched hollow domed regions of the wiper/towel product, wherein the fibrous composition of the web, the geometry of the fibrillated regenerated cellulosic microfibers, and the number average count are chosen such that the multi-ply wiper/towel product exhibits an SAT capacity in the range of about 9.5 to about 11.0 g/g.

84. The multi-ply absorbent sheet according to claim 83, wherein the sheet exhibits an SAT rate in the range of about 0.05 to about 0.25 $g/s^{0.5}$.

85. A multi-ply wiper/towel product comprising:

at least one wet laid web comprising (a) at least about 10% fibrillated regenerated cellulosic microfibers and (b) at least about 40% wood pulp derived papermaking fibers, the wiper/towel product being formed with upper and lower surfaces comprising:

(i) a plurality of fiber-enriched hollow domed regions protruding from the upper surface of the wipe/towel product, the hollow domed regions having respective sidewalls of a relatively high local basis weight formed along at least a leading edge thereof; and (ii) connecting regions of a relatively lower local basis weight forming a network interconnecting the fiber-enriched hollow domed regions of the wiper/towel product, wherein consolidated groupings of fibers extend upwardly from the connecting regions into the sidewalls of the fiber-enriched hollow domed regions formed along at least the leading edge thereof, and wherein the wiper/towel product exhibits a relative wipe dry time that is less than 50% of the wipe dry time exhibited by a conventional wipe of the same fibrous composition, but without fibrillated regenerated cellulosic microfibers.

86. The multi-ply wiper/towel product of claim 85, wherein the product exhibits a differential pore volume for pores under 5 microns in a diameter of at least about 100 $mm^3$/g/micron.

87. The multi-ply wiper/towel product of claim 85, wherein the product exhibits a relative wipe dry time that is less than about 40% of the wipe dry time exhibited by a conventional wipe of the same fibrous composition, but without fibrillated regenerated cellulosic microfibers.

88. A multi-ply absorbent sheet comprising:

at least one wet laid web comprising (a) at least 10% fibrillated regenerated cellulosic microfibers and (b) at least about 40% wood pulp derived papermaking fibers, the absorbent sheet comprising a wiper/towel product being formed with upper and lower surfaces having formed therein:

(i) a plurality of fiber-enriched hollow domed regions protruding from the upper surface of the wiper/towel product, the hollow domed regions having respective sidewalls of a relatively high local basis weight formed along at least a leading edge thereof; and (ii) connecting regions of a relatively lower local basis weight forming a network interconnecting the fiber-enriched hollow domed regions of the wiper/towel product, wherein the fibrous composition of the web, the geometry of the fibrillated regenerated cellulosic microfibers, and the number average count are chosen such that the wiper/towel product exhibits a wipe dry time of less than about 20 seconds and a differential pore volume of at least about 10% for pores under 5 microns in diameter.

89. The multi-ply absorbent sheet of claim 88, wherein the sheet exhibits a wipe-dry time of at most 10 seconds.

90. The multi-ply absorbent sheet according to claim 88, wherein the sheet exhibits a cross machine direction (CD) wet breaking length in the range of about 300 to about 800 m.

91. The multi-ply absorbent sheet according to claim 88, wherein the sheet exhibits a cross machine direction (CD) wet breaking length in the range of about 400 to about 800 m.

92. The multi-ply absorbent sheet according to claim 88, wherein the sheet exhibits an SAT rate in the range of about 0.05 to about 0.25 $g/s^{0.5}$.

93. The multi-ply absorbent sheet according to claim 88, wherein the sheet exhibits an SAT capacity in the range of about 9.5 to about 11.0 g/g.

94. A multi-ply absorbent sheet comprising:

at least one wet laid web comprising (a) at least about 10% fibrillated regenerated cellulosic microfibers and (b) at least about 40% wood pulp derived papermaking fibers, the multi-ply absorbent sheet comprising a wiper/towel product being formed with upper and lower surfaces comprising:

(i) a plurality of fiber-enriched hollow domed regions protruding from the upper surface of the sheet, the hollow domed regions having respective sidewalls of a relatively high local basis weight formed along at least a leading edge thereof; and (ii) connecting regions of a relatively lower local basis weight forming a network interconnecting the fiber-enriched hollow domed regions of the sheet, wherein the fibrous composition of the web, the geometry of the fibrillated regenerated cellulosic microfibers, and the number average count are chosen such that the multi-ply wiper/towel product exhibits a differential pore volume of at least about 10% for pores under 5 microns in diameter, and an SAT capacity in the range of about 9.5 to about 11.0 g/g.

95. The multi-ply absorbent sheet of claim 94, wherein the sheet exhibits a wipe-dry time of at most 10 seconds.

96. The multi-ply absorbent sheet according to claim 94, wherein the sheet exhibits a cross machine direction (CD) wet breaking length in the range of about 300 to about 800 m.

97. The multi-ply absorbent sheet according to claim 94, wherein the sheet exhibits a cross machine direction (CD) wet breaking length in the range of about 400 to about 800 m.

98. The multi-ply absorbent sheet according to claim 94, wherein the sheet exhibits an SAT rate in the range of about 0.05 to about 0.25 $g/s^{0.5}$.

* * * * *